United States Patent
Lee et al.

(10) Patent No.: US 8,842,639 B2
(45) Date of Patent: Sep. 23, 2014

(54) METHOD FOR PILOT SYMBOL TRANSMISSION IN DOWNLINK MIMO SYSTEM

(75) Inventors: Moon Il Lee, Anyang-si (KR); Seung Hee Han, Anyang-si (KR); Ja Ho Koo, Anyang-si (KR); Hyun Soo Ko, Anyang-si (KR); Jae Hoon Chung, Anyang-si (KR); Bin Chul Ihm, Anyang-si (KR)

(73) Assignee: LG Electronics Inc., Seoul (KR)

( * ) Notice: Subject to any disclaimer, the term of this patent is extended or adjusted under 35 U.S.C. 154(b) by 392 days.

(21) Appl. No.: 13/121,936

(22) PCT Filed: Oct. 1, 2009

(86) PCT No.: PCT/KR2009/005646
§ 371 (c)(1),
(2), (4) Date: Jun. 14, 2011

(87) PCT Pub. No.: WO2010/038999
PCT Pub. Date: Apr. 8, 2010

(65) Prior Publication Data
US 2011/0244873 A1    Oct. 6, 2011

Related U.S. Application Data

(60) Provisional application No. 61/122,417, filed on Dec. 15, 2008, provisional application No. 61/101,679, filed on Oct. 1, 2008.

(30) Foreign Application Priority Data

Sep. 22, 2009  (KR) .................. 10-2009-0089529

(51) Int. Cl.
| | |
|---|---|
| H04W 4/00 | (2009.01) |
| H04L 5/00 | (2006.01) |
| H04W 48/12 | (2009.01) |
| H04B 7/216 | (2006.01) |
| H04K 1/10 | (2006.01) |
| H04B 7/04 | (2006.01) |

(52) U.S. Cl.
CPC ............. H04W 48/12 (2013.01); H04L 5/0037 (2013.01); H04L 5/0051 (2013.01); H04L 5/005 (2013.01); H04L 5/0023 (2013.01); H04B 7/0413 (2013.01)
USPC ............................ 370/334; 370/342; 375/260

(58) Field of Classification Search
USPC ......... 370/342, 464; 375/260; 455/452.2, 513
See application file for complete search history.

(56) References Cited

U.S. PATENT DOCUMENTS

2008/0285669 A1* 11/2008 Walton et al. ................. 375/260
2010/0075706 A1*  3/2010 Montojo et al. .............. 455/513

FOREIGN PATENT DOCUMENTS

| JP | 2007-89113 | 4/2007 |
|---|---|---|
| JP | 2012-501063 | 1/2012 |

(Continued)

OTHER PUBLICATIONS

Nortel, "Design Consideration for Higher-order MIMO in LTE-advanced", R1-083869, 3GPP TSG-RAN Working Group 1 Meeting #54bis, Sep.-Oct. 2003, 9 pages.

(Continued)

*Primary Examiner* — Helal A Algahaim
*Assistant Examiner* — Mahmoud Ismail
(74) *Attorney, Agent, or Firm* — Lee, Hong, Degerman, Kang & Waimey

(57) ABSTRACT

A method for transmitting a pilot signal in a downlink MIMO (Multi Input Multi Output) supporting multiple transmission antenna is disclosed. The method includes transmitting a subframe to which cell-specific pilot symbols and User Equipment-specific (UE-specific) pilot symbols are mapped, in which the cell-specific pilot symbols are mapped to a first region of the subframe and the UE-specific pilot symbols are mapped to a second region of the subframe.

8 Claims, 59 Drawing Sheets

(56) References Cited

FOREIGN PATENT DOCUMENTS

| JP | 2012-503396 | 2/2012 |
|---|---|---|
| JP | 2012-503446 | 2/2012 |
| KR | 1020060082743 | 7/2006 |
| KR | 1020080030607 | 4/2008 |
| WO | 2008/112803 | 9/2008 |
| WO | 2008/115588 | 9/2008 |
| WO | 2009/157168 | 12/2009 |
| WO | 2010/019019 | 2/2010 |
| WO | 2010/027885 | 3/2010 |

OTHER PUBLICATIONS

NTT Docomo, "Support of DL Higher-Order MIMO Transmission in LTE-Advanced", R1-083685, 3GPP TSG RAN WG1 Meeting #54bis, Sep.-Oct. 2008, 9 pages.

Qualcomm Europe, "Dedicated RS Structure for DL Beanforming", R1-080638, 3GPP TSG RAN1 #52, Feb. 2008, 10 pages.

Qualcomm Europe, "Structure and Performance of DL Dedicated RS", R1-072746, 3GPP TSG-RAN WG1 #49-bis, Jun. 2007, 9 pages.

Sharp, "Proposal for 2-RS and 4-RS structure application in LTE Downlink", R1-072717, 3GPP TSG-RAN WG1#49bis, Jun. 2007, 10 pages.

Samsung, "Issues on DL RS Design for Higher Order MIMO", R1-084169, 3GPP TSG RAN WG1 #55, Nov. 2008, 3 pages.

Nortel Networks, "RS design considerations for high-order MIMO in LTE-A," TSG-RAN1 #54, R1-083157, Aug. 2008, 6 pages.

Texas Instruments, "Common Reference Symbol Mapping/Signaling for 8 Transmit Antenna," 3GPP TSG RAN1 #54bis, R1-083532, Sep. 2008, 6 pages.

The State Intellectual Property Office of the People's Republic of China Application Serial No. 200980147328.3 Office Action dated Jun. 18, 2014, 6 pages.

* cited by examiner

Antenna port 5

Antenna port 5

METHOD FOR PILOT SYMBOL TRANSMISSION IN DOWNLINK MIMO SYSTEM

CROSS-REFERENCE TO RELATED APPLICATIONS

This application is the National Stage filing under 35 U.S.C. 371 of International Application No. PCT/KR2009/005646, filed on Oct. 1, 2009, which claims the benefit of earlier filing date and right of priority to Korean Patent Application No. 10-2009-0089529, filed on Sep. 22, 2009, and also claims the benefit of U.S. Provisional Application Nos. 61/122,417, filed on Dec. 15, 2008 and 61/101,679, filed on Oct. 1, 2008.

BACKGROUND OF THE INVENTION

1. Field of the Invention

The present invention relates to a method for efficiently providing a pilot signal in environments in which antennas are added to an existing system in a Multiple-Input Multiple-Output (MIMO) communication system.

2. Discussion of the Related Art

LTE Physical Structure $3^{rd}$ Generation Project Partnership (3GPP) Long Term Evolution (LTE) supports radio frame structure type 1 applicable to Frequency Division Duplex (FDD) and radio frame structure type 2 applicable to Time Division Duplex (TDD).

FIG. 1 illustrates radio frame structure type 1. Radio frame structure type 1 is comprised of 10 subframes each consisting of two slots.

FIG. 2 illustrates radio frame structure type 2. Radio frame structure type 2 is comprised of two half frames, each of which consists of five subframes, a Downlink Pilot Time Slot (DwPTS), a Guard Period (GP), and an Uplink Pilot Time Slot (UpPTS). Each of these subframes consists of two slots. The DwPTS is used for initial cell search, synchronization, and channel estimation at a User Equipment (UE). The UpPTS is used for channel estimation and uplink transmission synchronization of the UE at a Base Station (BS). The GP is used to remove interference occurring in uplink due to a multipath delay of a downlink signal between the uplink and a downlink. Meanwhile, one subframe consists of two slots regardless of a type of a radio frame.

FIG. 3 illustrates a slot structure of an LTE downlink. As shown in FIG. 3, a signal transmitted in each slot may be described by a resource grid including $N_{RB}^{DL} N_{SC}^{RB}$ subcarriers and $N_{symb}^{DL}$ Orthogonal Frequency Division Multiplexing (OFDM) symbols. $N_{RB}^{DL}$ represents the number of Resource Blocks (RBs) in a downlink slot, $N_{SC}^{RB}$ represents the number of subcarriers in one RB, and $N_{symb}^{DL}$ represents the number of OFDM symbols in the downlink slot.

FIG. 4 illustrates a slot structure of an LTE uplink. As shown in FIG. 4, a signal transmitted in each slot may be described by a resource grid including $N_{RB}^{UL} N_{SC}^{RB}$ subcarriers and $N_{symb}^{UL}$ OFDM symbols. $N_{RB}^{UL}$ represents the number of RBs in an uplink slot, $N_{SC}^{RB}$ represents the number of subcarriers in one RB, and $N_{symb}^{UL}$ represents the number of OFDM symbols in the uplink slot.

A Resource Element (RE) is a resource unit defined as an index (a, b) in the uplink slot and the downlink slot and represents one subcarrier and one OFDM symbol. Here, 'a' is an index on a frequency domain and 'b' is an index on a time domain.

FIG. 5 illustrates a downlink subframe structure. A maximum of three OFDM symbols of a front portion of a first slot within one subframe corresponds to a control region to which a control channel is allocated. The remaining OFDM symbols correspond to a data region to which a Physical Downlink Shared Channel (PDSCH) is allocated. Examples of downlink control channels used in a 3GPP LTE system include a Physical Control Format Indicator Channel (PCFICH), a Physical Downlink Control Channel (PDCCH), a Physical Hybrid automatic repeat request Indicator Channel (PHICH), etc.

Definition of MIMO Technology

MIMO refers to a method capable of improving the efficiency of data transmission/reception using multiple transmission antennas and multiple reception antennas, instead of a conventional method employing one transmission antenna and one reception antenna. That is, MIMO is a technology utilizing multiple antennas in a transmitter or a receiver of a wireless communication system to increase capacity or improve performance. Here, MIMO is referred to as multiple antennas.

The MIMO technology is an application of techniques for restoring data by collecting pieces of data received through several antennas, without depending on a single antenna path, in order to receive a message. Since the MIMO technology can improve a data transmission rate in a specific range or increase a system range at a specific data transmission rate, it may be widely applied to mobile communication terminals, relays, etc. MIMO technology is drawing attention as a next-generation technology to overcome limitations in mobile communication transmission capacity, which is increasingly limited due to expansion of data communication.

FIG. 6 illustrates the configuration of a general MIMO communication system. As shown in FIG. 6, if the numbers of transmission and reception antennas are simultaneously increased to $N_T$ and $N_R$, respectively, a theoretical channel transmission capacity is increased in proportion to the number of antennas, unlike the case where only either a transmitter or a receiver uses multiple antennas. Accordingly, it is possible to increase transmission rate and to remarkably improve frequency efficiency. Theoretically, a transmission rate according to an increase in channel transmission capacity can be increased by a value obtained by multiplying a rate of increase, $R_i$, indicated in the following Equation 1 by a maximum transmission rate $R_o$ in case of using one antenna.

$$R_i = \min(N_T, N_R) \qquad \text{[Equation 1]}$$

For example, in a MIMO communication system using four transmission antennas and four reception antennas, it is possible to theoretically obtain a transmission rate which is four times a transmission rate of a single antenna system. After an increase in the theoretical capacity of the MIMO system was first proved in the mid-1990s, various techniques for substantially improving data transmission rate have been actively developed. Several of these techniques have already been incorporated in a variety of wireless communication standards such as the $3^{rd}$ generation mobile communication and the next-generation wireless local area network.

Active research up to now related to the MIMO technology has been focused upon a number of in different aspects, including research into information theory related to the computation of MIMO communication capacity in various channel environments and in multiple access environments, research into wireless channel measurement and model derivation of a MIMO system, and research into space-time signal processing technologies for improving transmission reliability and transmission rate.

Reference Signal Allocation Scheme in 3GPP LTE Downlink System

In the radio frame structure applicable to FDD out of the above-described radio frame structures supported by 3GPP LTE, one frame is transmitted during a 10 msec duration. One frame consists of 10 subframes each with a duration of 1 msec. One subframe consists of 14 or 12 OFDM symbols. The number of subcarriers selected in one OFDM symbol can be one of 128, 256, 512, 1024, 1536, and 2048.

FIG. 7 illustrates the structure of a UE-specific downlink reference signal in a subframe in which one Transmission Time Interval (TTI) uses a normal Cyclic Prefix (CP) having 14 OFDM symbols. In FIG. 7, 'R5' denotes a UE-specific reference signal and l denotes a position of an OFDM symbol on a subframe.

FIG. 8 illustrates the structure of a UE-specific downlink reference signal in a subframe in which one TTI uses an extended CP having 12 OFDM symbols.

FIGS. 9 to 11 illustrate the structures of UE-common downlink reference signals for systems having one, two, and four transmission antennas, respectively, when one TTI has 14 OFDM symbols. In FIGS. 9 to 11, R0, R1, R2, and R3 represent pilot symbols with respect to transmission antenna port 0, transmission antenna port 1, transmission antenna port 2, and transmission antenna port 3, respectively. No signals are transmitted in subcarriers where pilot symbols of the respective transmission antennas are used to eliminate interference with the other transmission antennas except for the transmission antennas transmitting the pilot symbols.

The downlink reference signals shown in FIGS. 7 and 8 may be simultaneously used together with the UE-common downlink reference signals shown in FIGS. 9 to 11. For example, in OFDM symbols 0, 1, and 2 of the first slot to which control information is transmitted, the UE-common downlink reference signals shown in FIGS. 9 to 11 may be used, and in the other OFDM symbols, UE-specific downlink reference signals may be used. If a predefined sequence (e.g. Pseudo-Random (PN) sequence, m-sequence, etc.) is multiplied by a downlink reference signal according to each cell before transmission, channel estimation performance in receiver can be improved by reducing interference of a signal of a pilot symbol received from a neighboring cell. The PN sequence is applied in units of OFDM symbols in one subframe. Different PN sequences may be applied according to a cell ID, a subframe number, an OFDM symbol position, and a UE ID.

As an example, it can be understood that, in the structure of a 1Tx pilot symbol shown in FIG. 9, the number of pilot symbols for one transmission antenna used in a specific OFDM symbol including a pilot symbol is two. The 3GPP LTE system includes a variety of bandwidths ranging from 60 RBs to 110 RBs. Accordingly, the number of pilot symbols for one transmission antenna in one OFDM symbol is $2 \times N_{RB}$ and a sequence multiplied by the downlink reference signal according to each cell should have a length of $2 \times N_{RB}$. $N_{RB}$ denotes the number of RBs corresponding to a bandwidth and the sequence may use a binary sequence or a complex sequence. One example of the complex sequence is indicated as r(m) in the following Equation 2.

$$r(m) = \frac{1}{\sqrt{2}}(1 - 2 \cdot c(2m)) + j\frac{1}{\sqrt{2}}(1 - 2 \cdot c(2m+1)) \quad \text{[Equation 2]}$$

(where $m = 0, 1, \ldots, 2N_{RB}^{max} - 1$)

In Equation 2, $N_{RB}^{max}$ represents the number of RBs corresponding to a maximum bandwidth and may be 110 according to the above description, and c represents a PN sequence and may be defined as a Gold sequence of length-31. In case of a UE-specific downlink reference signal, Equation 2 may be expressed by the following Equation 3.

$$r(m) = \frac{1}{\sqrt{2}}(1 - 2 \cdot c(2m)) + j\frac{1}{\sqrt{2}}(1 - 2 \cdot c(2m+1)) \quad \text{[Equation 3]}$$

(where $m = 0, 1, \ldots, 2N_{RB}^{PDSCH} - 1$)

In Equation 3, $N_{RB}^{PDSCH}$ represents the number of RBs corresponding to downlink data allocated to a specific UE. Therefore, according to the amount of downlink data allocated to a UE, the length of the sequence may vary.

Only one data stream can be transmitted through the above-described structure of the UE-specific downlink reference signal. Since the structure cannot be simply extended, it is impossible to transmit a plurality of data streams. Therefore, the structure of the UE-specific downlink reference signal needs to be extended to transmit a plurality of data streams.

SUMMARY OF THE INVENTION

An object of the present invention is to provide the structure of a UE-specific downlink reference signal through which a plurality of data streams can be transmitted.

It is to be understood that technical objects to be achieved by the present invention are not limited to the aforementioned technical objects and other technical objects which are not mentioned will be apparent from the following description to a person with ordinary skill in the art to which the present invention pertains.

In one aspect of the present invention, a method for transmitting a pilot signal in a downlink Multiple-Input Multiple-Output (MIMO) system which supports a first User Equipment (UE) supporting N transmission antennas among M transmission antennas (where M>N) and supports a second UE supporting the M transmission antennas includes mapping, by a Base Station (BS), pilot symbols to a subframe in which user-specific pilot symbols which can be recognized only by the second UE can be transmitted, and transmitting the subframe to which the pilot symbols are mapped, wherein cell-specific pilot symbols for transmission antenna ports 0 to N−1 which can be recognized by both the first UE and the second UE and user-specific pilot symbols for transmission antenna ports N to M−1 which can be recognized only by the second UE are mapped to the resource block region. The user-specific pilot symbols which can be recognized only by the second UE may be user-specific pilot symbols for channel measurement between a BS and a UE.

Positions to which the user-specific pilot symbols for transmission antenna ports N to M−1 which can be recognized only by the second UE are mapped may be cyclically shifted based on at least one of a time domain and a frequency domain.

The method may further include transmitting information indicating a resource block region on a subframe in which the user-specific pilot symbols which can be recognized only by the second UE can be transmitted and the information may be broadcast to the second UE through a PDCCH which can be recognized by the second UE.

If a normal cyclic prefix is applied, the user-specific pilot symbols for transmission antenna ports N to M−1 which can be recognized only by the second UE may be mapped to OFDM symbols 0, 3, 6, and 6 when indexes starting from 0 are sequentially assigned to OFDM symbols on the subframe.

N may be 4 and M may be 8.

In another aspect of the present invention, a method of feedback of channel information in a downlink Multiple-Input Multiple-Output (MIMO) system which supports a first User Equipment (UE) supporting N transmission antennas among M transmission antennas (where M>N) and supports a second UE supporting the M transmission antennas includes receiving information about a region on a subframe to which user-specific pilot symbols which can be recognized only by the second UE are mapped, transmitting a subframe indicated by the information, and performing feedback of channel information between a Base Station (BS) and the second UE using cell-specific pilot symbols included in the resource block region and the user-specific pilot symbols, wherein cell-specific pilot symbols for transmission antenna ports 0 to N−1 which can be recognized by both the first UE and the second UE, and user-specific pilot symbols for transmission antenna ports N to M−1 which can be recognized only by the second UE are mapped to a resource block region.

Positions to which the user-specific pilot symbols for transmission antenna ports N to M−1 which can be recognized only by the second UE are mapped may be cyclically shifted based on at least one of a time domain and a frequency domain.

The information may be broadcast to the second UE through a PDCCH which can be recognized by the second UE.

N may be 4 and M may be 8.

If a normal cyclic prefix is applied, the user-specific pilot symbols for transmission antenna ports N to M−1 which can be recognized only by the second UE may be mapped to OFDM symbols 0, 3, 6, and 6 when indexes starting from 0 are sequentially assigned to OFDM symbols on the subframe.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Hereinafter, the exemplary embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment through which the present invention can be carried out. The following detailed description includes detailed matters to provide full understanding of the present invention. However, it will be apparent to those skilled in the art that the present invention can be carried out without the detailed matters. Wherever possible, the same reference numbers will be used throughout the drawings to refer to the same or like parts.

Throughout this specification, when an element is referred to as "comprises", "includes", or "has" a component, it does not preclude another component but may further include the other component unless the context clearly indicates otherwise. Also, as used herein, the terms " . . . unit", " . . . device", " . . . module", etc., denote a unit of processing at least one function or operation, and may be implemented as hardware, software, or a combination of hardware and software.

Before description of the structure of a pilot symbol, a type of the pilot symbol will be described.

A UE-specific pilot symbol may be broadly divided into two types: a pilot symbol for measurement to estimate a channel of a physical or virtual antenna and a pilot symbol for data demodulation. Particularly, in case of a pilot symbol for data demodulation, a precoding scheme used for data transmission or other transmission schemes are applied to the pilot symbol so that a channel estimation value during data demodulation can be employed. According to circumstances, combination of a scheme using a pilot symbol for channel estimation and a scheme using a pilot symbol for data demodulation may be used.

Figure 1:
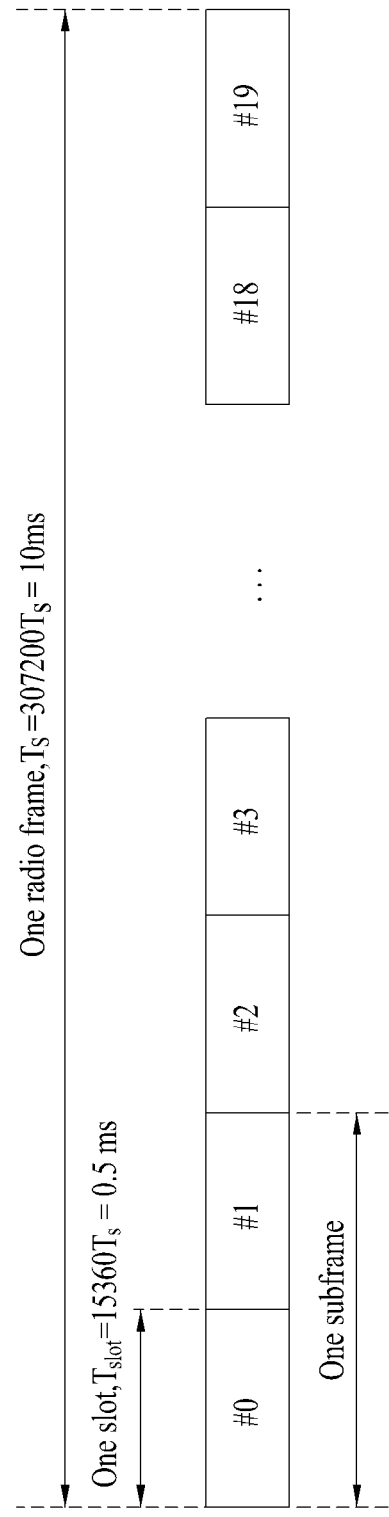
FIG. 1 illustrates radio frame structure type 1.
Figure 2:
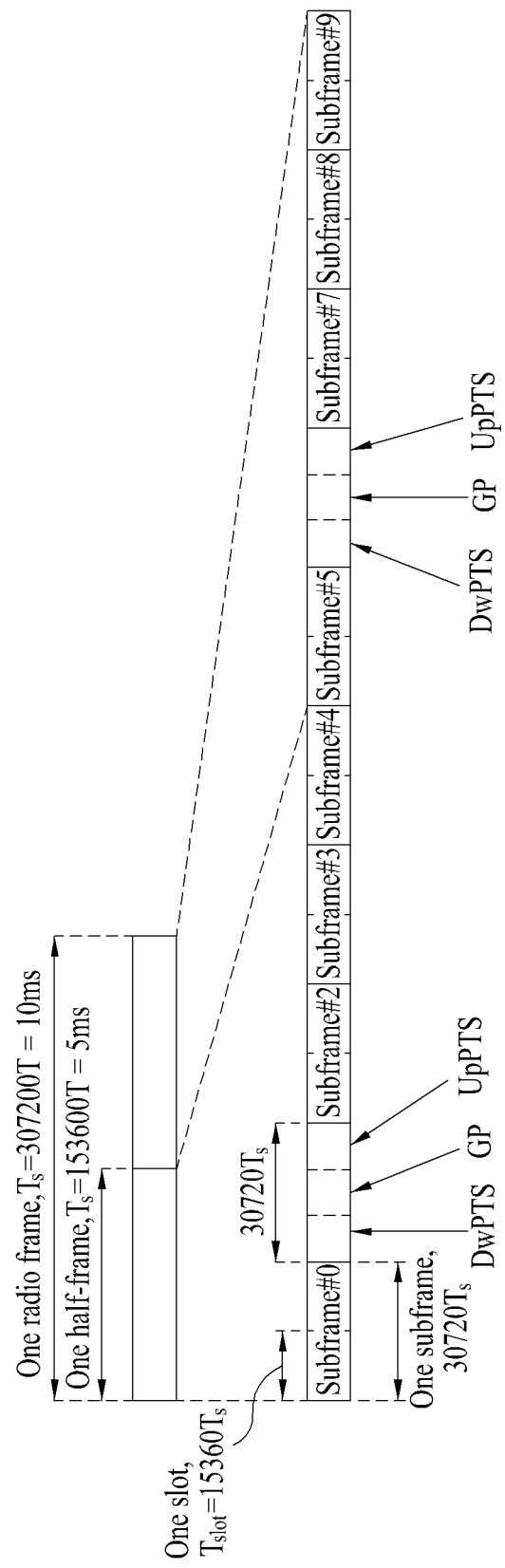
FIG. 2 illustrates radio frame structure type 2.
Figure 3:
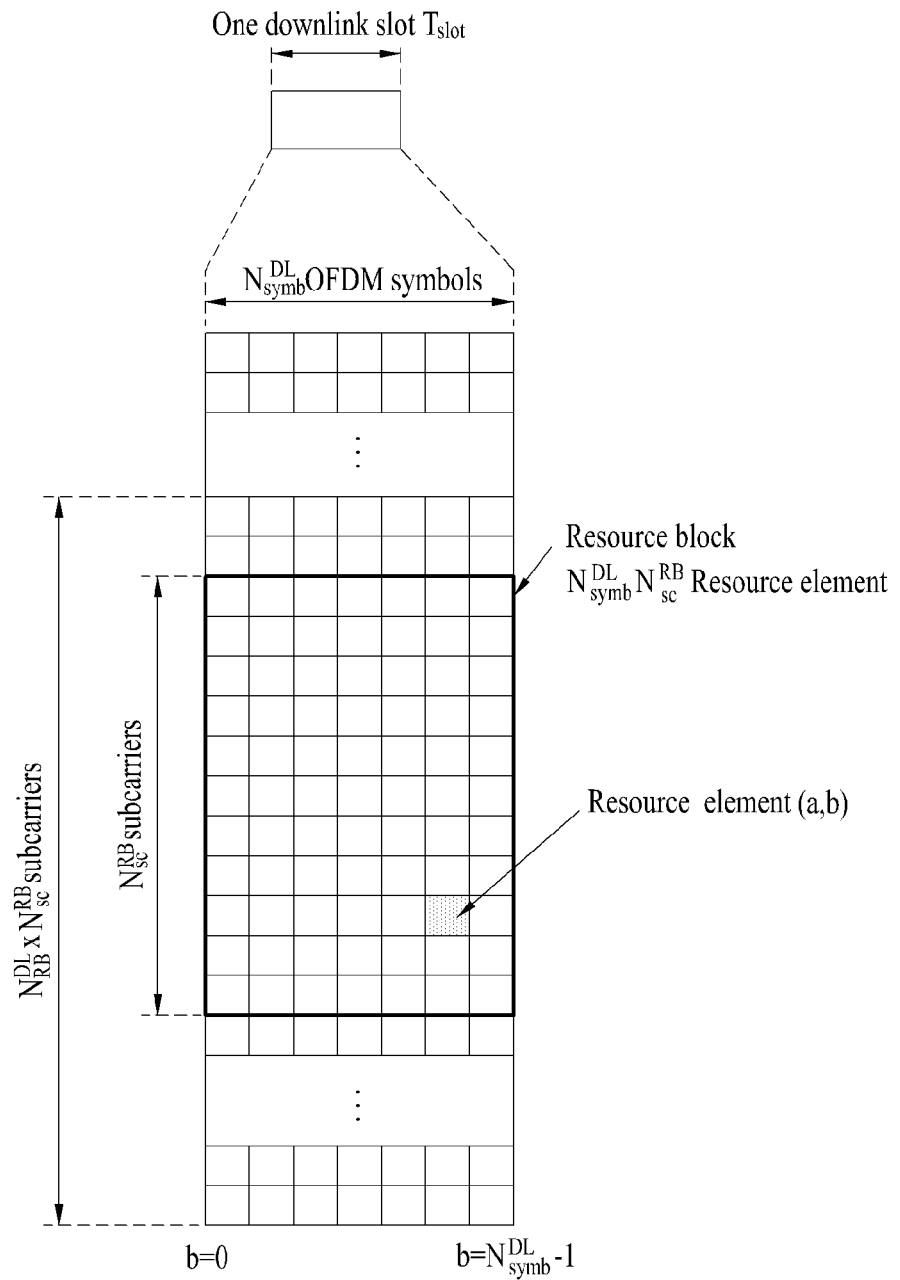
FIG. 3 illustrates a slot structure of an LTE downlink.
Figure 4:
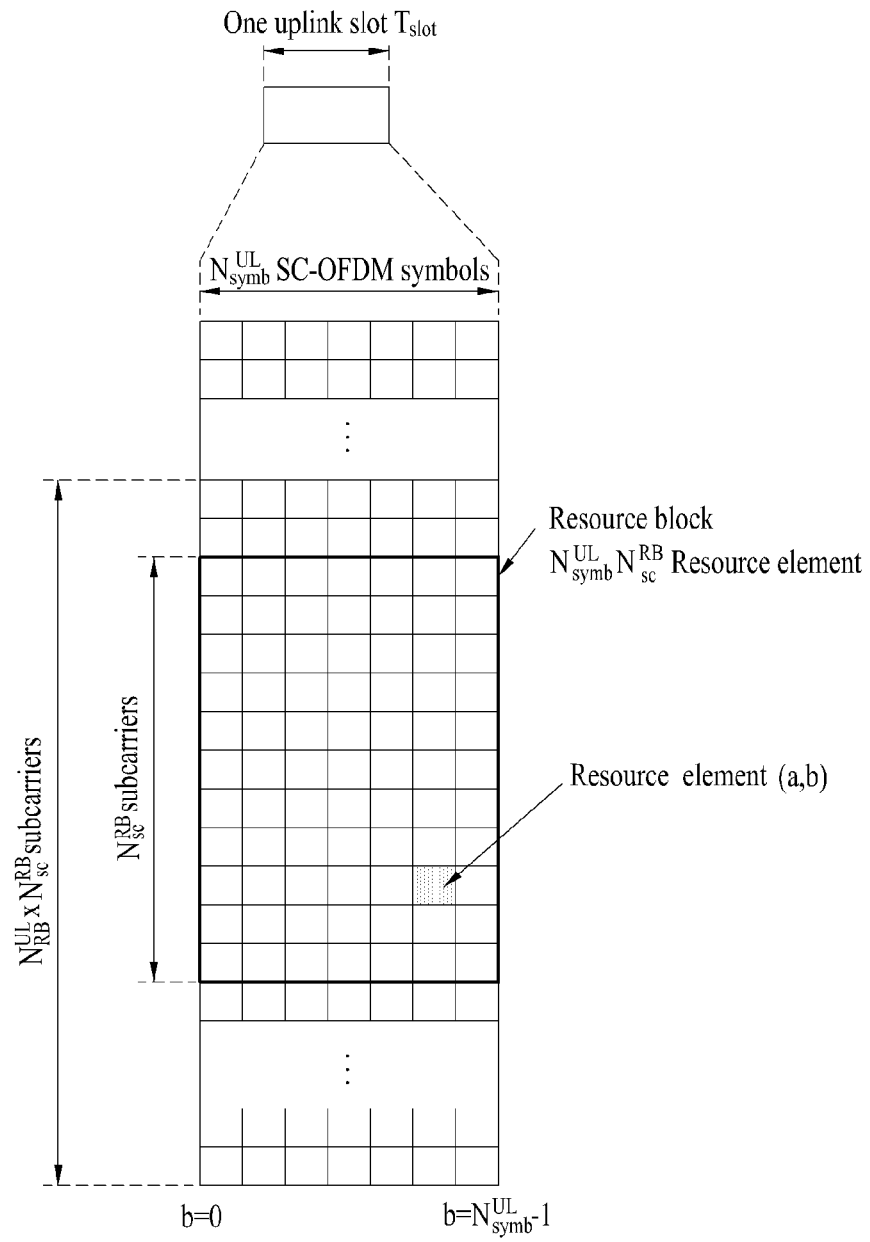
FIG. 4 illustrates a slot structure of an LTE uplink.
Figure 5:
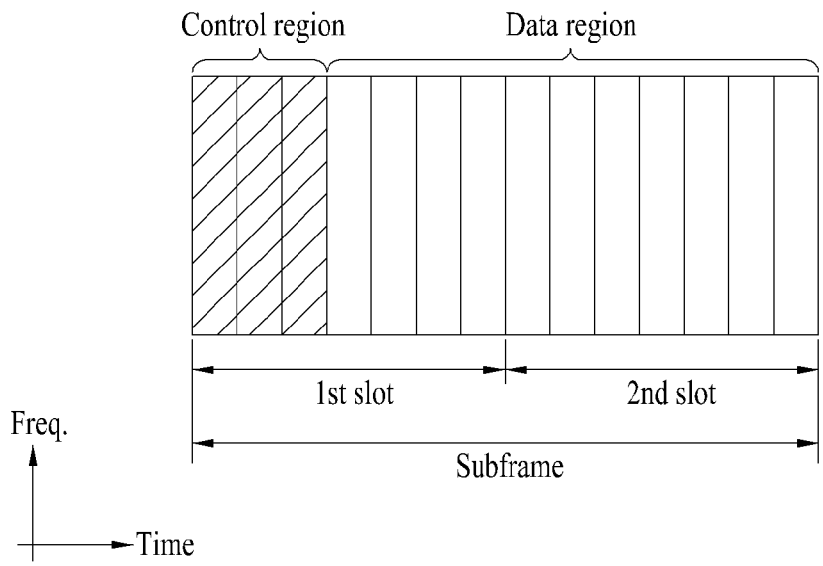
FIG. 5 illustrates a downlink subframe structure.
Figure 6:
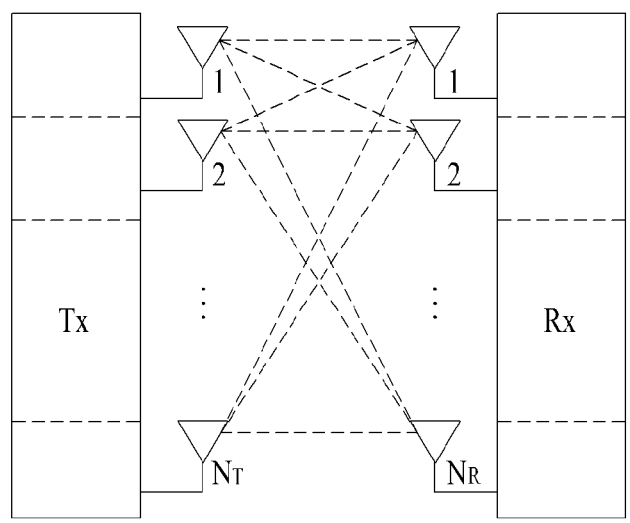
FIG. 6 illustrates the configuration of a general MIMO communication system.
Figure 7:
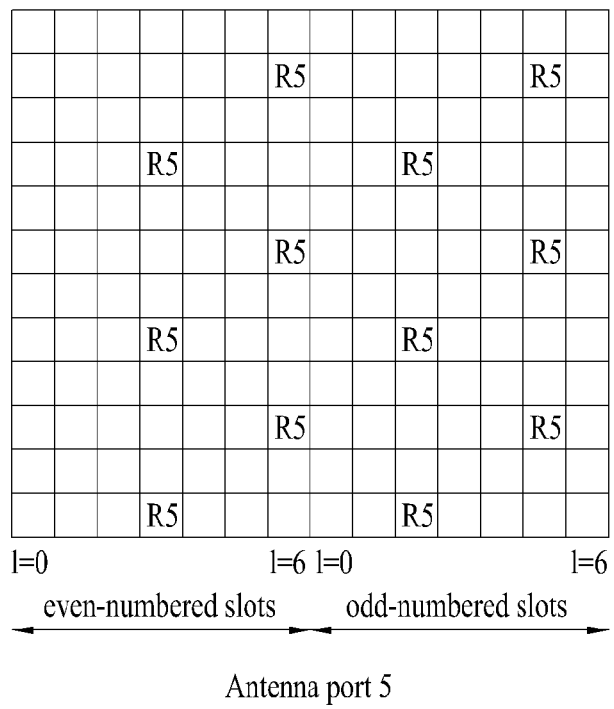
FIG. 7 illustrates the structure of a UE-specific downlink reference signal in a subframe in which one TTI uses a normal CP having 14 OFDM symbols.
Figure 8:
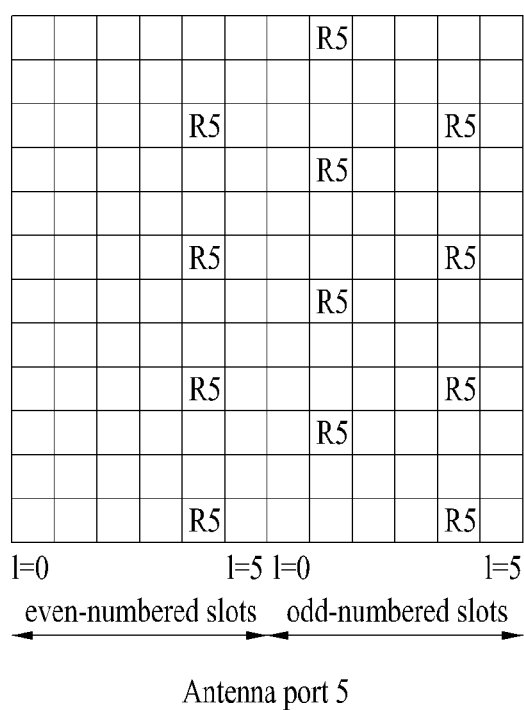
FIG. 8 illustrates the structure of a UE-specific downlink reference signal in a subframe in which one TTI uses an extended CP having 12 OFDM symbols.
Figure 9:
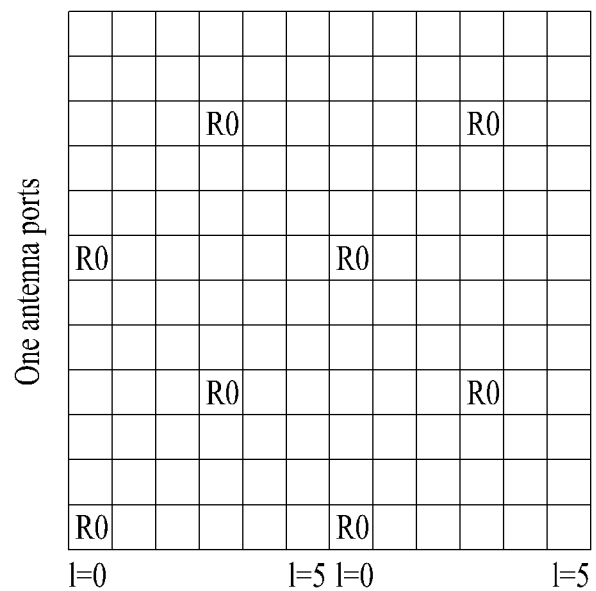
FIGS. 9 to 11 illustrate the structures of UE-common downlink reference signals for systems having one, two and four transmission antennas, respectively, when one TTI has 14 OFDM symbols.
Figure 10:
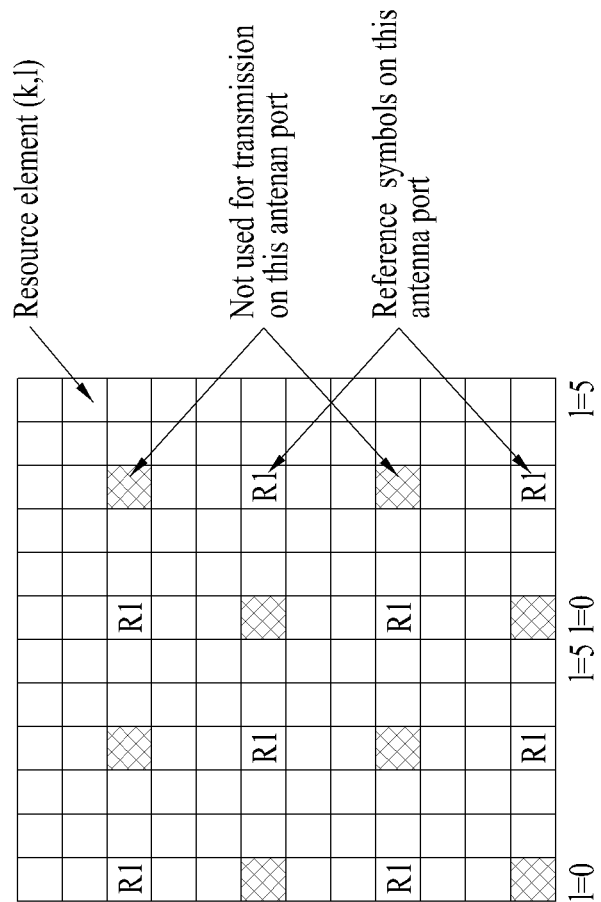
Figure 10:
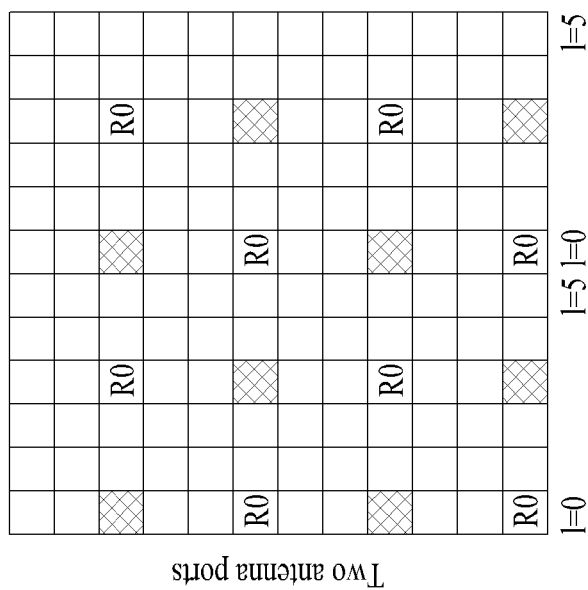
Figure 11:
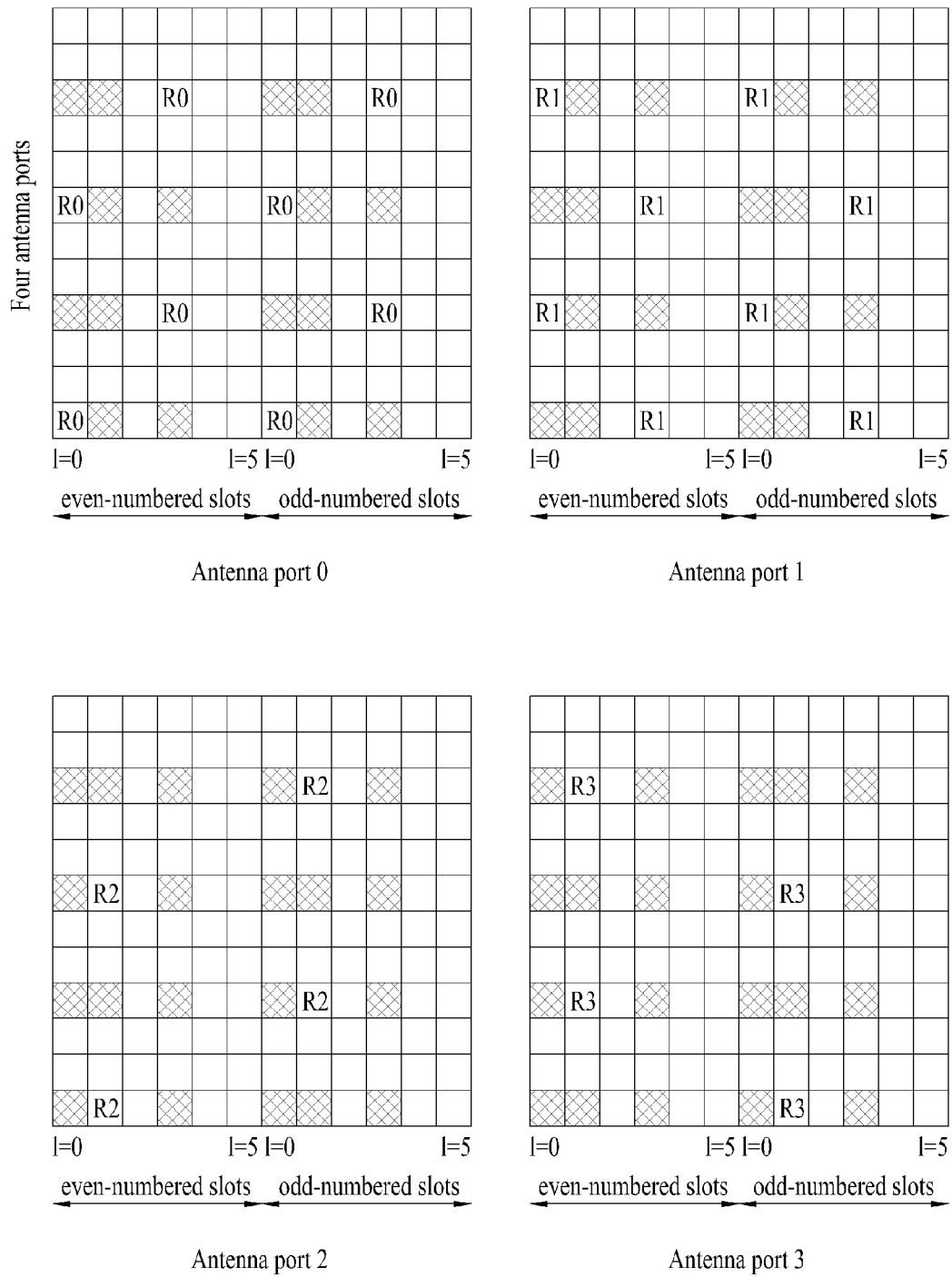
Figure 12:
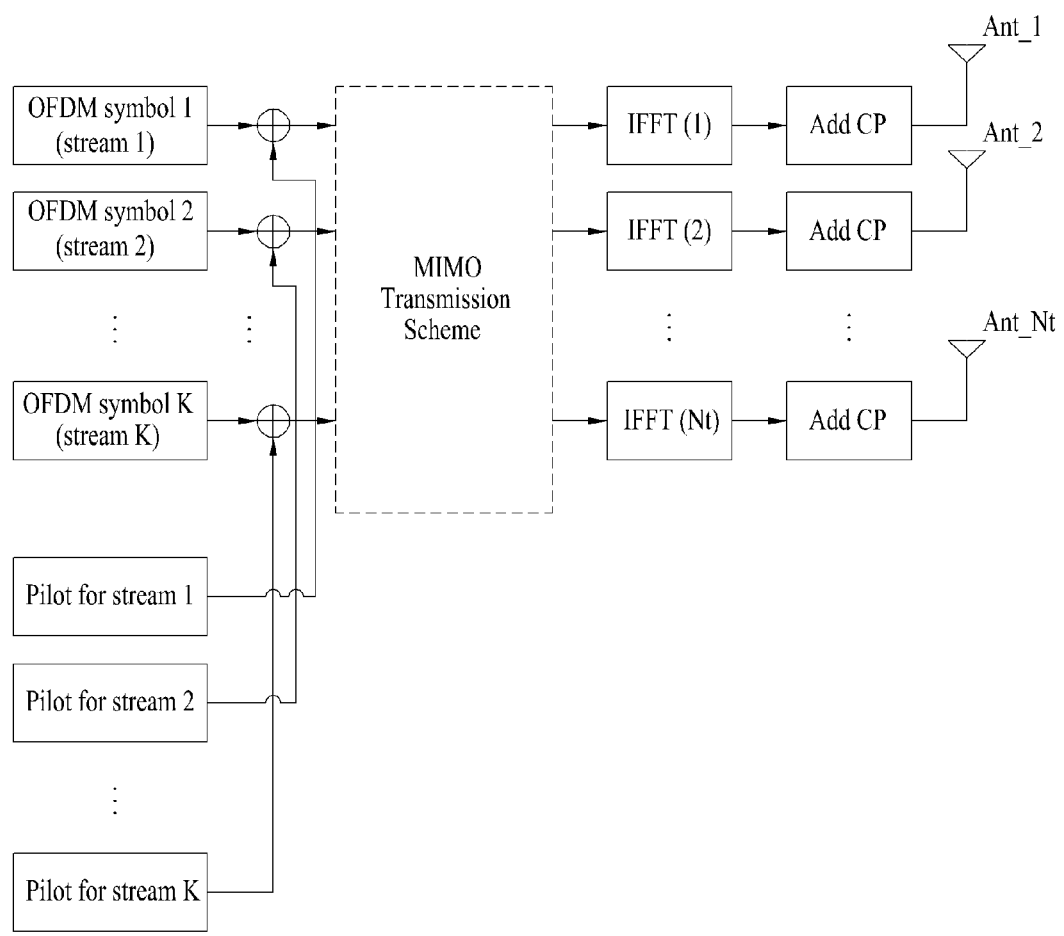
FIG. 12 illustrates a structure when UE-specific pilot symbols are used for data demodulation.

FIG. 12 illustrates a structure when UE-specific pilot symbols are used for data demodulation. It is assumed in FIG. 12 that the number of streams is K and the number of transmission antennas is Nt. It can be appreciated in FIG. 12 that, in case of pilot symbols for data demodulation, pilot symbol sequences corresponding to the number of streams or a spatial multiplexing rate (e.g. rank) are applied. Since the number of streams should always be less than the number of transmission antennas, K always has a value less than Nt. Accordingly, when K<Nt, pilot symbol overhead decreases compared with the case where pilot symbols are transmitted over every transmission antenna.

Figure 13:
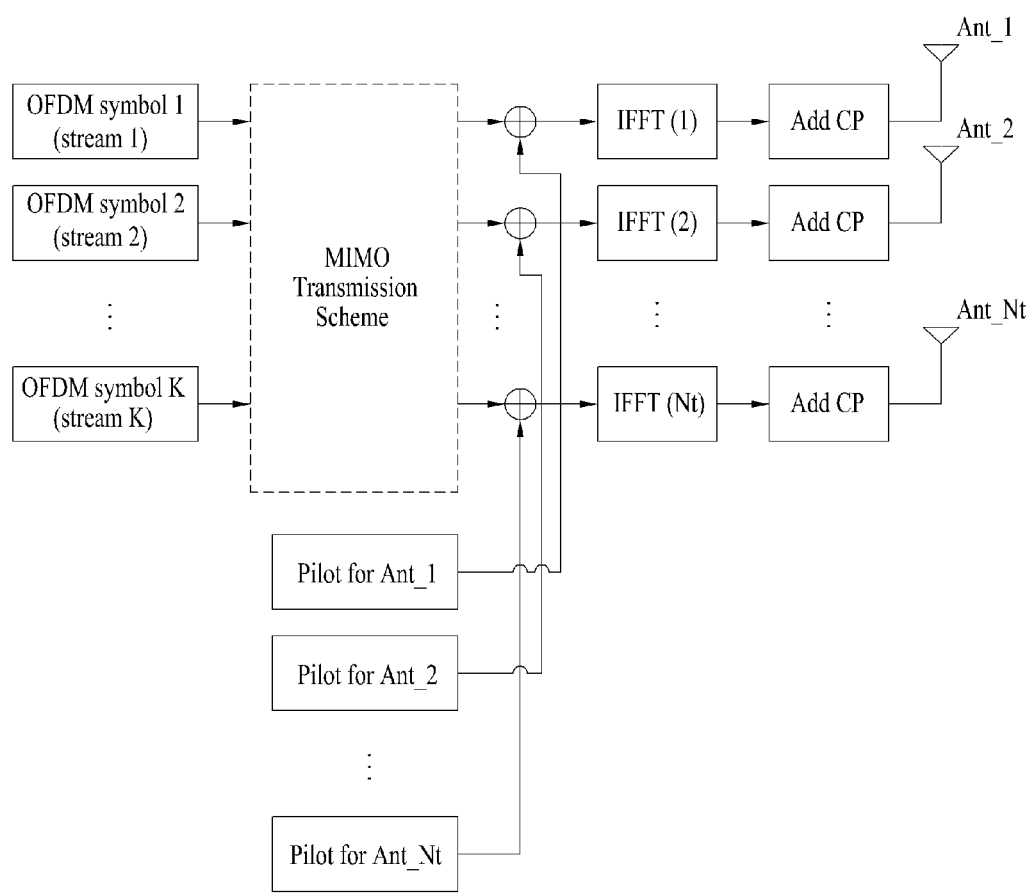
FIG. 13 illustrates a structure when UE-specific pilot symbols are used for measurement.

FIG. 13 illustrates a structure when UE-specific pilot symbols are used for measurement. The measurement includes operations of all UEs including channel state information feedback, synchronization, etc. Using the structure of FIG. 13, a channel of each physical antenna can be estimated and a MIMO scheme suited for each channel state can be applied.

It is possible to simultaneously perform demodulation and measurement by combination of the above-described two schemes or to independently perform the two schemes using the same interval or different intervals. As an alternative configuration, UE-specific pilot symbols for data demodulation may be basically transmitted and UE-specific pilot symbols for measurement may be additionally transmitted. Although the pilot symbols for measurement are specific to a UE, information about the pilot symbols for measurement may be transmitted through a broadcast channel as additional information or a specific time/frequency resource may be previously determined, so that other UEs use the pilot symbols for measurement. Cell-specific pilot symbols are transmitted using the scheme shown in FIG. 13.

Figure 14:
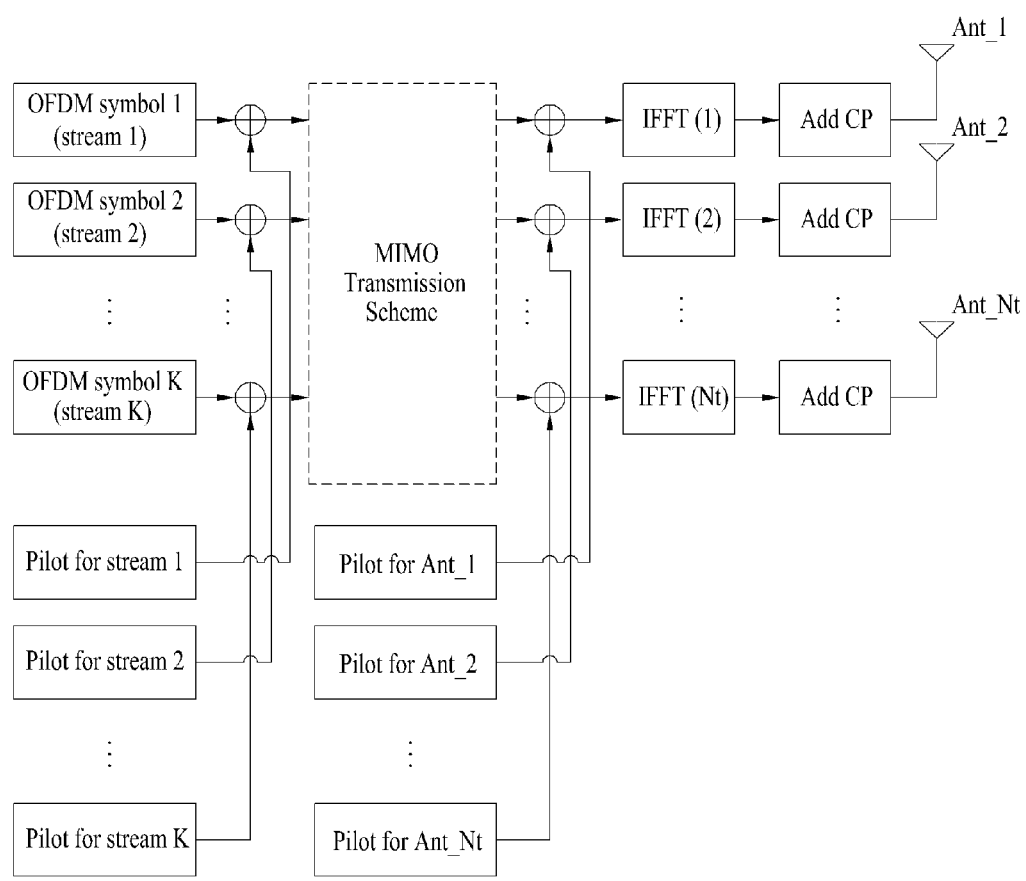
FIG. 14 illustrates a structure when a scheme using UE-specific pilot symbols for data demodulation and a scheme using UE-specific pilot symbols for measurement are combined.

FIG. 14 illustrates a structure when a scheme using UE-specific pilot symbols for data demodulation and a scheme using UE-specific pilot symbols for measurement are combined. When the two schemes are combined as shown in FIG. 14, pilot symbol overhead can be minimized and performance can be maximized.

When UE-specific pilot symbols for demodulation are transmitted, the number of pilot symbols in a UE-specific pilot symbol interval may vary according to the number of streams (or a spatial multiplexing rate or rank). That is, cell-specific pilot symbols R0' to R3' are configured to transmit pilot symbols R0' (1Tx), R0' and R1' (2Tx), R0' to R3' (4Tx) according to the number of transmission antennas transmitted to a Physical Broadcasting Channel (PBCH). When transmitting UE-specific pilot symbols for demodulation, only the pilot symbols of the same number as a spatial multiplexing rate are configured to be transmitted.

A MIMO scheme used for data transmission for each UE is applied to the UE-specific pilot symbols. In addition, in case of transmission of the UE-specific pilot symbols for measurement, all UE-specific pilot symbols are transmitted and the MIMO scheme used for data transmission is not applied to UE-specific pilot symbols for measurement.

Figure 15:
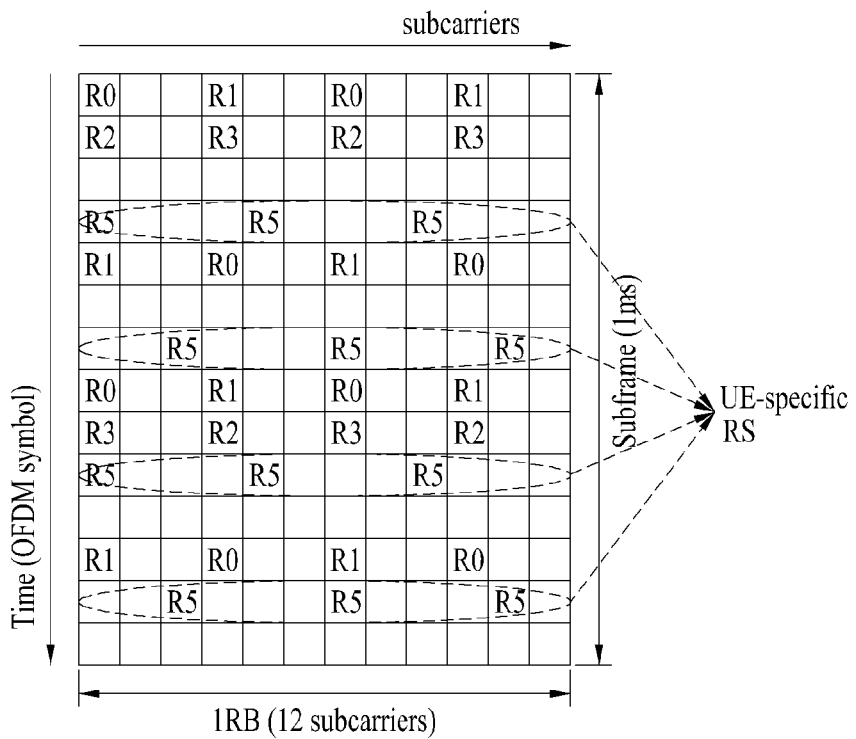
FIG. 15 illustrates a pilot symbol pattern configured to transmit both cell-specific pilot symbols of four transmission antennas and UE-specific pilot symbols.

FIG. 15 illustrates a pilot symbol pattern configured to transmit both cell-specific pilot symbols of four transmission antennas and UE-specific pilot symbols. As shown in FIG. 15, an existing UE-specific pilot symbol R5 is transmitted in a PDSCH for data transmission together with cell-specific pilot symbols R0 to R3. The cell-specific pilot symbols are always transmitted irrespective of a spatial multiplexing rate of a UE and a MIMO scheme used for data transmission is not applicable thereto. Accordingly, in order to transmit pilot symbols of a more number of transmission antennas using the pilot symbol structure, only UE-specific pilot symbols may be configured to be transmitted in the PDSCH region, thus reducing pilot overhead.

Figure 16:
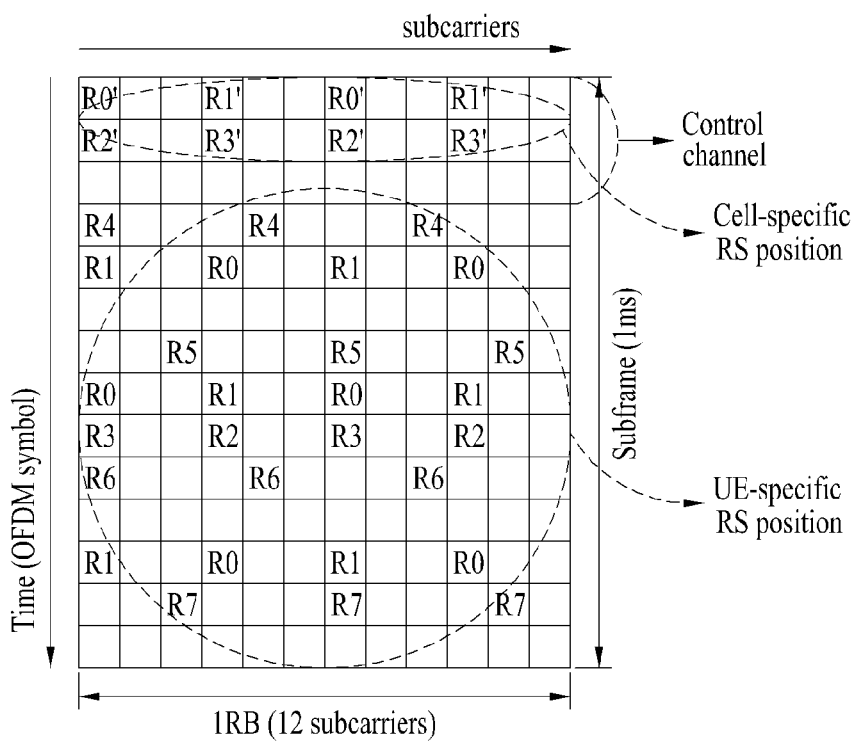
FIG. 16 illustrates a pilot symbol pattern configured to construct all pilot symbols of a PDSCH region with UE-specific pilot symbols.

FIG. 16 illustrates a pilot symbol pattern configured to construct all pilot symbols of a PDSCH region with UE-specific pilot symbols. In FIG. 16, R0' to R3' represent cell-specific pilot symbols and R0 to R7 represent UE-specific pilot symbols. If the UE-specific pilot symbols R0 to R7 are used for measurement, R0 to R3 may be transmitted in the same form as R0' to R3'. That is, the cell-specific pilot symbols R0' to R3' are transmitted with the same form irrespective of a subframe structure, and a MIMO scheme may or may not be applied to the UE-specific pilot symbols R0 to R7 depending on whether R0 to R7 are for demodulation or for measurement. Whether R0 to R7 are for demodulation or for measurement may depend on a subframe or a frequency/time domain. Information about time or frequency domain for measurement purpose may be previously notified or may be periodically transmitted every subframe or during a specific time duration. Namely, since there is no need to transmit pilot symbols for measurement every subframe, it is possible to set the pilot symbols to be transmitted during a specific time duration or in a specific frequency domain. The time duration may be configured in units of subframes or radio frames and the frequency domain may be configured in units of RBs or subbands. All UEs can determine that pilot symbols for measurement are located in a specific RB or subband and information about this frequency domain may be previously notified through a broadcast or upper layer signal.

Figure 17:
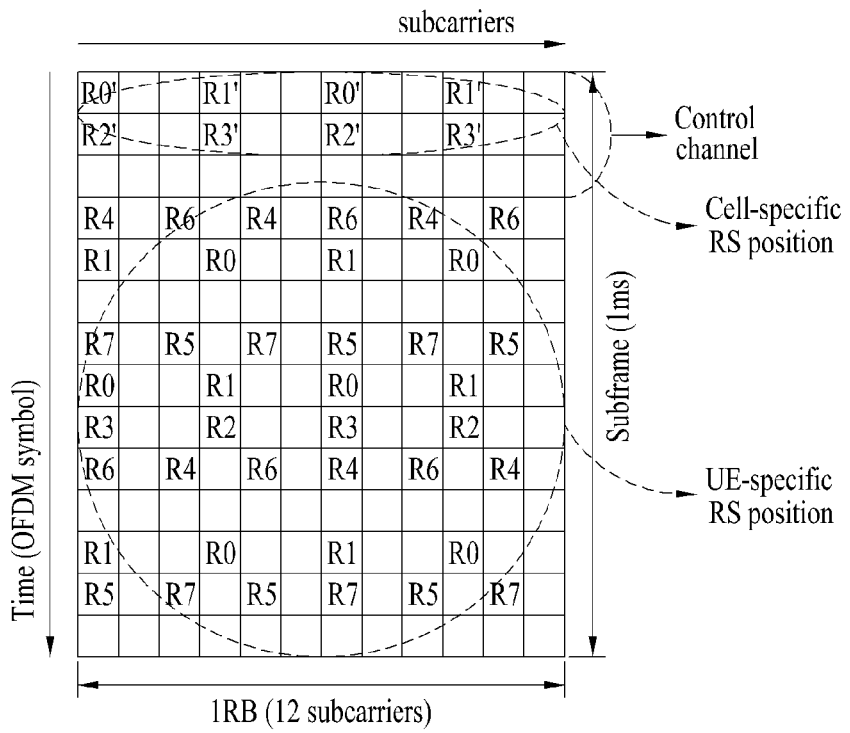
FIG. 17 illustrates a pilot symbol pattern configured to increase channel estimation performance by adding pilot symbols to the pilot pattern of FIG. 16.

FIG. 17 illustrates a pilot symbol pattern configured to increase channel estimation performance by adding pilot symbols to the pilot pattern of FIG. 16. In FIG. 17, the positions of R4 to R7 may be changed. However, the positions of UE-specific pilot symbols are desirably fixed.

Figure 18:
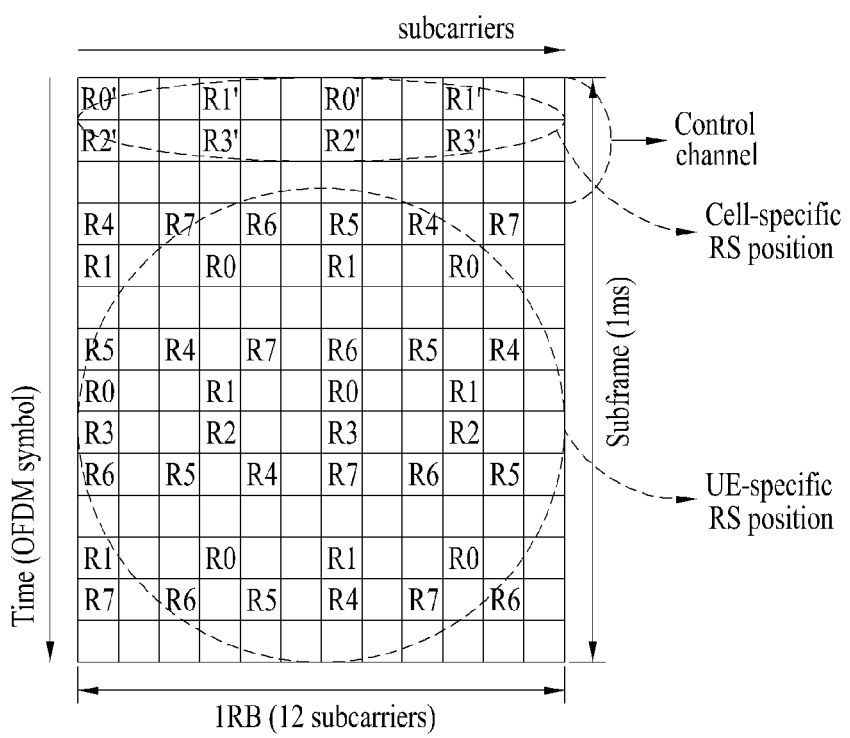
FIGS. 18 and 19 illustrate pilot symbol patterns in which the positions of R4 to R7 are changed from the pilot pattern of FIG. 17.
Figure 19:
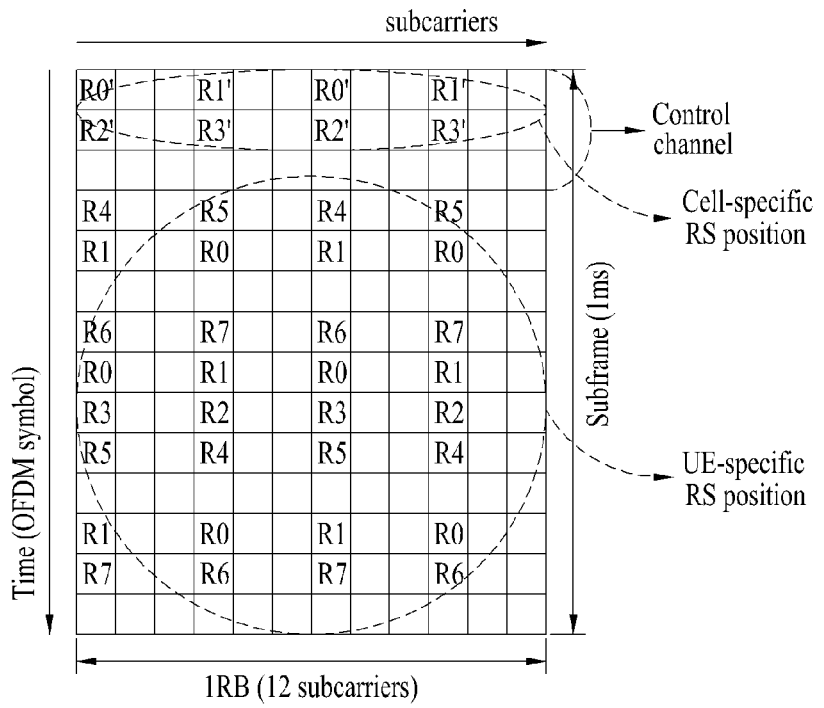

FIGS. 18 and 19 illustrate pilot symbol patterns in which the positions of R4 to R7 are changed based on the pilot pattern of FIG. 17. As shown in FIGS. 18 and 19, the positions of the pilot symbols R4 to R7 may be changed.

Pattern Indication Method of UE-Specific Pilot Symbol

Pilot symbols for measurement and pilot symbols for demodulation may be transmitted at different intervals. An indication of which type of UE-specific pilot symbols are transmitted should be transmitted to a UE. Hereinafter, an efficient indication method will be described.

When UE-specific pilot symbols for demodulation are transmitted, the number of pilot symbols in a UE-specific pilot symbol interval may vary according to the number of streams (or a spatial multiplexing rate or rank). That is, cell-specific pilot symbols R0' to R3' are configured to transmit pilot symbols R0' (1Tx), R0' and R1' (2Tx), R0' to R3' (4Tx) according to the number of transmission antennas transmitted to a Broadcast Channel (BCH). When transmitting UE-specific pilot symbols for demodulation, only the pilot symbols of the same number as a spatial multiplexing rate are configured to be transmitted. All UE-specific pilot symbols for measurement are always transmitted irrespective of the spatial multiplexing rate, and the transmitted pilot symbols may be used by all UEs to improve estimation performance. Therefore, when two types of UE-specific pilot symbols used in the present invention are employed, system performance can be improved by indicating information about whether pilot symbols for measurement are transmitted in units of subframes or a specific time/frequency.

For example, a subframe level indication method, an RB level indication method, or a hybrid indication method combining the subframe level indication method and the RB level indication method may be considered.

The indication methods will now be described.

The subframe level indication method is to indicate a subframe in which pilot symbols for measurement are transmitted. Generally, a transmission interval of pilot symbols for measurement may be set such that pilot symbols of R0 to R7 are transmitted to all RBs in a subframe in which UEs of a specific group are the same and corresponding pilot symbols for measurement are transmitted. It is possible to transmit R0 to R3 in the same form of R0' to R3'.

The RB level indication method serves to indicate that pilot symbols for measurement are transmitted to a specific RB in every subframe. Accordingly, a UE of a corresponding group receives information about the RB level and may perform measurement using the pilot symbols R0 to R7.

The hybrid indication method indicates a subframe in which pilot symbols for measurement are transmitted every radio frame consisting of 10 subframes and the RB level indication method is applied only to a corresponding subframe, thereby reducing unnecessary control information. For example, an interval of a subframe in which pilot symbols for measurement are transmitted is indicated and a specific RB of a corresponding subframe including the pilot symbols for measurement is indicated to a UE. A UE group which reduces overhead of pilot symbols for measurement and uses corresponding to pilot symbols can obtain pilot information for measurement in a determined time/frequency domain.

Example of Pilot Symbol Structure

The aforementioned methods may be applied to a variety of pilot symbol structures. For example, pilot symbols in three OFDM symbols (e.g. OFDM symbol indexes 0, 1, and 2) in one subframe may be used for cell-specific pilot symbols and pilot symbols in the other OFDM symbols may be used for UE-specific pilot symbols. Depending on whether pilot symbols are for demodulation or for measurement, it may be determined whether a MIMO scheme is applied, whether pilot symbols corresponding to a spatial multiplexing rate are transmitted, and all pilot symbols are to be transmitted. Hereinafter, pilot symbol structures according to an exemplary embodiment of the present invention will be described. All pilot symbols structures, which will be described hereinbelow, may be configured by the above-described methods.

Figure 20:
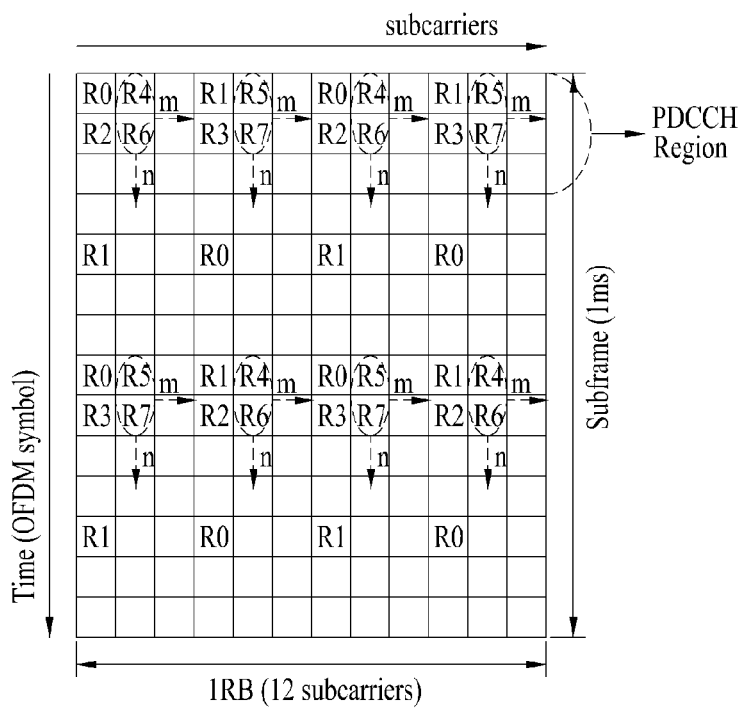
FIG. 20 illustrates a pilot symbol structure according to an exemplary embodiment of the present invention.

FIG. 20 illustrates a pilot symbol structure according to an exemplary embodiment of the present invention. In FIG. 20, pilot symbols of transmission antennas 4 to 7 may be cyclically shifted by m (where m is an integer) and may be cyclically shifted by n (where n is an integer) OFDM symbols. It can be understood that there is no degradation in channel estimation performance due to cyclic shift. For example, that pilot symbols R4 to R7 are cyclically shifted by m=1 indicates that they are cyclically shifted by one subcarrier index to the right (i.e. in a direction where a subcarrier index increases). That pilot symbols R4 to R7 are cyclically shifted by m=−1 indicates that they are cyclically shifted by one subcarrier index to the left (i.e. in a direction where a subcarrier index decreases). That pilot symbols R4 to R7 are cyclically shifted by n=1 indicates that they are cyclically shifted by one OFDM symbol index to an upper side (i.e. in a direction where an OFDM symbol index increases). That pilot symbols R4 to R7 are cyclically shifted by n=−1 indicates that they are cyclically shifted by one OFDM symbol index to a lower side (i.e. in a direction where an OFDM symbol index decreases). However, it is impossible to cyclically shift pilot symbols R4 to R7 to the positions of R0 to R3.

Now, examples of various pilot symbol structures according to an exemplary embodiment of the present invention will be descried.

Figure 21:
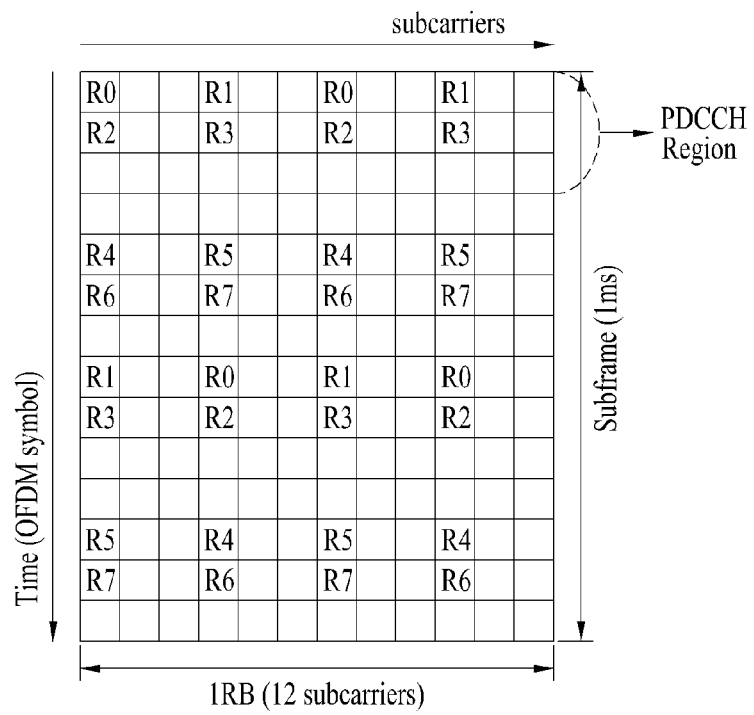
FIGS. 21 to 23 illustrate pilot symbol structures according to an exemplary embodiment of the present invention.
Figure 22:
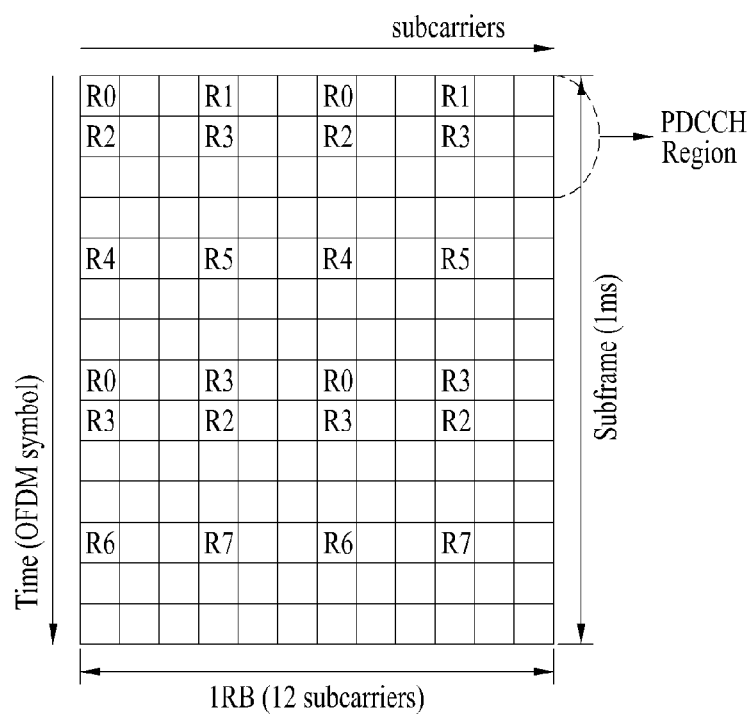

FIGS. 21 and 22 illustrate pilot symbol structures according to an exemplary embodiment of the present invention. It is possible to configure the pilot symbol structures as shown in FIGS. 21 and 22.

Figure 23:
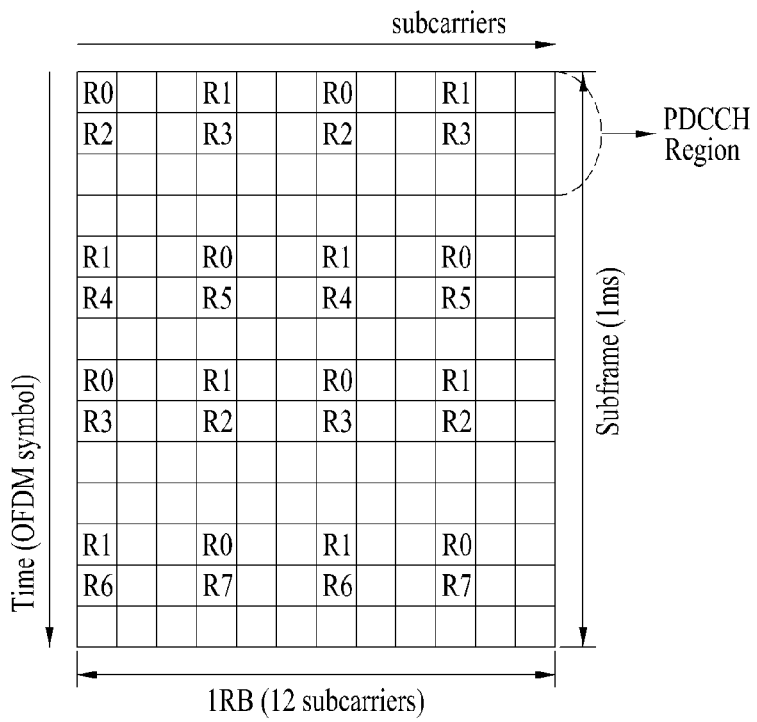

FIG. 23 illustrates a pilot symbol structure according to an exemplary embodiment of the present invention. FIGS. 24 to 38 illustrate pilot symbol structures in which pilot symbols R4 to R7 are cyclically shifted in a subcarrier direction or an OFDM symbol direction based on the pilot symbol structure of FIG. 23.

Figure 24:
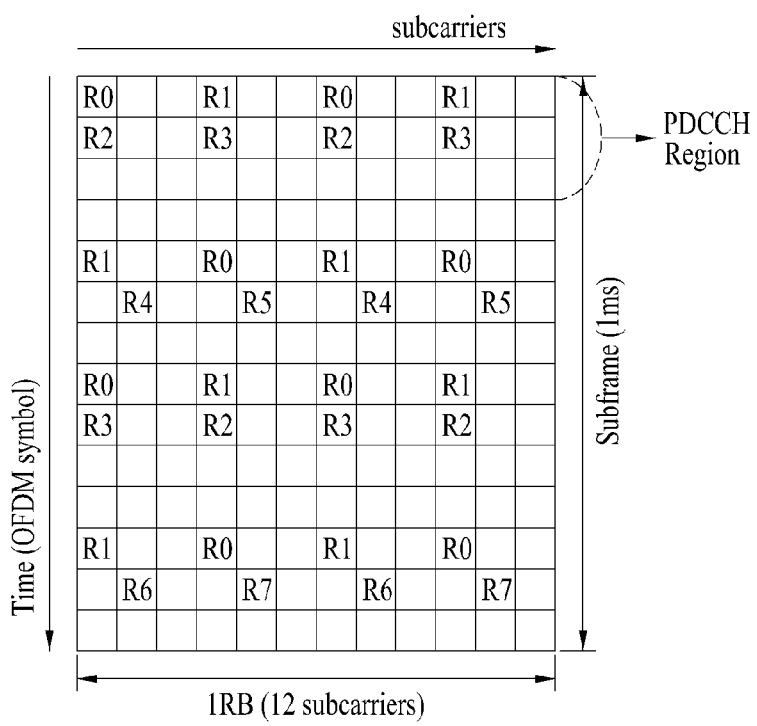
FIGS. 24 to 38 illustrate pilot symbol structures in which pilot symbols R4 to R7 are cyclically shifted in a subcarrier direction or an OFDM symbol direction based on the pilot symbol structure of FIG. 23.
Figure 25:
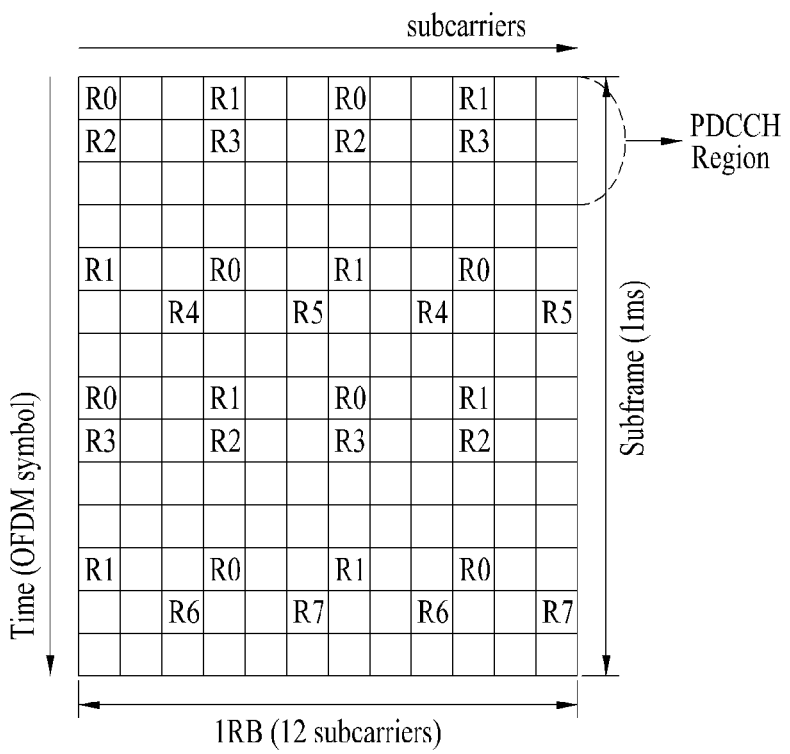
Figure 26:
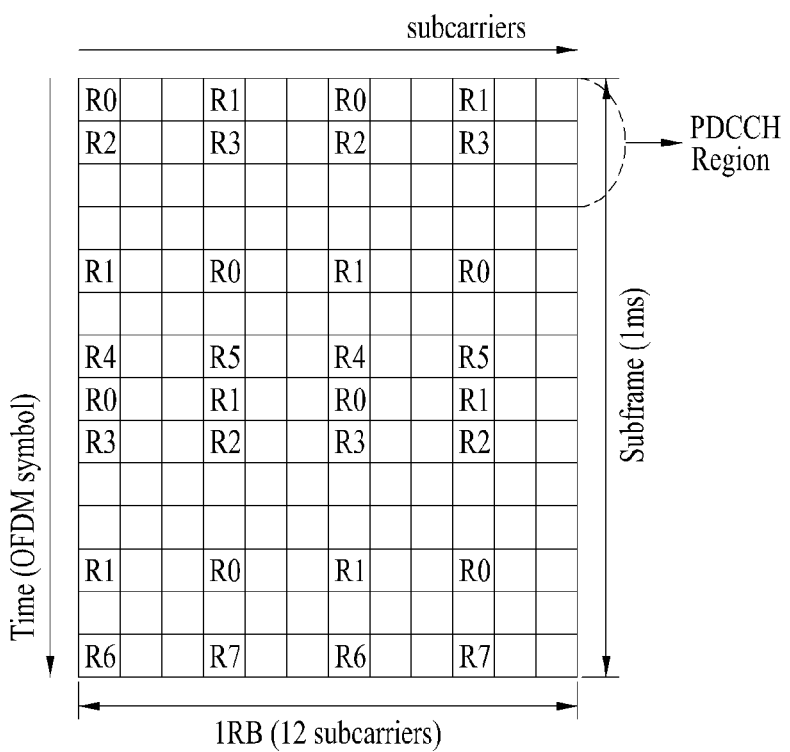
Figure 27:
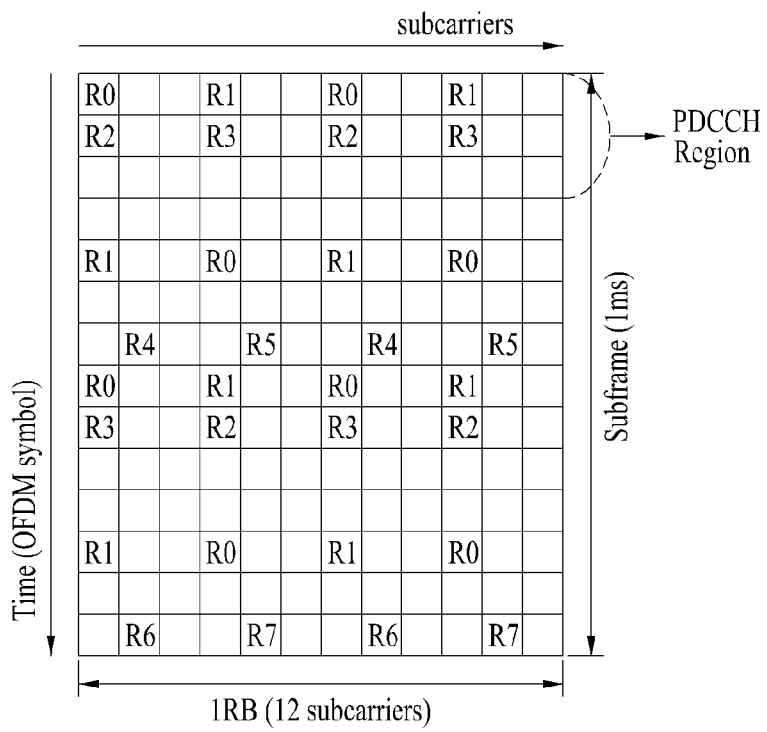
Figure 28:
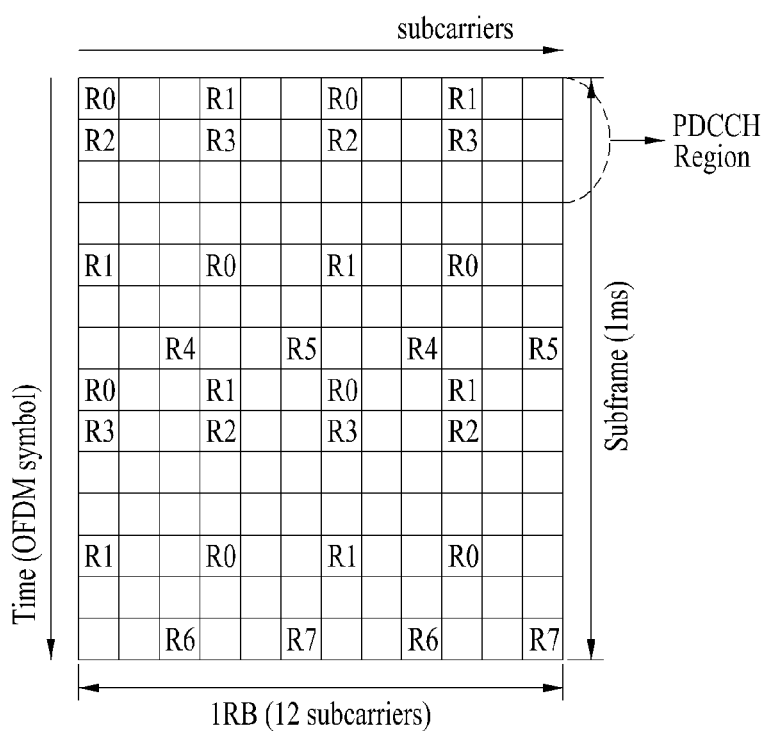
Figure 29:
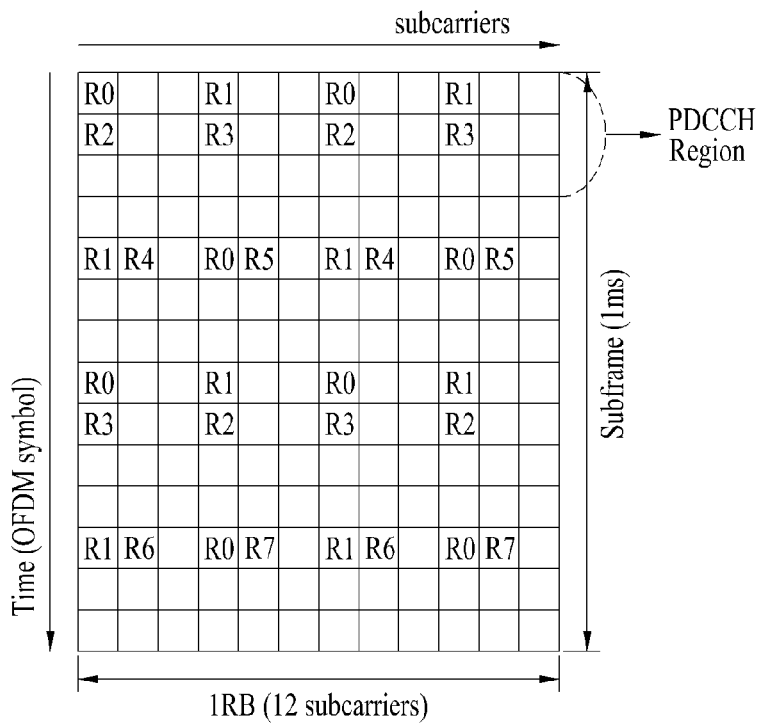
Figure 30:
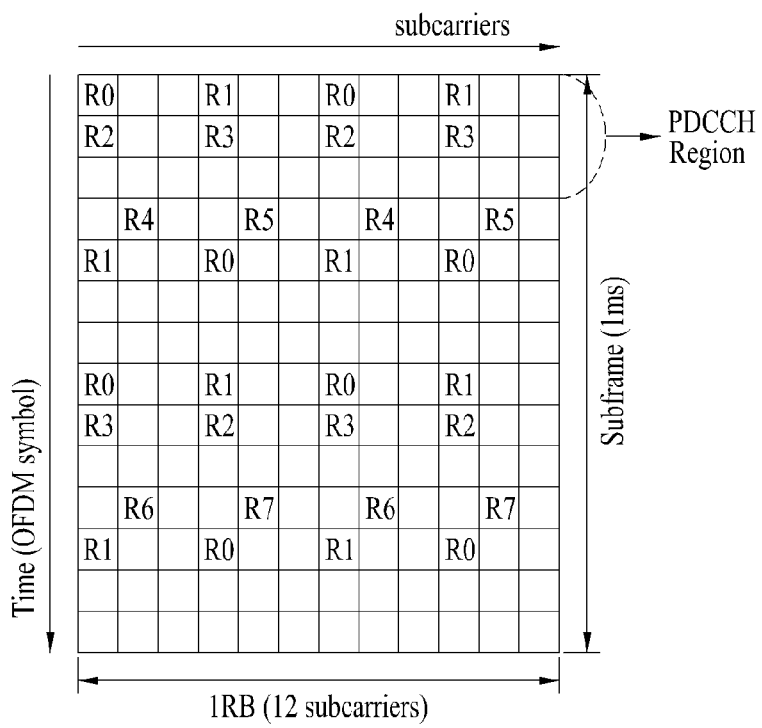
Figure 31:
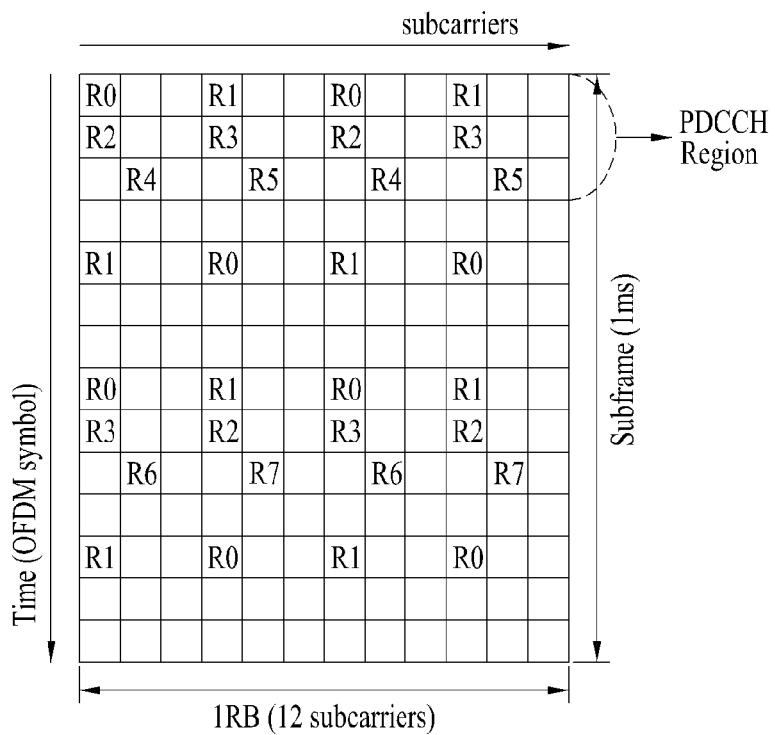
Figure 32:
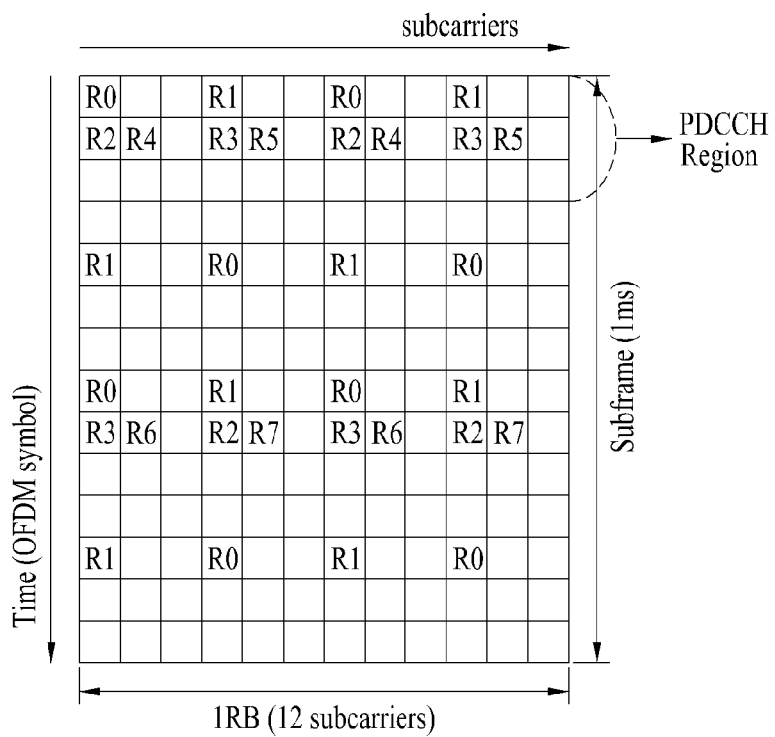
Figure 33:
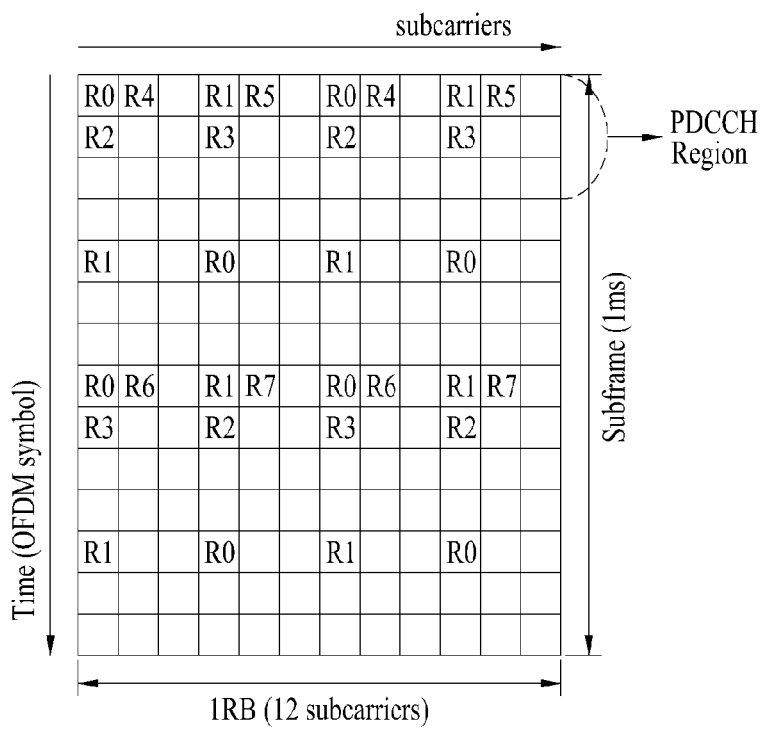
Figure 34:
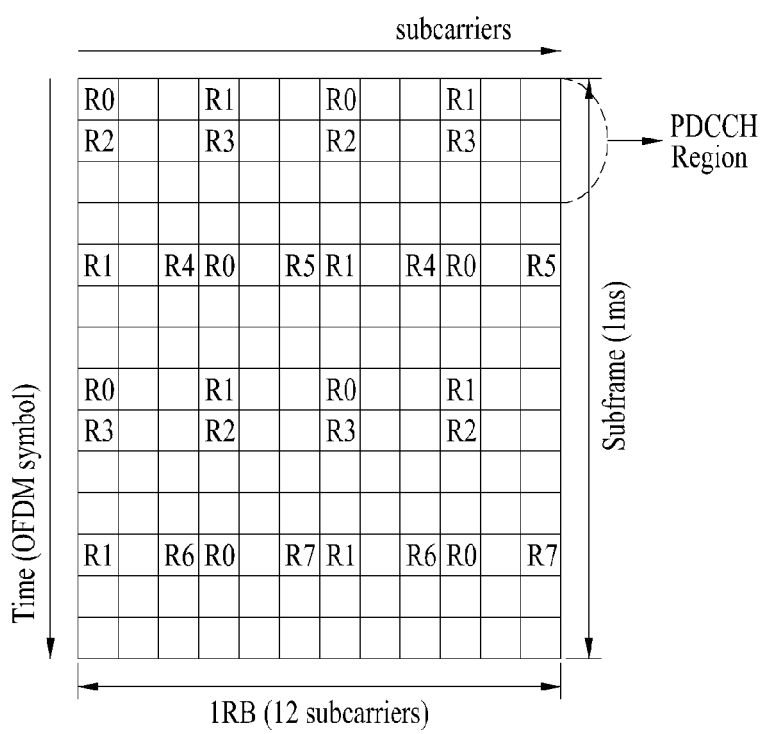
Figure 35:
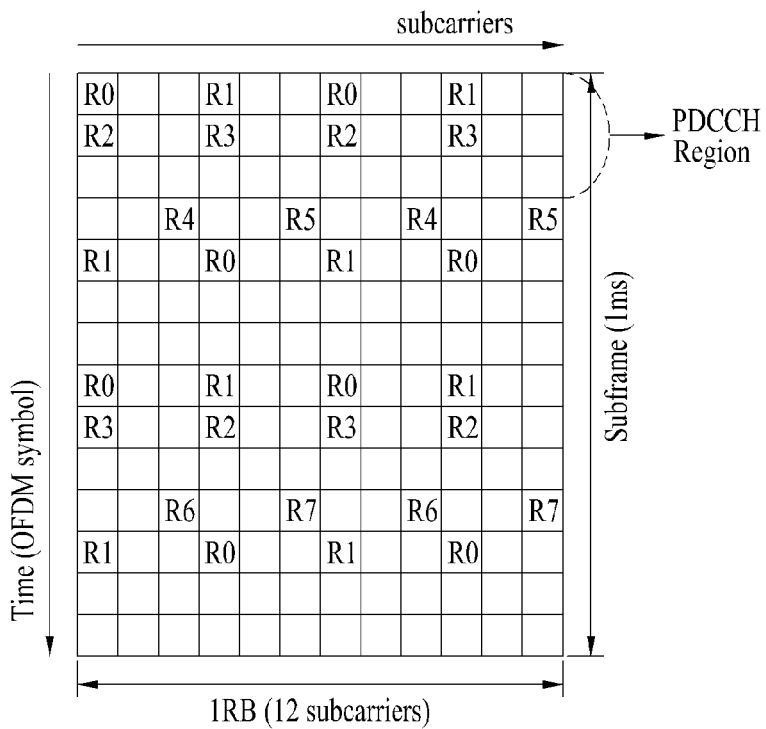
Figure 36:
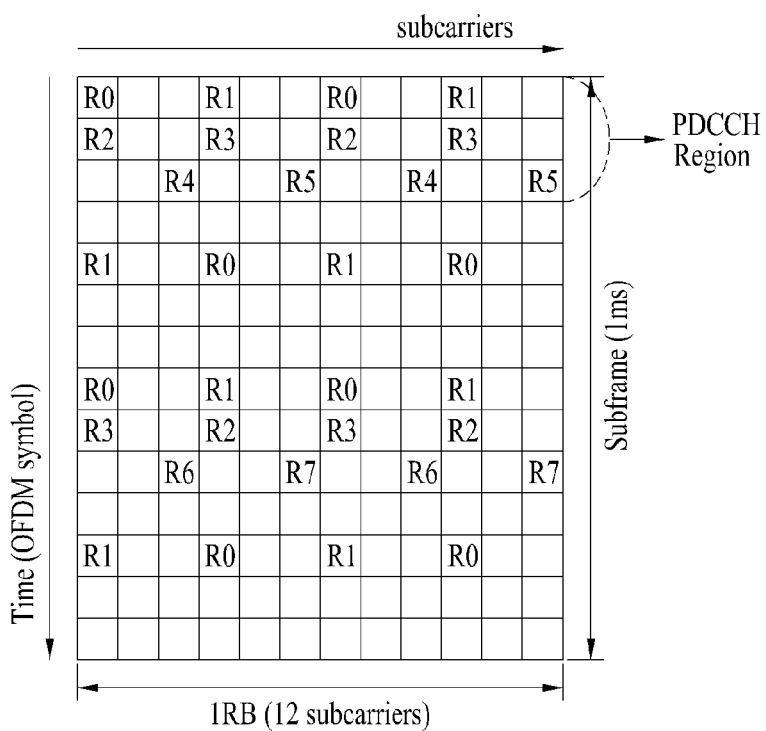
Figure 37:
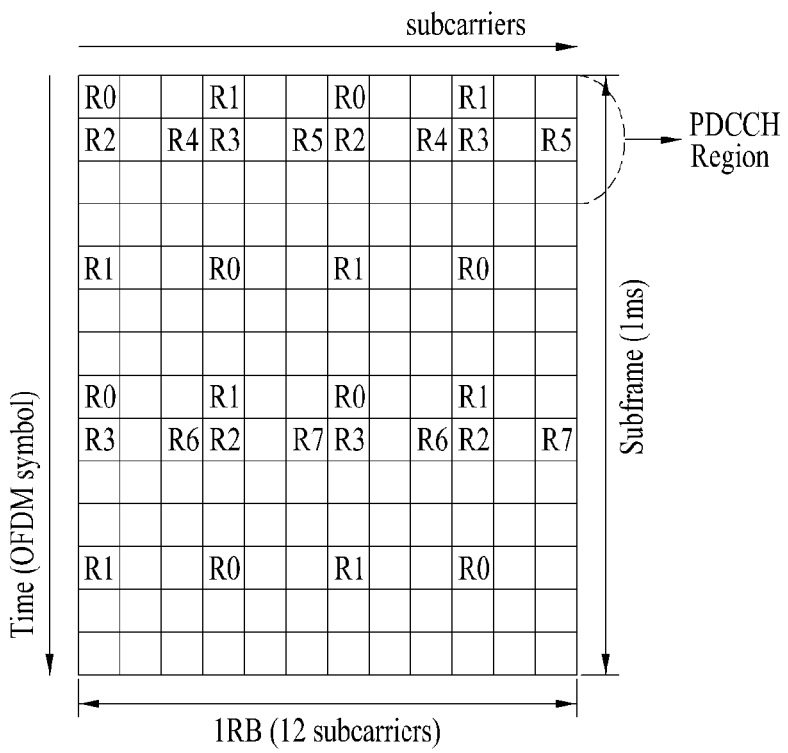
Figure 38:
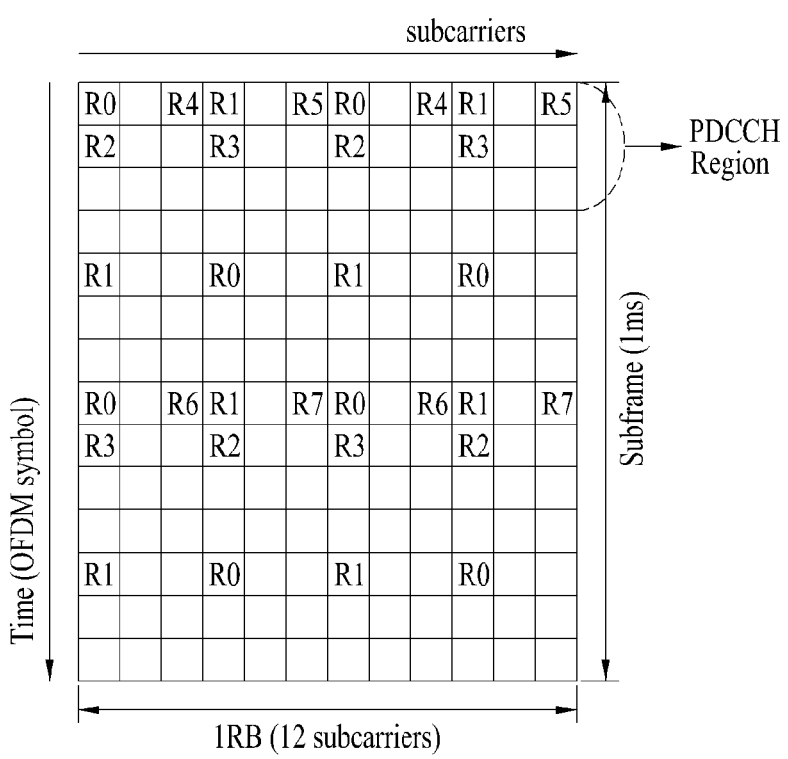

Specifically, FIG. 24 illustrates a pilot symbol structure in which pilot symbols R4 to R7 are cyclically shifted by m=1 based on the pilot symbol structure of FIG. 23; FIG. 25 illustrates a pilot symbol structure in which pilot symbols R4 to R7 are cyclically shifted by m=2 based on the pilot symbol structure of FIG. 23; FIG. 26 illustrates a pilot symbol structure in which pilot symbols R4 to R7 are cyclically shifted by n=1 based on the pilot symbol structure of FIG. 23; FIG. 27 illustrates a pilot symbol structure in which pilot symbols R4 to R7 are cyclically shifted by m=1 and n=1 based on the pilot symbol structure of FIG. 23; and FIGS. 28 to 38 illustrate pilot symbol structures in which pilot symbols R4 to R7 are cyclically shifted in a subcarrier direction or an OFDM symbol direction based on the pilot symbol structure of FIG. 23 using a method described with reference to FIG. 20.

Figure 39:
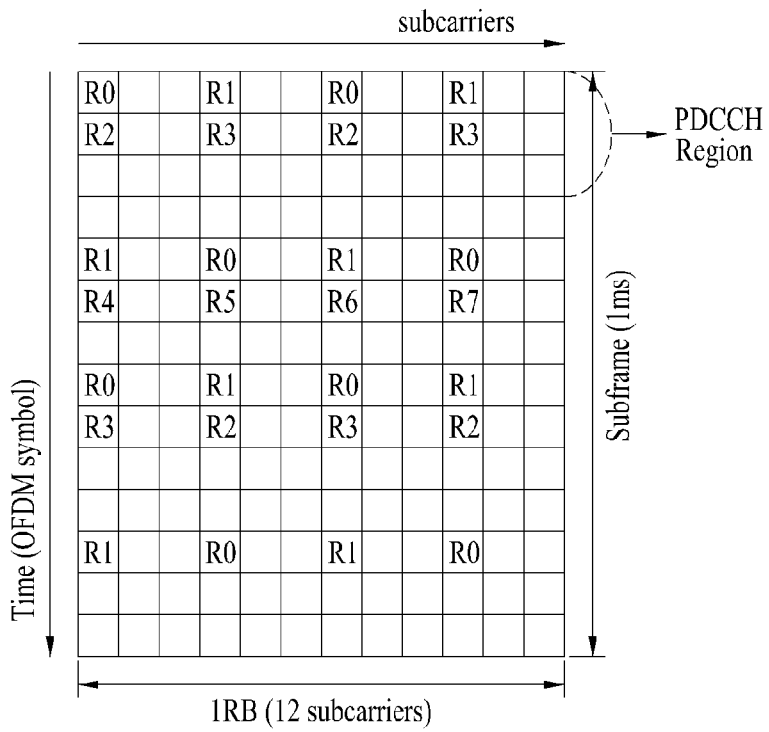
FIG. 39 illustrates a pilot symbol structure according to an exemplary embodiment of the present invention.

FIG. 39 illustrates a pilot symbol structure according to an exemplary embodiment of the present invention. FIGS. 40 to 74 illustrate pilot symbol structures in which pilot symbols R4 to R7 are cyclically shifted in a subcarrier direction or an OFDM symbol direction based on the pilot symbol structure of FIG. 39.

Figure 40:
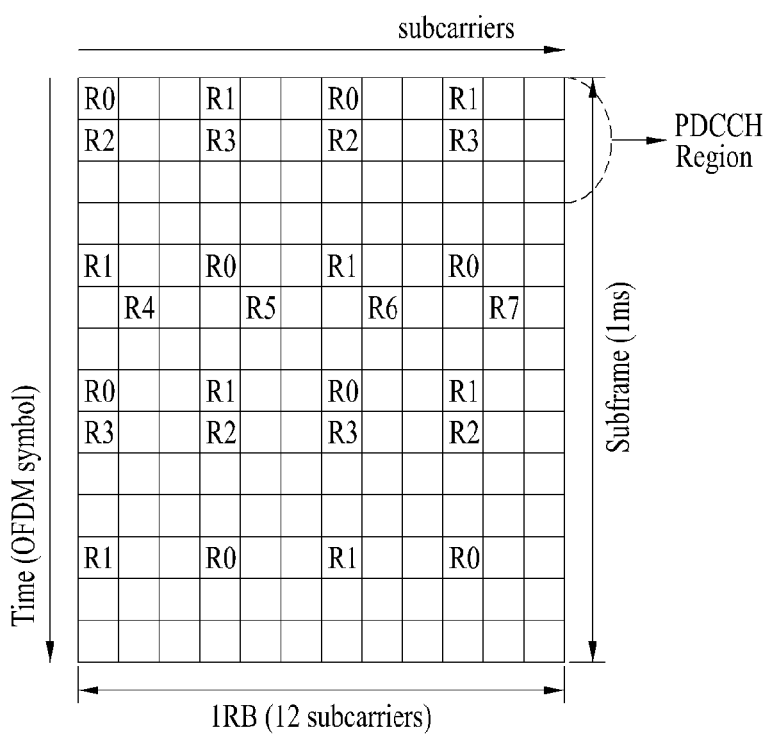
FIGS. 40 to 74 illustrate pilot symbol structures in which pilot symbols R4 to R7 are cyclically shifted in a subcarrier direction or an OFDM symbol direction based on the pilot symbol structure of FIG. 39.
Figure 41:
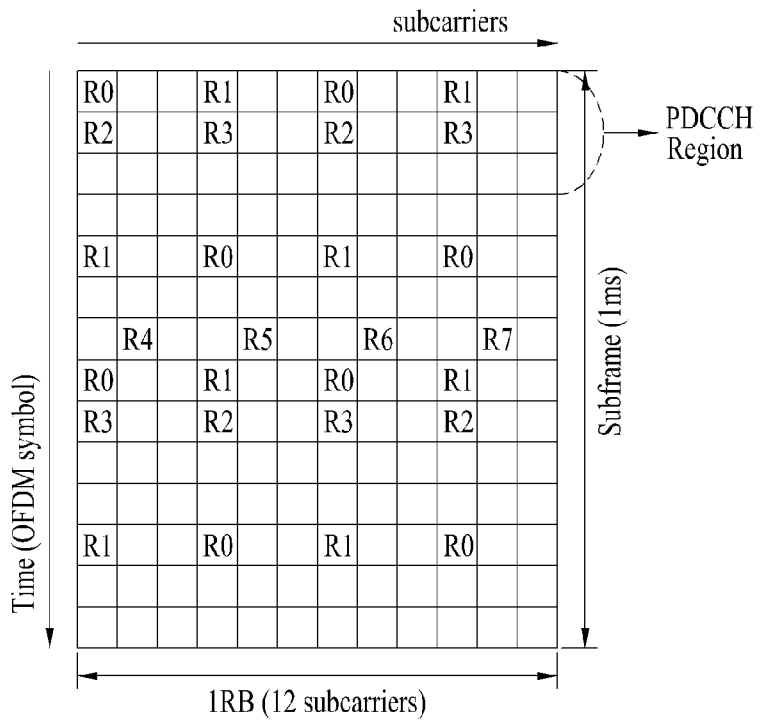
Figure 42:
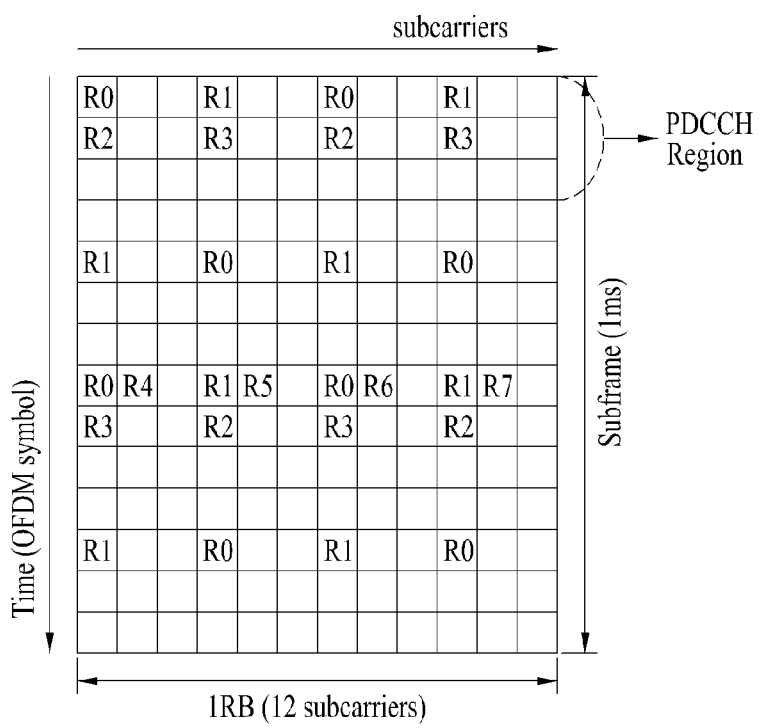
Figure 43:
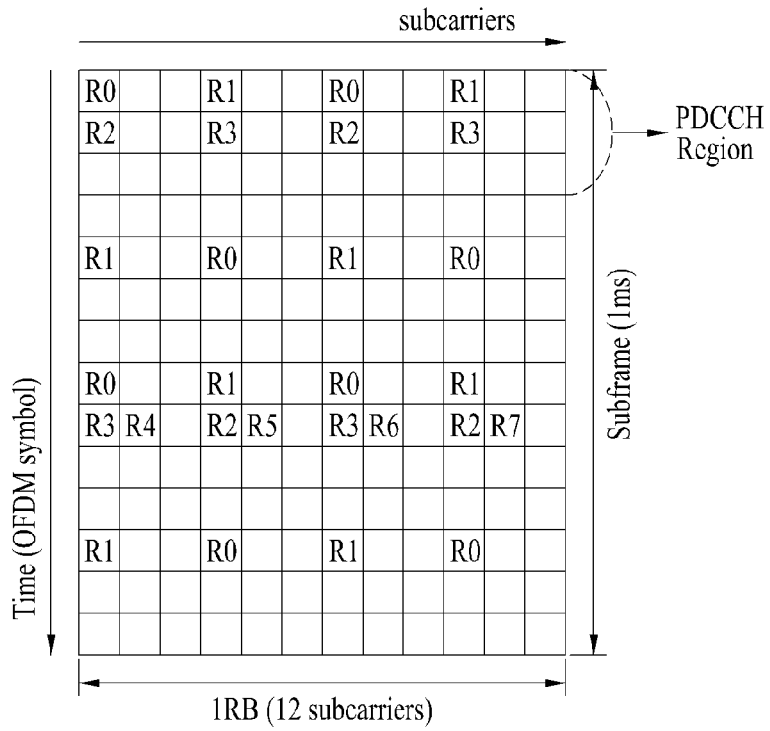
Figure 44:
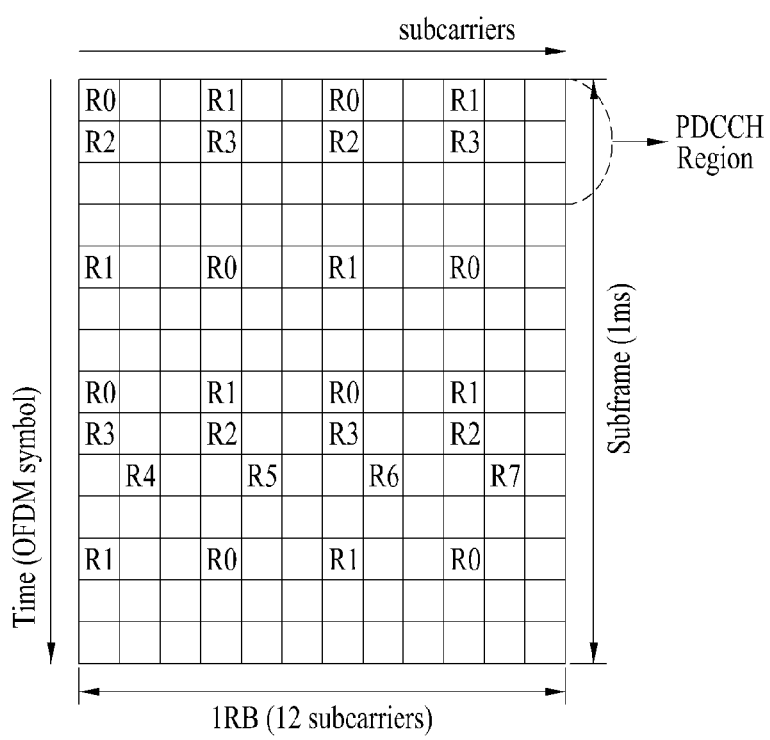
Figure 45:
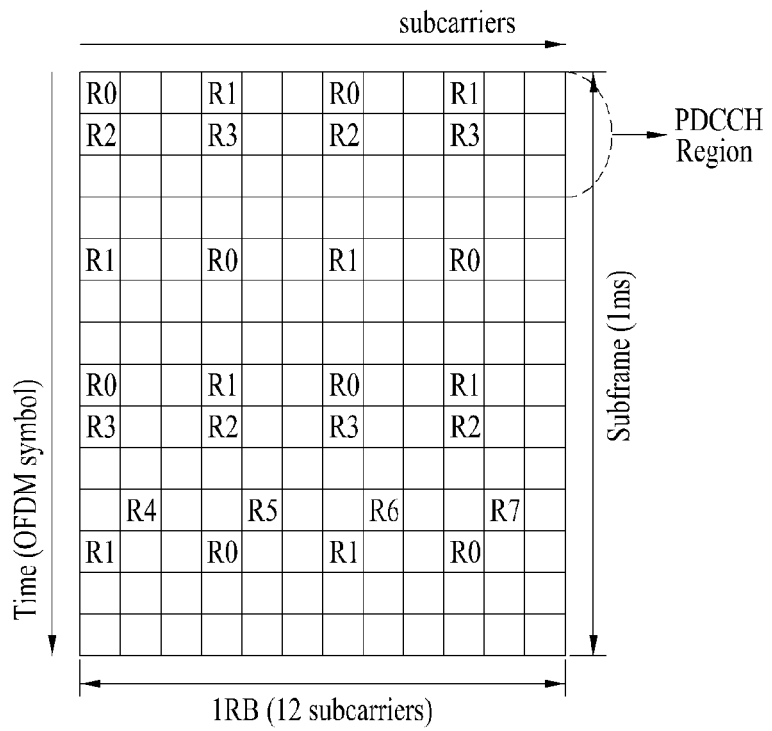
Figure 46:
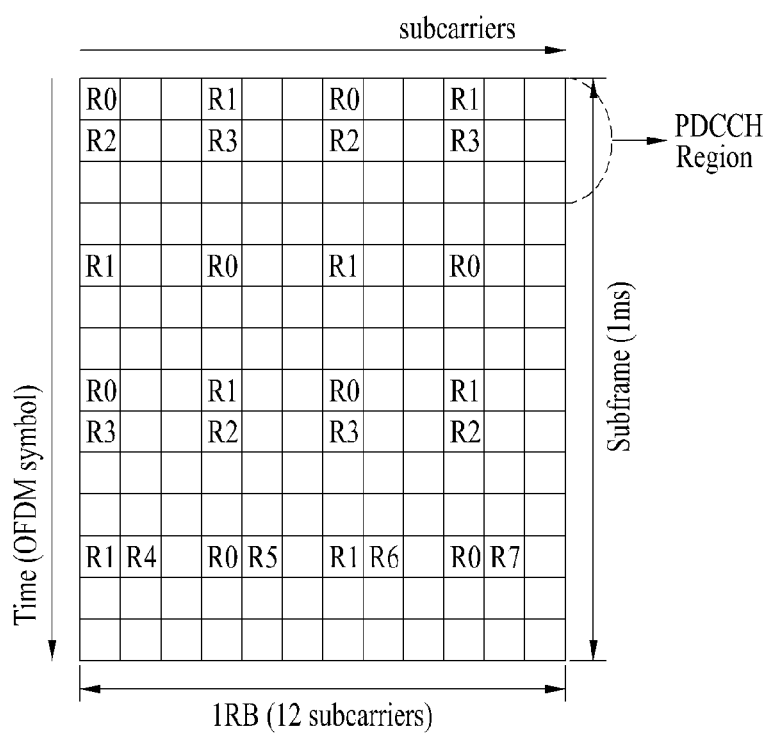
Figure 47:
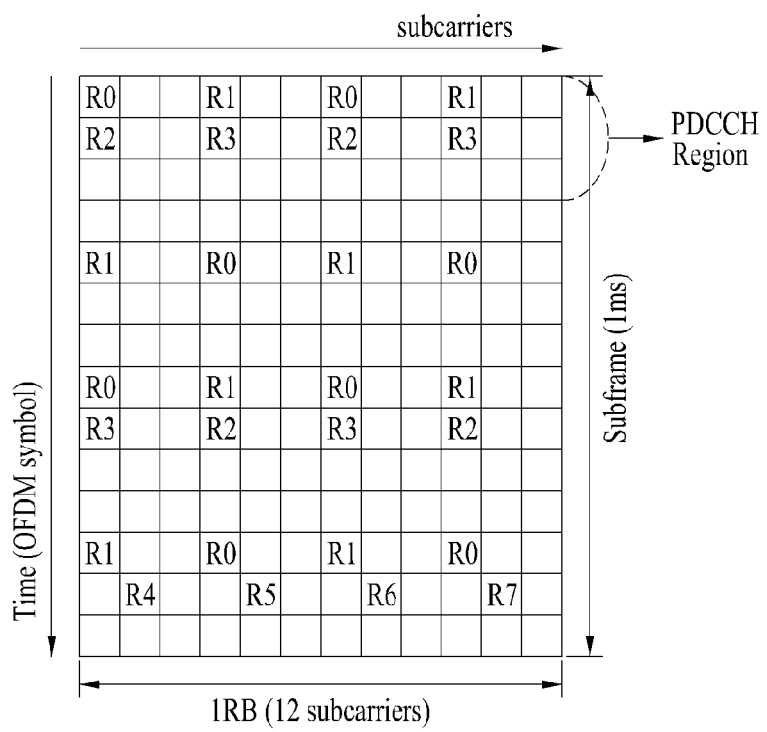
Figure 48:
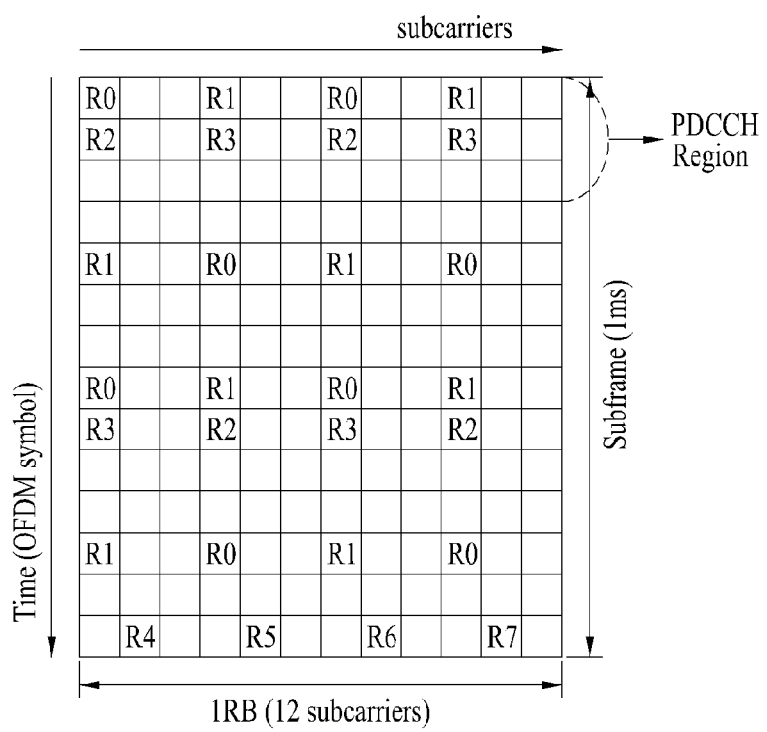
Figure 49:
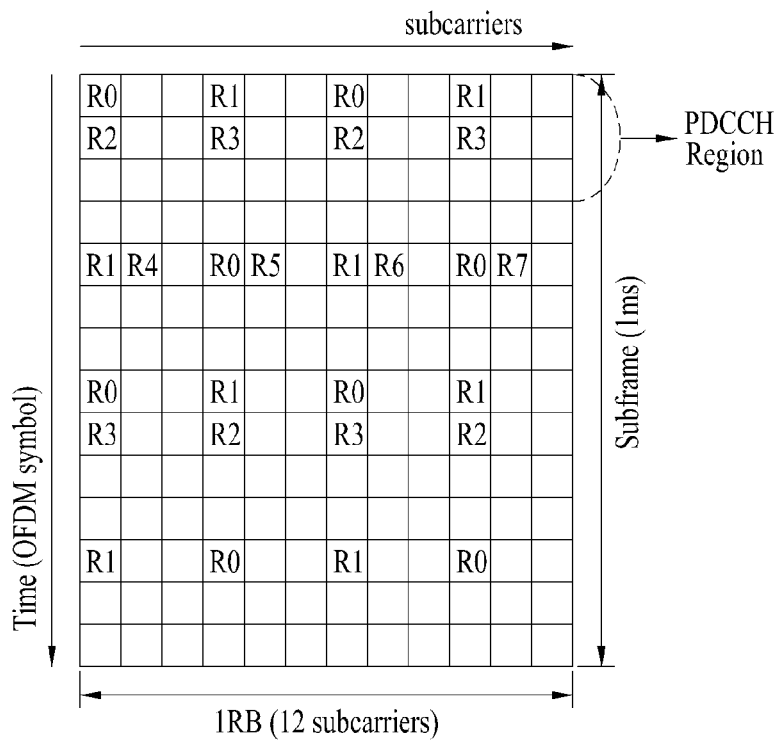
Figure 50:
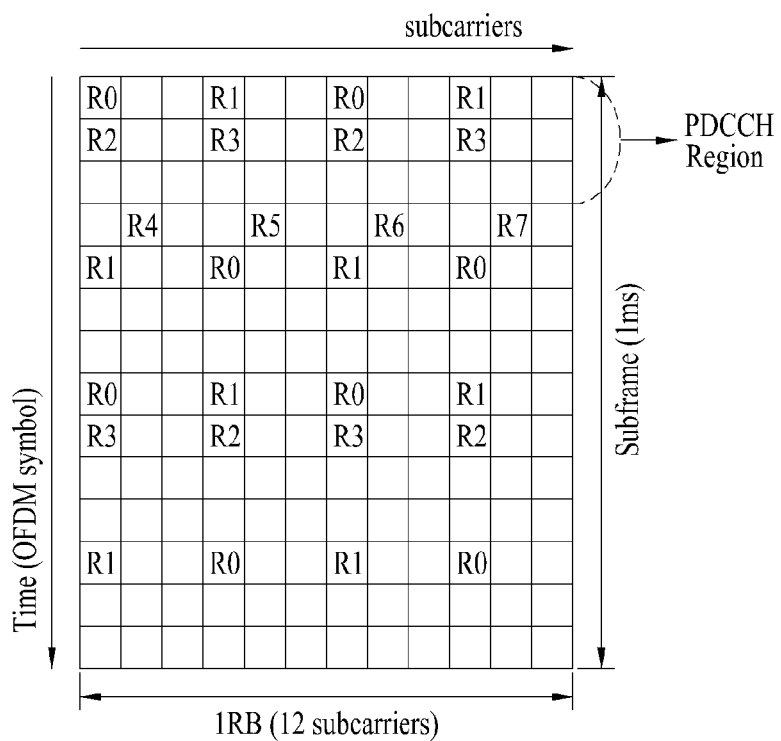
Figure 51:
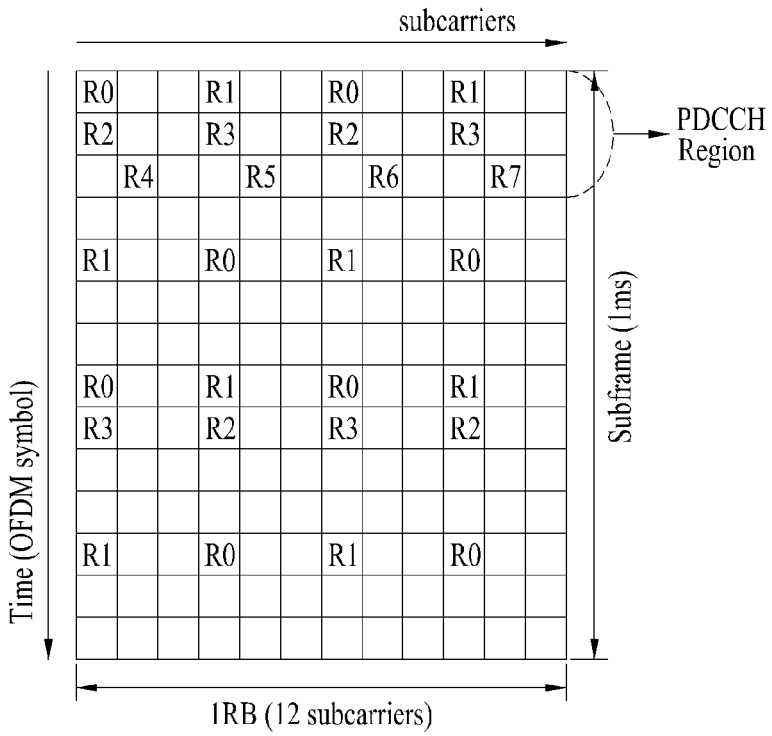
Figure 52:
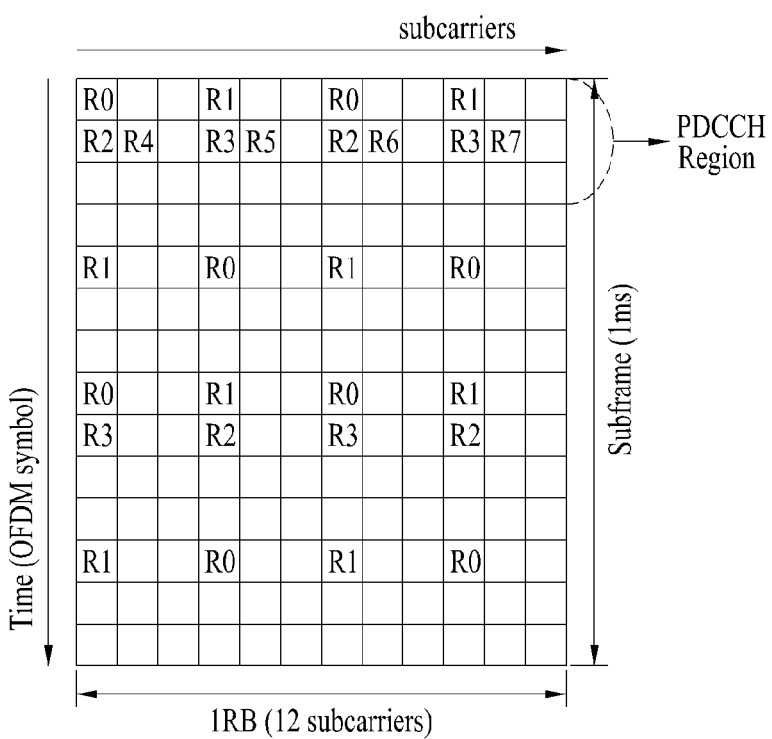
Figure 53:
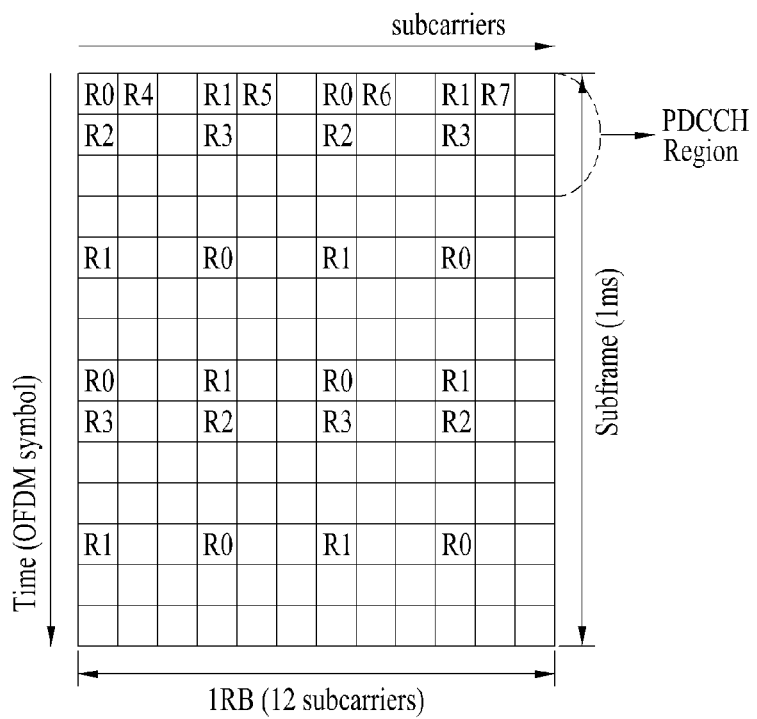
Figure 54:
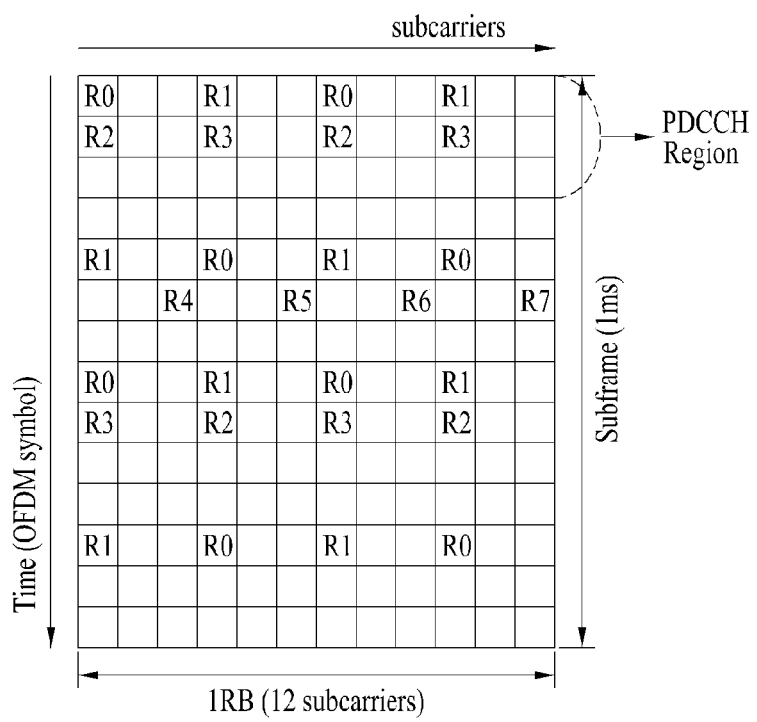
Figure 55:
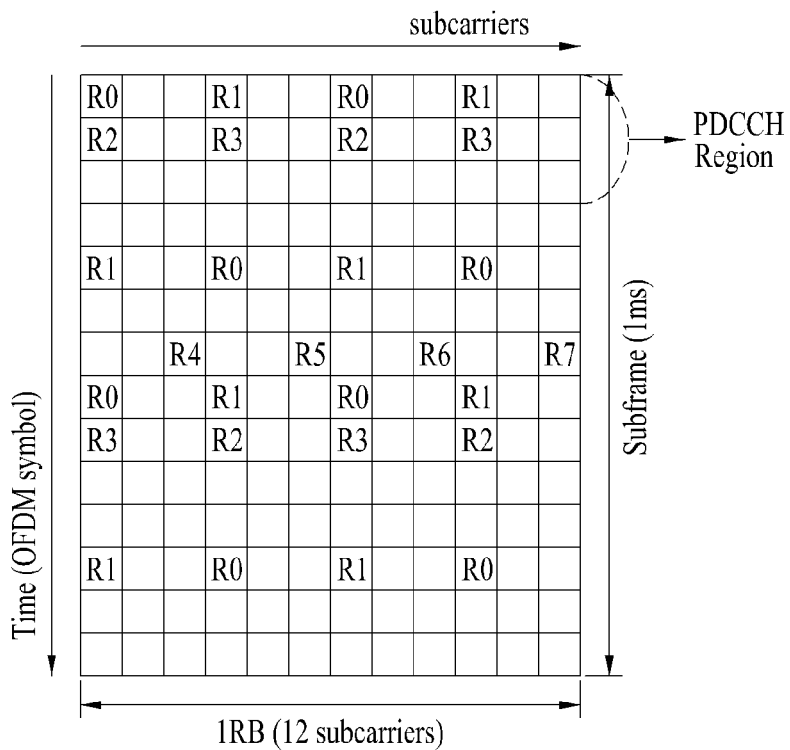
Figure 56:
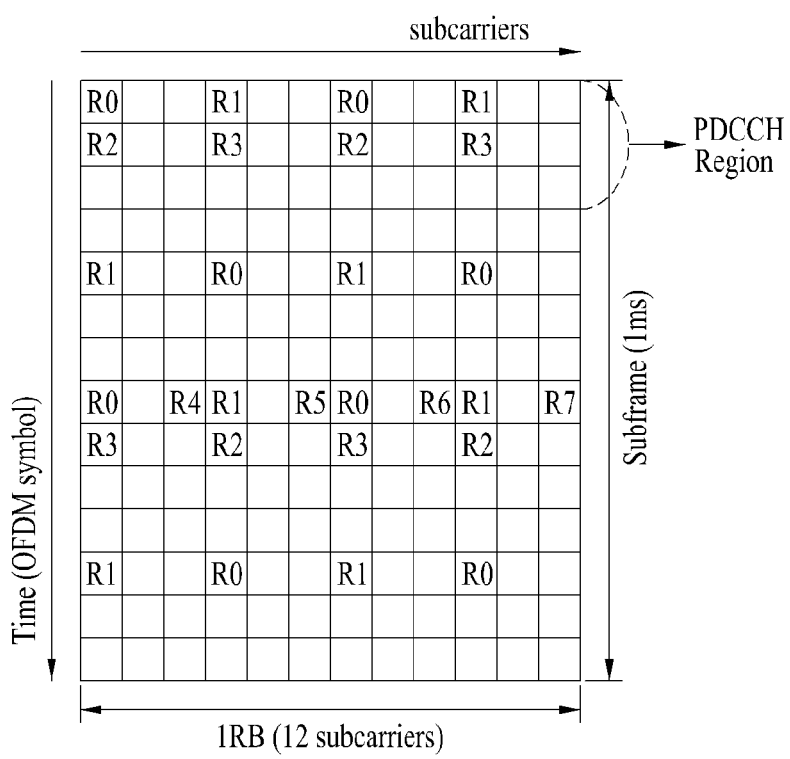
Figure 57:
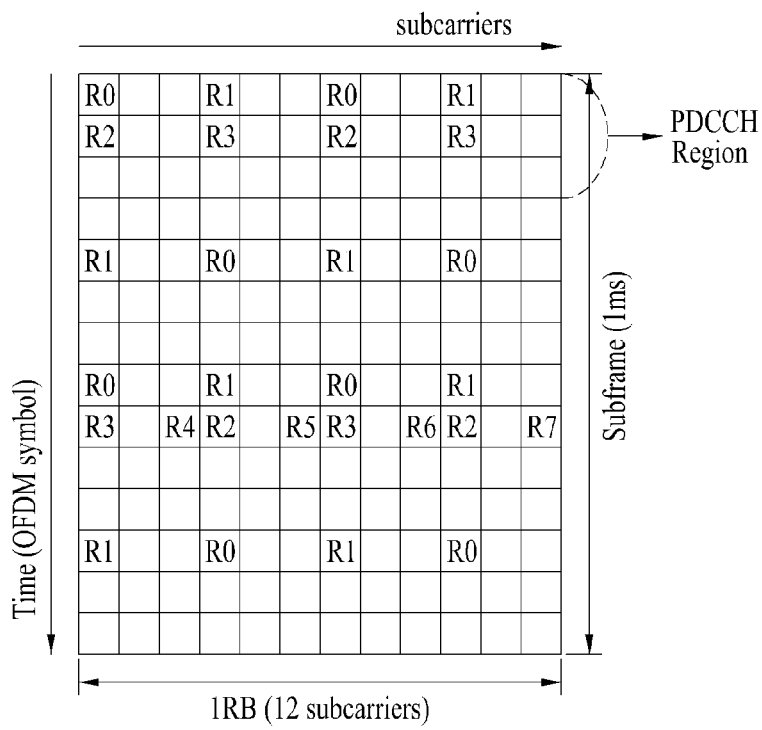
Figure 58:
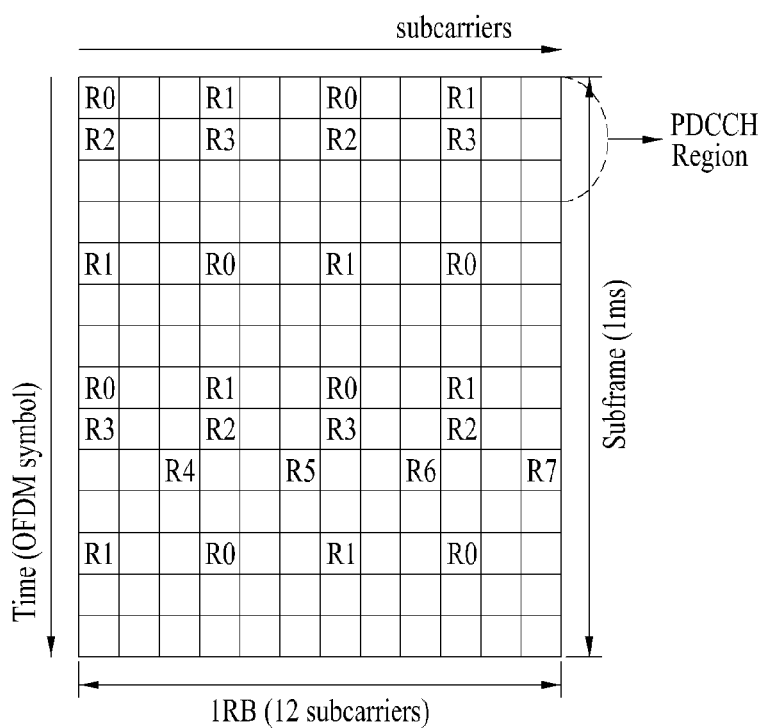
Figure 59:
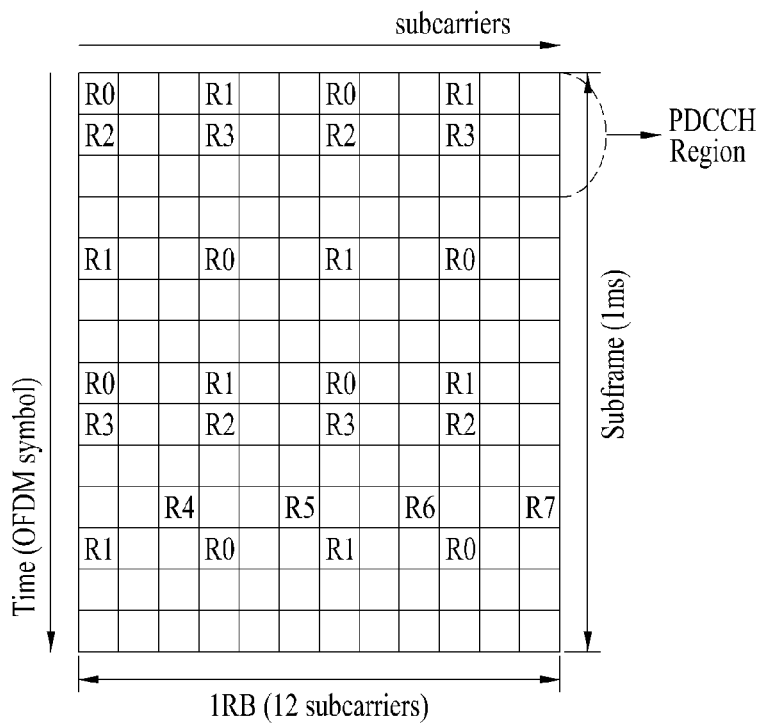
Figure 60:
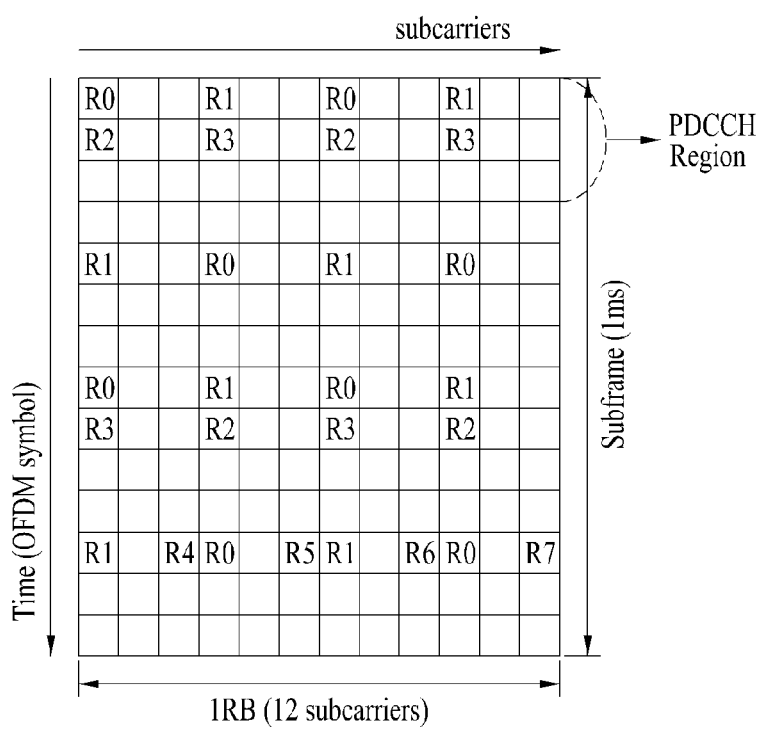
Figure 61:
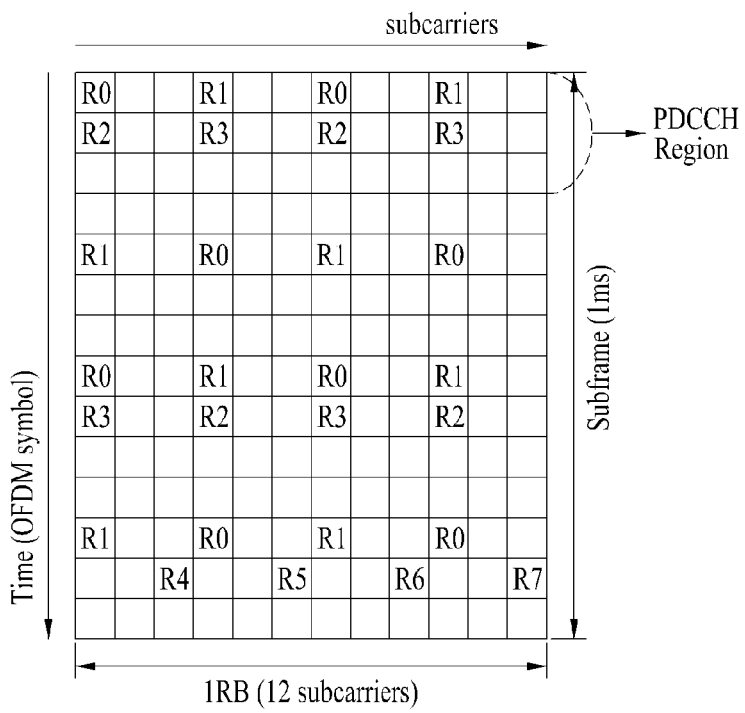
Figure 62:
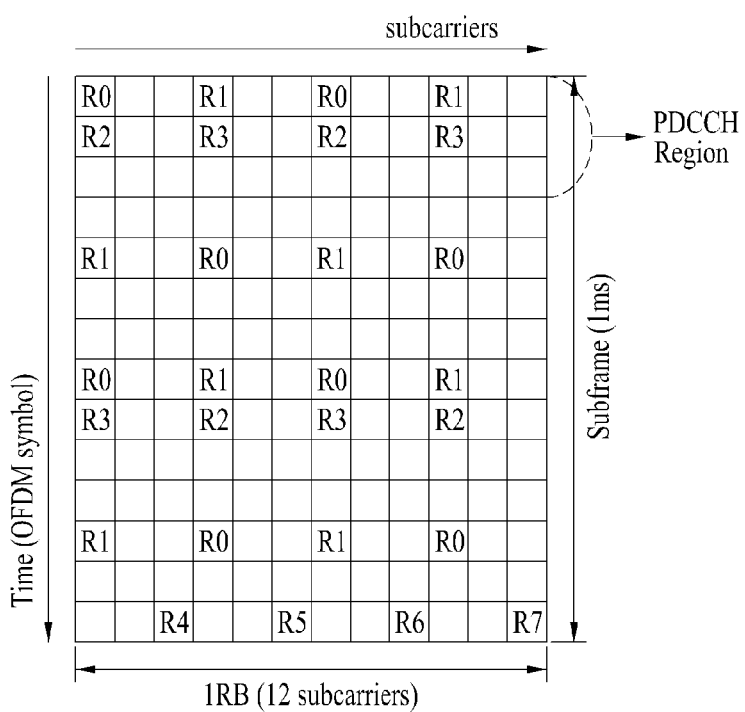
Figure 63:
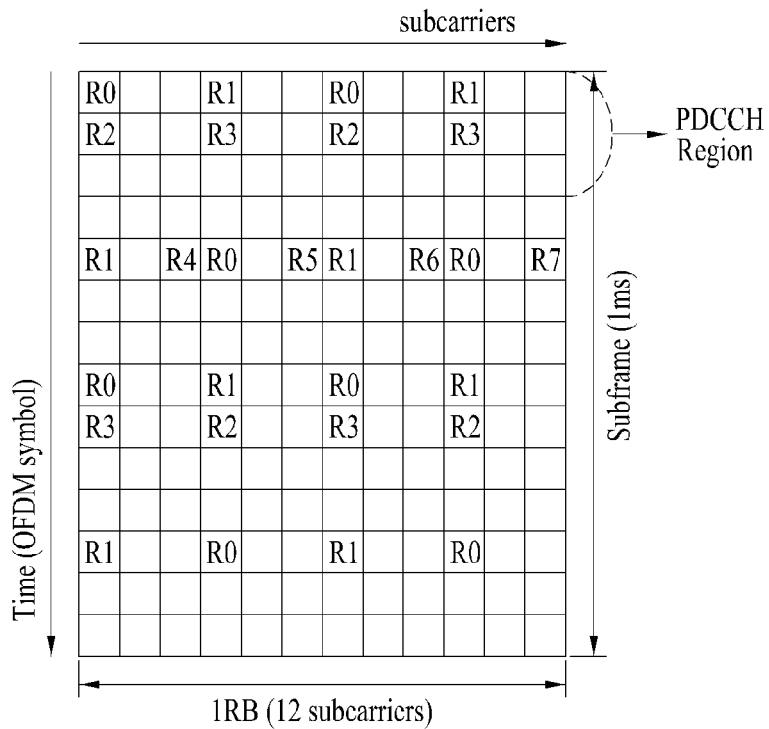
Figure 64:
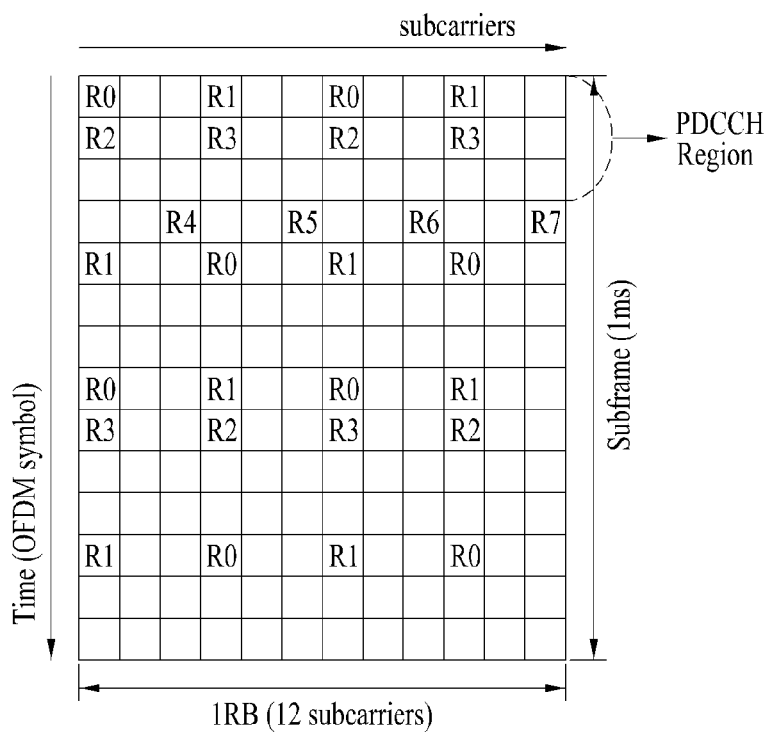
Figure 65:
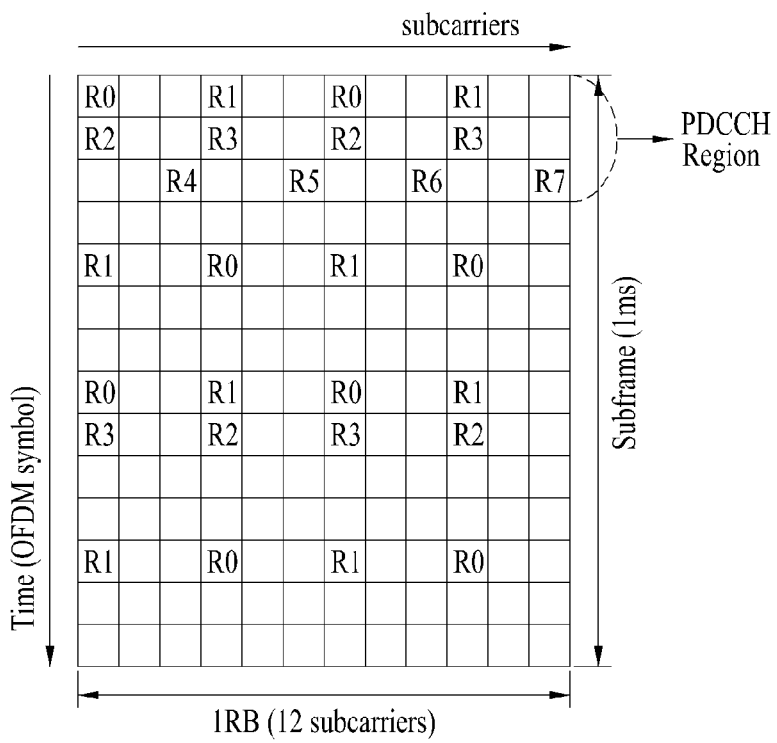
Figure 66:
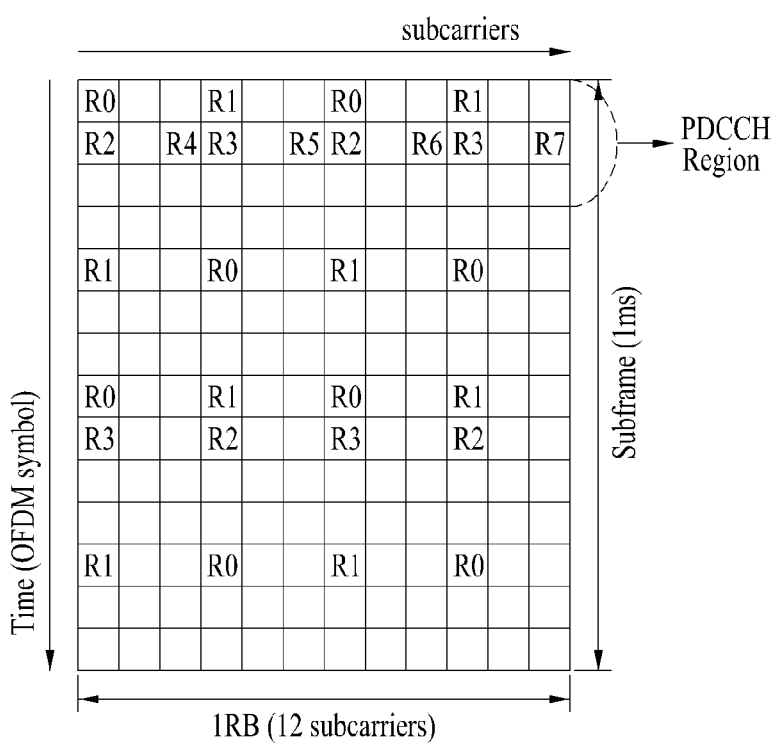
Figure 67:
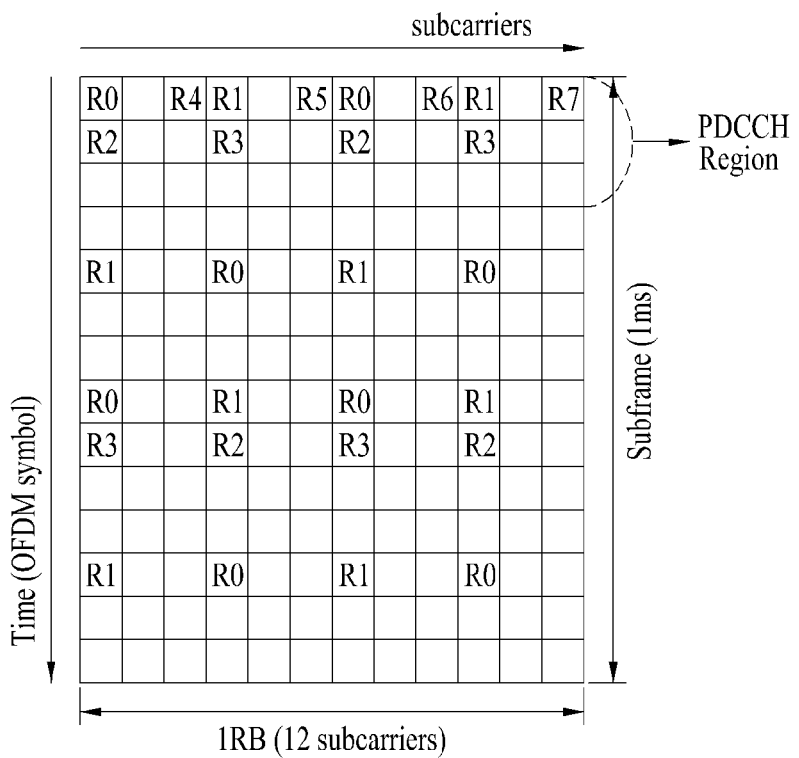
Figure 68:
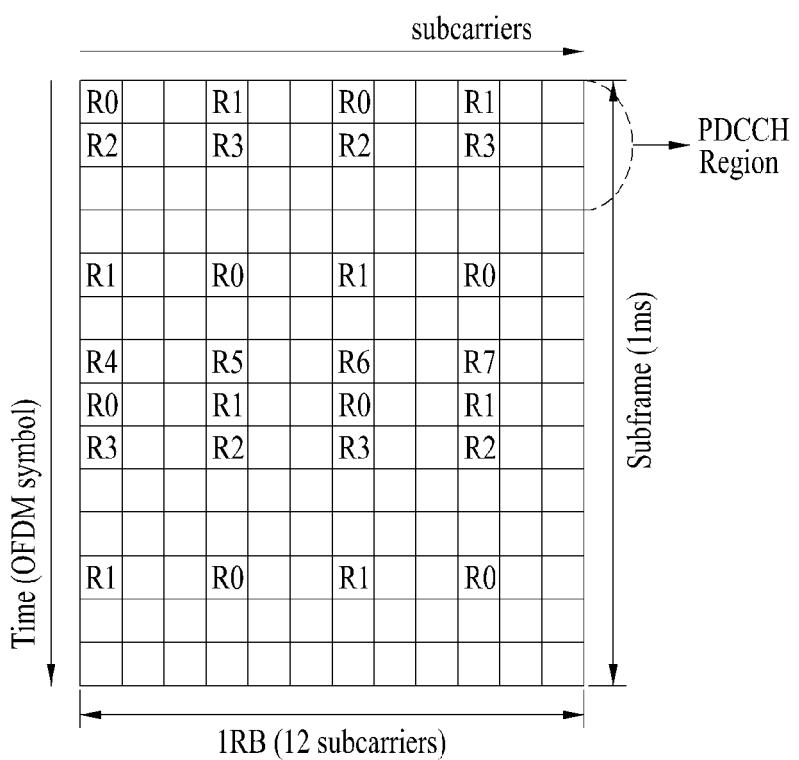
Figure 69:
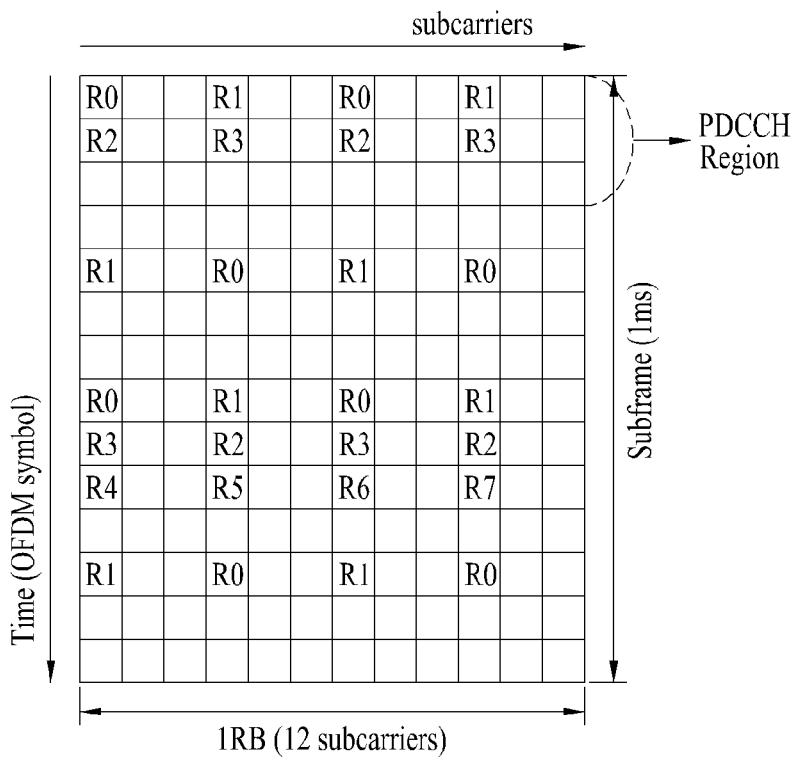
Figure 70:
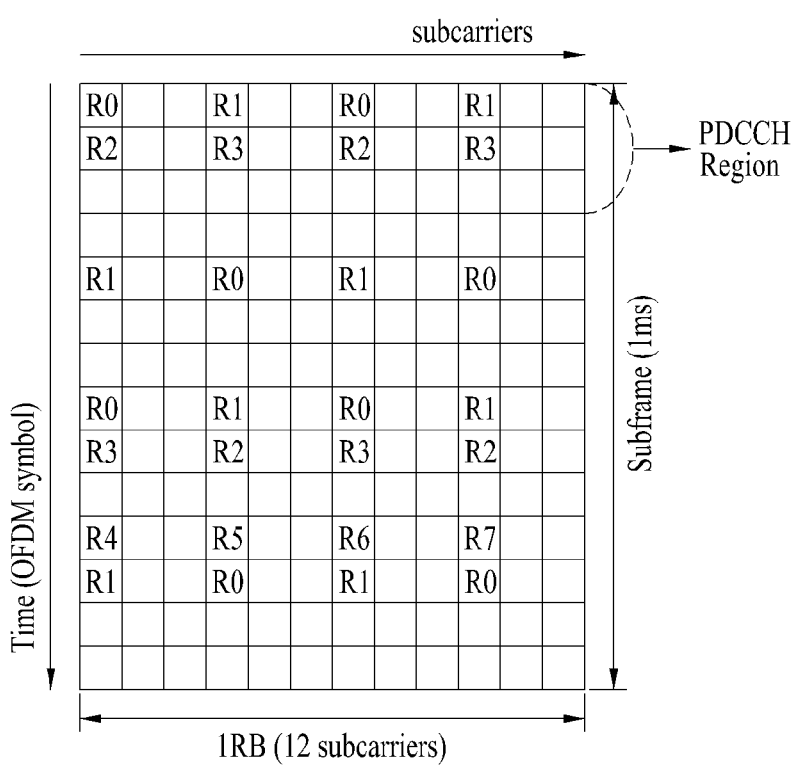
Figure 71:
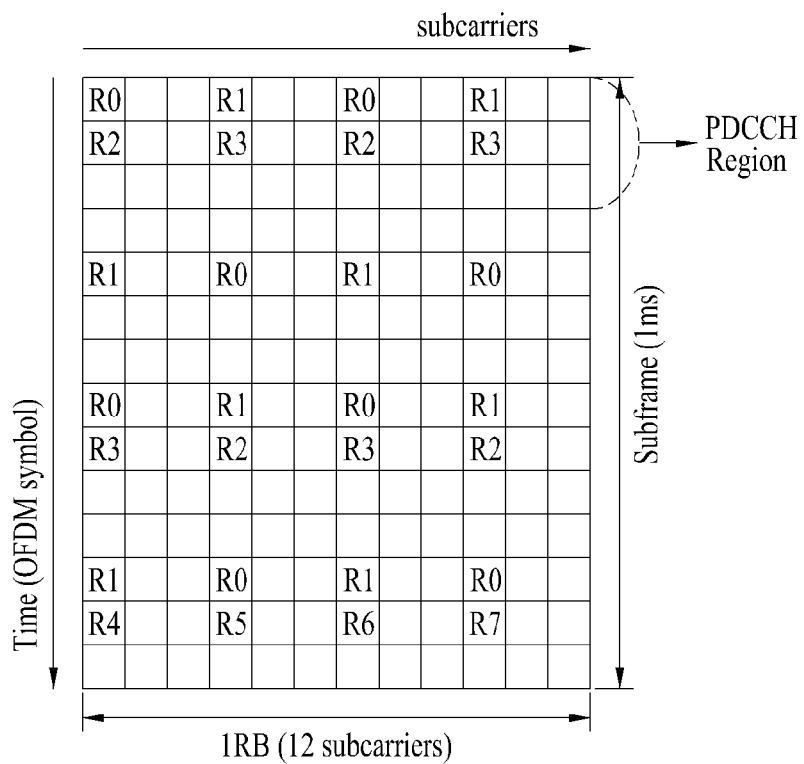
Figure 72:
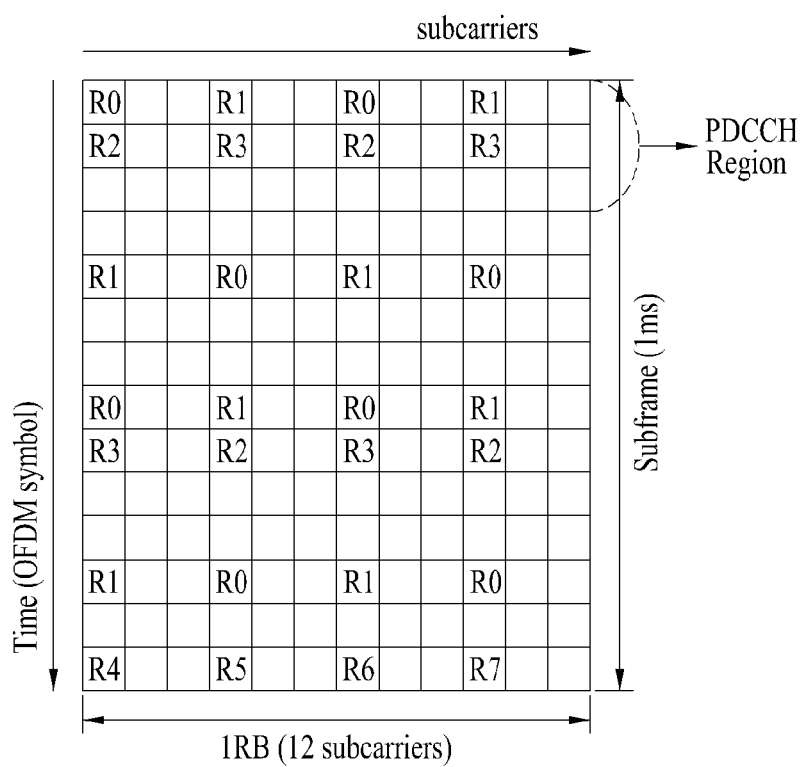
Figure 73:
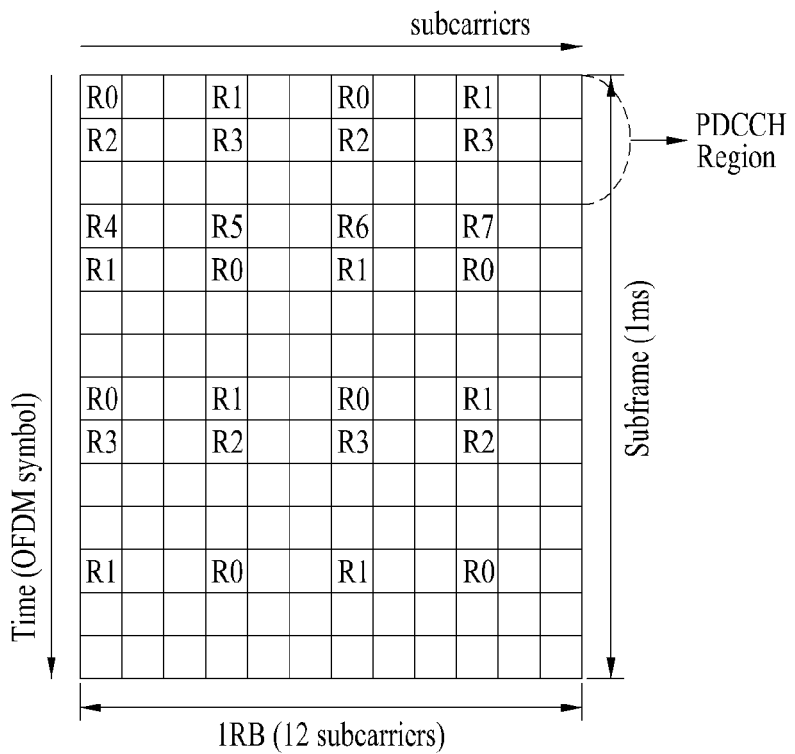
Figure 74:
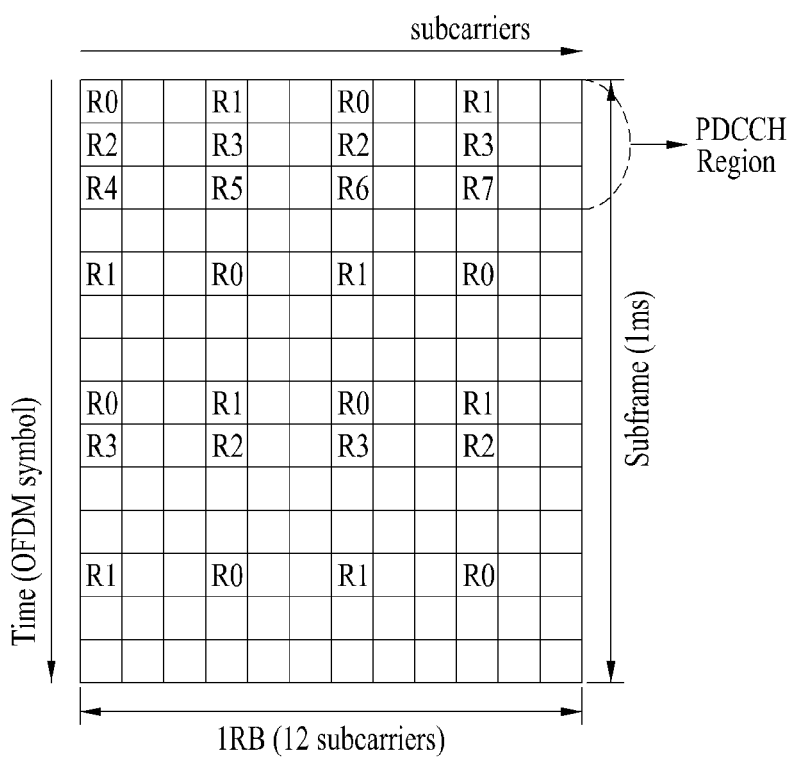

Specifically, FIG. 40 illustrates a pilot symbol structure in which pilot symbols R4 to R7 are cyclically shifted by m=1 based on the pilot symbol structure of FIG. 39; FIG. 41 illustrates a pilot symbol structure in which pilot symbols R4 to R7 are cyclically shifted by m=1 and n=1 based on the pilot symbol structure of FIG. 39; FIG. 42 illustrates a pilot symbol structure in which pilot symbols R4 to R7 are cyclically shifted by m=1 and n=2 based on the pilot symbol structure of FIG. 39; FIG. 43 illustrates a pilot symbol structure in which pilot symbols R4 to R7 are cyclically shifted by m=1 and n=3 based on the pilot symbol structure of FIG. 39; and FIGS. 44 to 74 illustrate pilot symbol structures in which pilot symbols R4 to R7 are cyclically shifted in a subcarrier direction or an OFDM symbol direction based on the pilot symbol structure of FIG. 39 using a method described with reference to FIG. 20.

Figure 75:
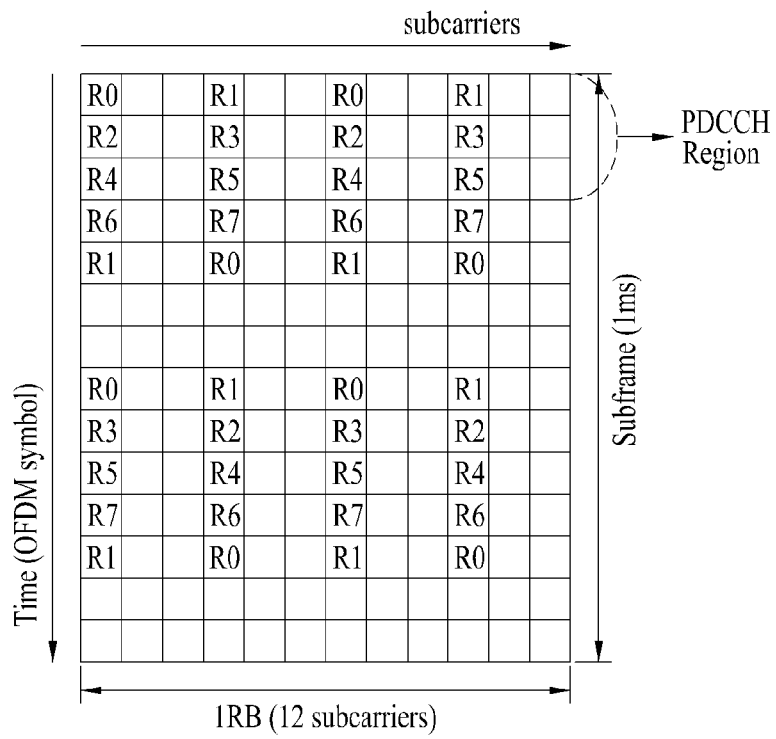
FIG. 75 illustrates a pilot symbol structure according to an exemplary embodiment of the present invention.
Figure 76:
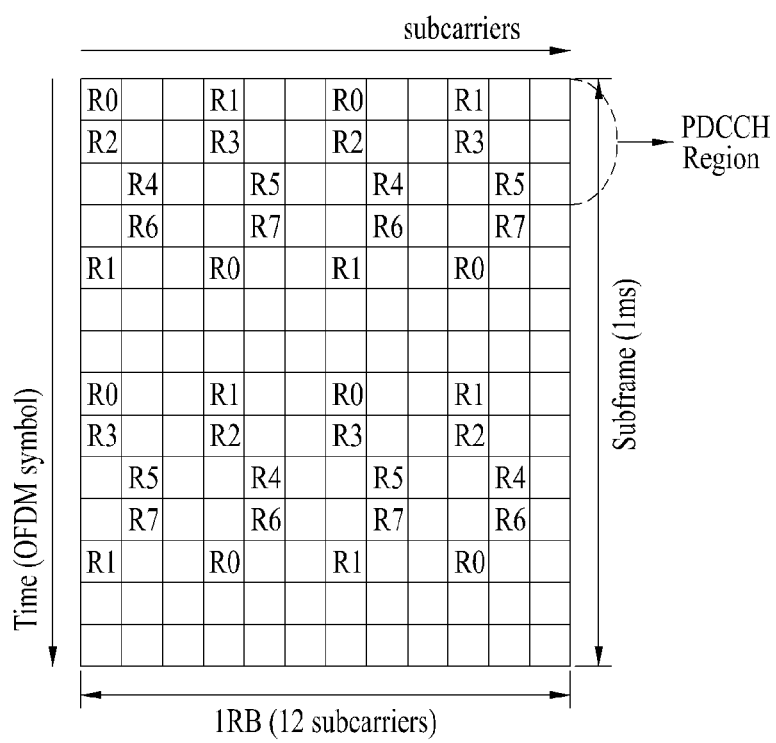
FIG. 76 illustrates a pilot symbol structure in which pilot symbols R4 to R7 are cyclically shifted in a subcarrier direction or an OFDM symbol direction based on the pilot symbol structure of FIG. 75.

FIG. 75 illustrates a pilot symbol structure according to an exemplary embodiment of the present invention. FIG. 76 illustrates a pilot symbol structure in which pilot symbols R4 to R7 are cyclically shifted in a subcarrier direction or an OFDM symbol direction based on the pilot symbol structure of FIG. 75. Specifically, FIG. 76 illustrates a pilot symbol structure in which pilot symbols R4 to R7 are cyclically shifted by m=1 based on the pilot symbol structure of FIG. 75.

Figure 77:
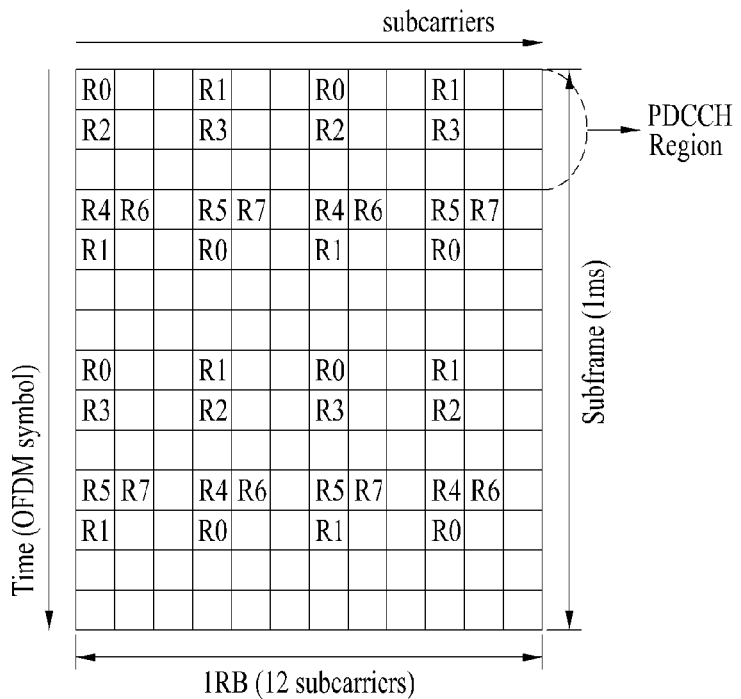
FIG. 77 illustrates a pilot symbol structure according to an exemplary embodiment of the present invention.
Figure 78:
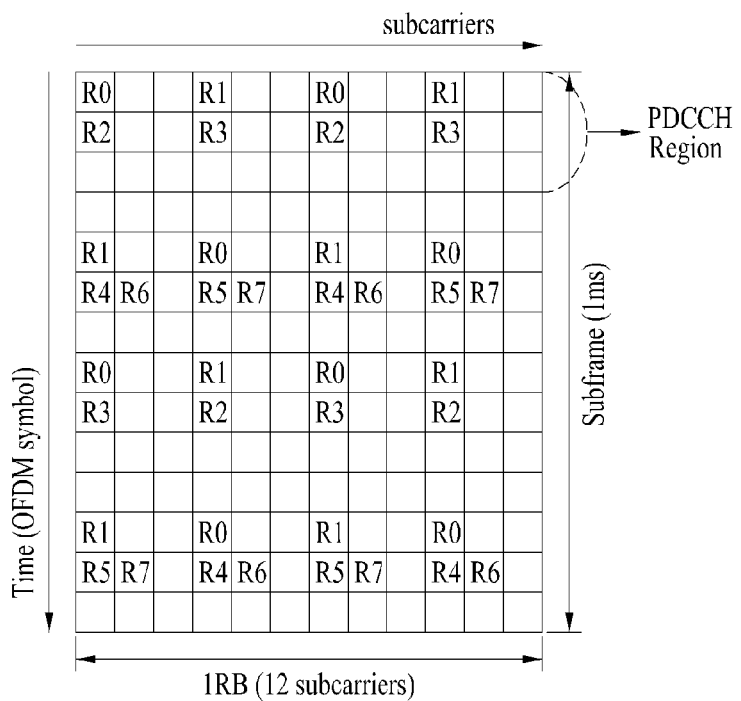
FIGS. 78 to 93 illustrate pilot symbol structures in which pilot symbols R4 to R7 are cyclically shifted in a subcarrier direction or an OFDM symbol direction based on the pilot symbol structure of FIG. 77.
Figure 79:
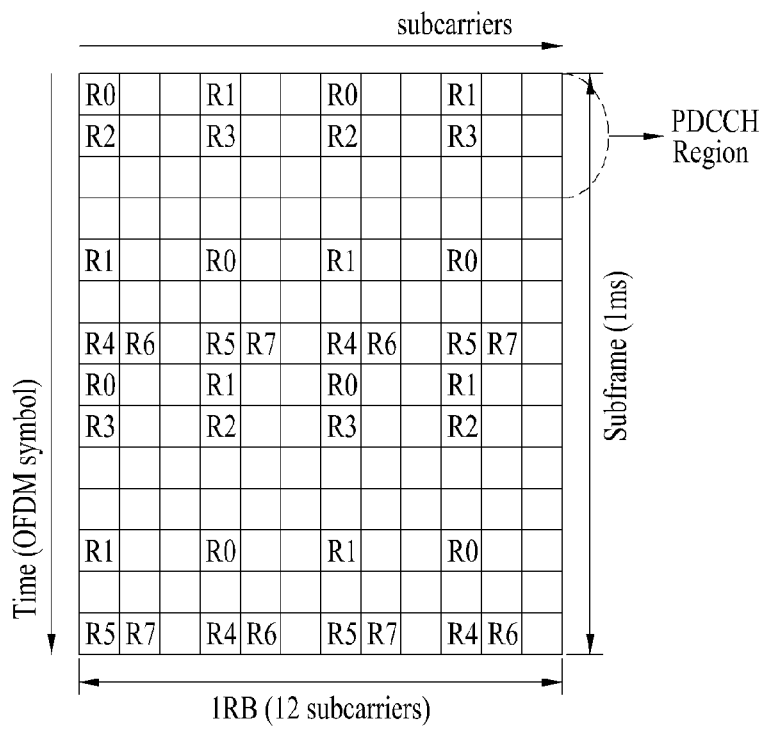
Figure 80:
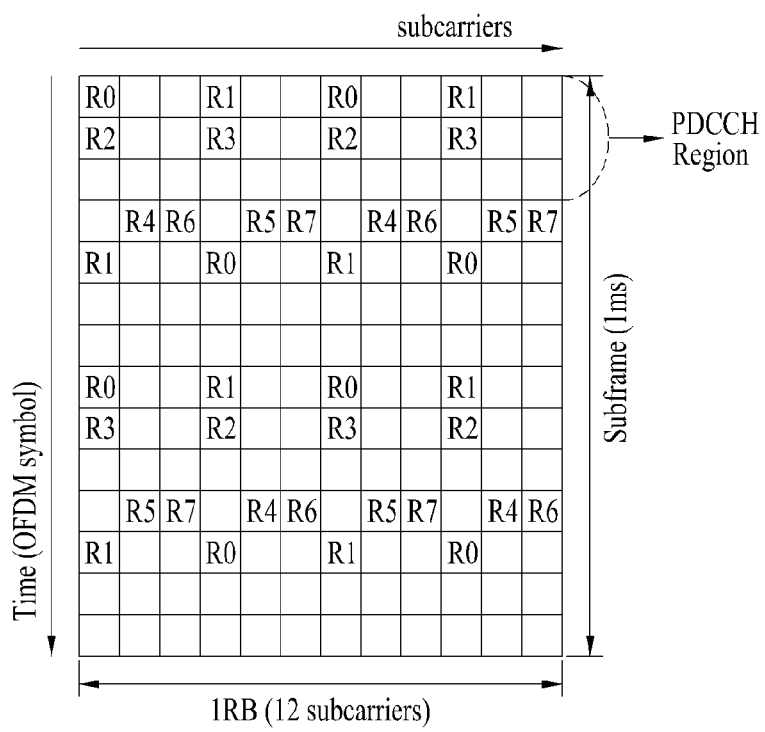
Figure 81:
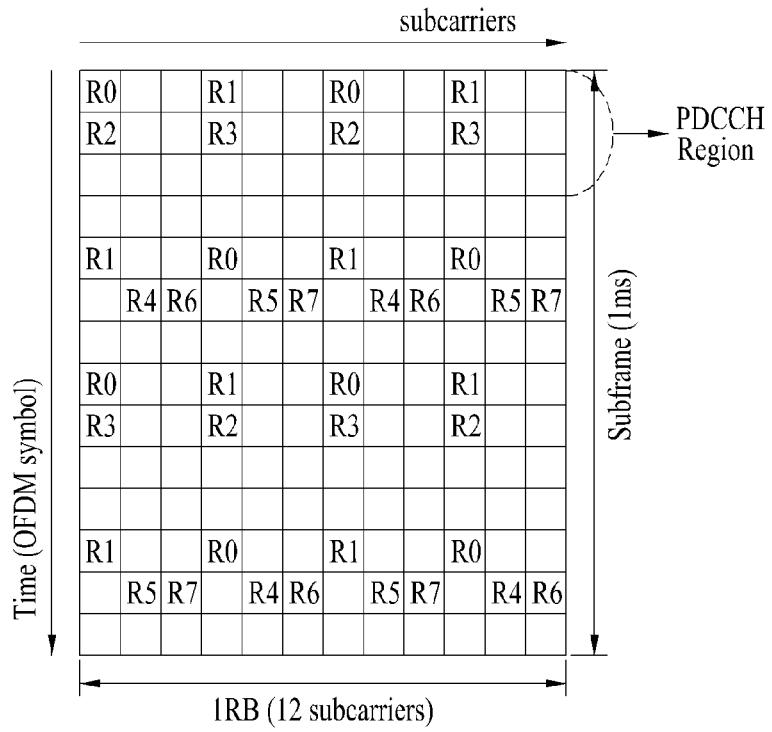
Figure 82:
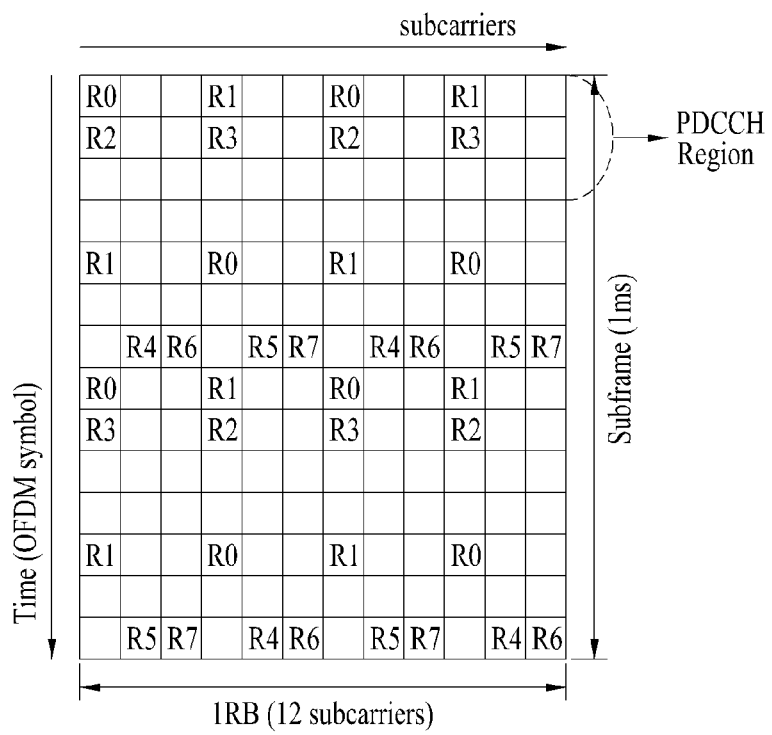
Figure 83:
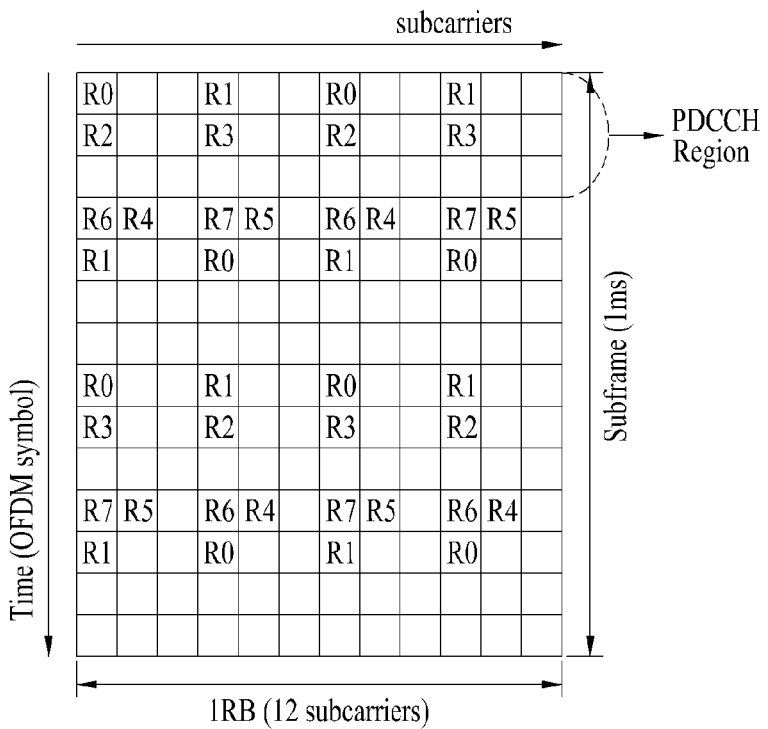
Figure 84:
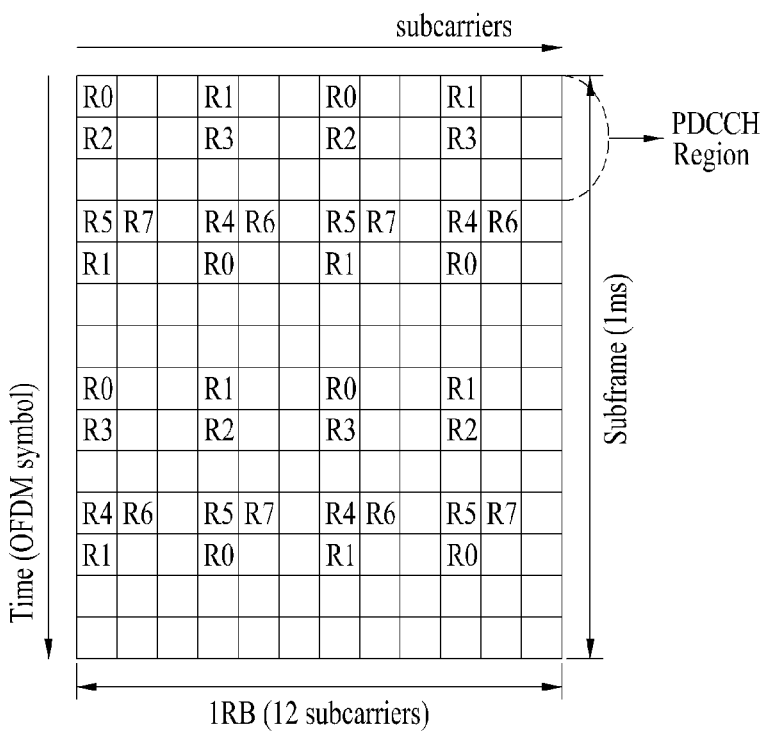
Figure 85:
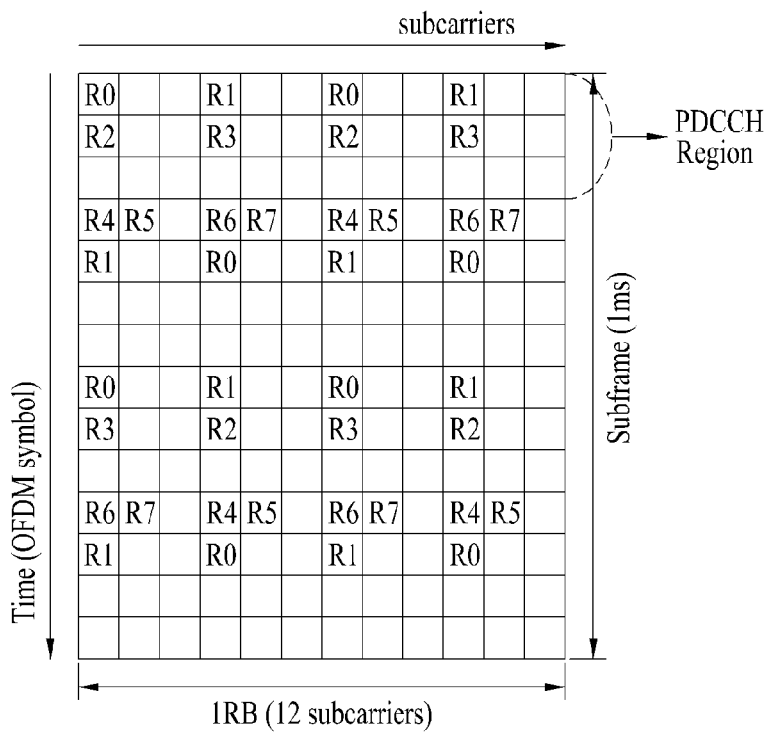
Figure 86:
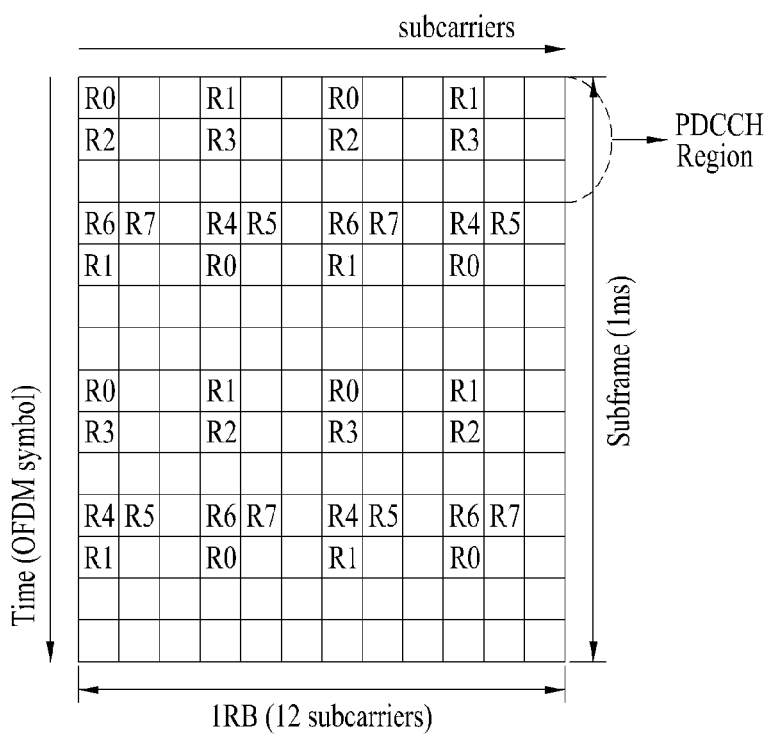
Figure 87:
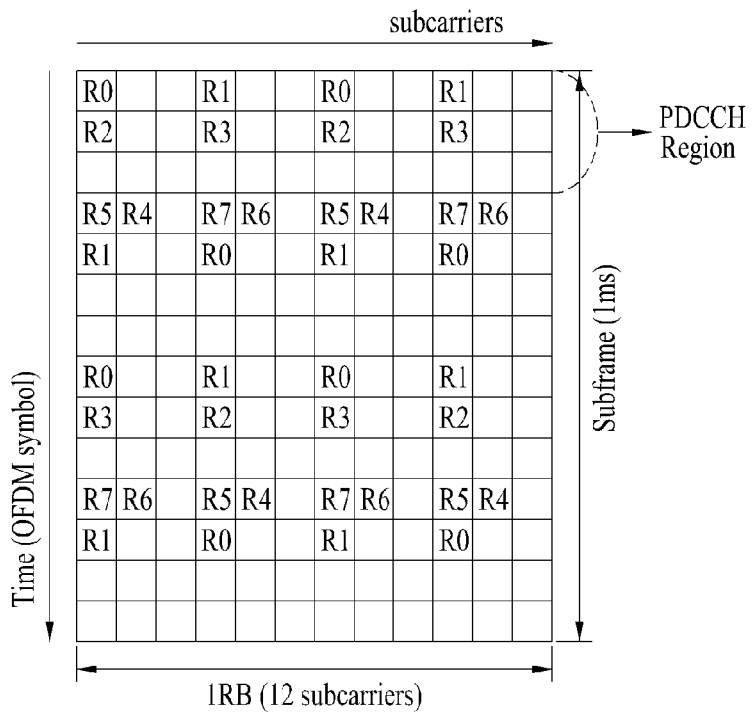
Figure 88:
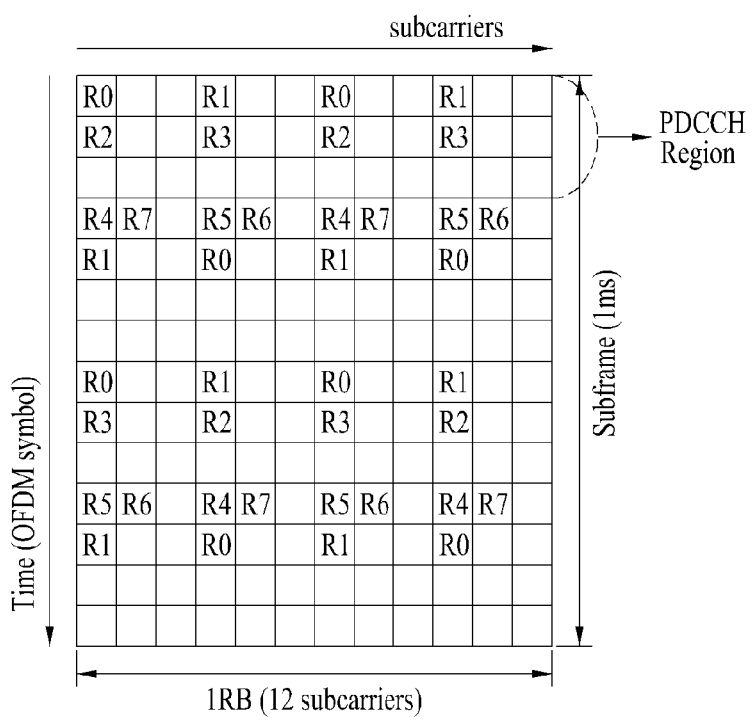
Figure 89:
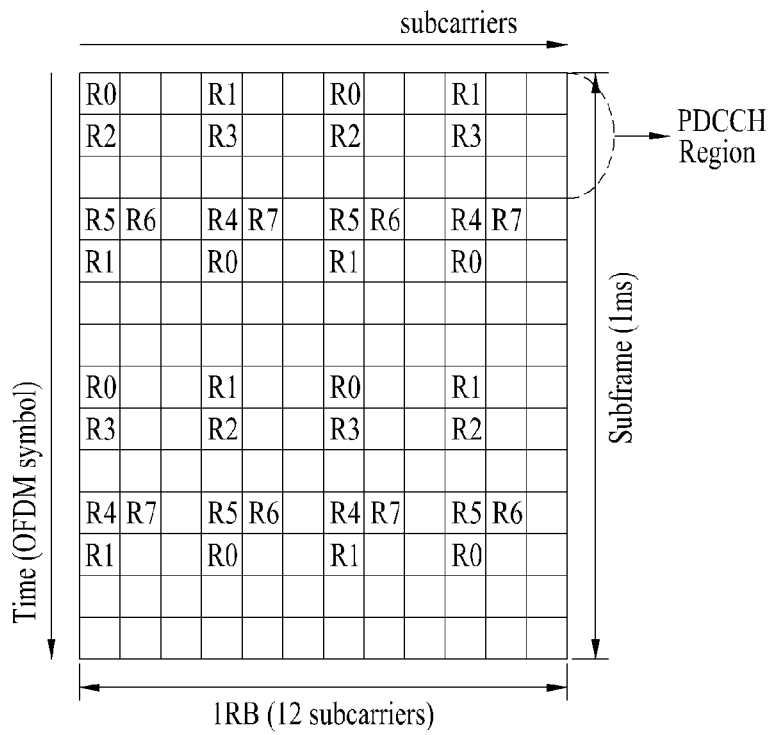
Figure 90:
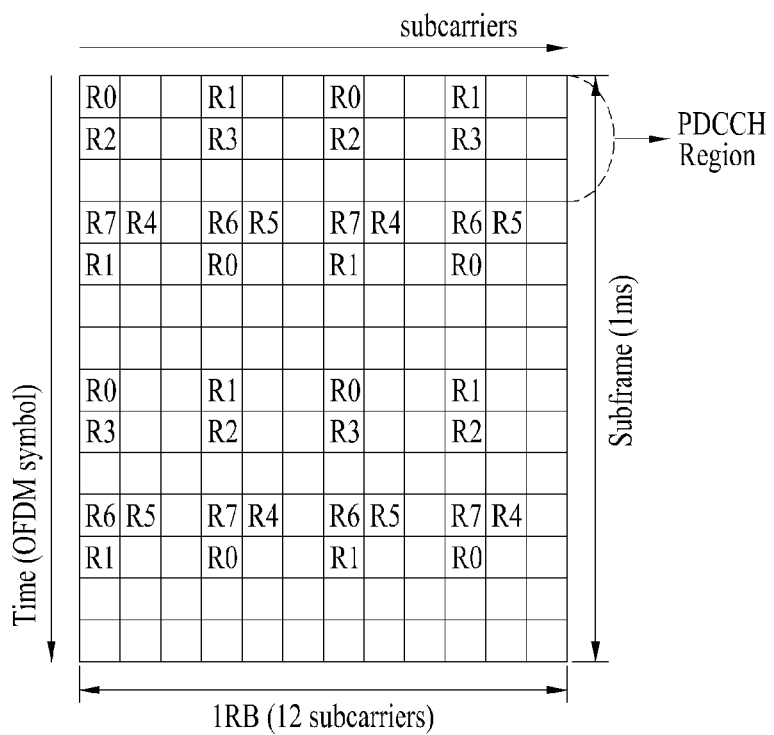
Figure 91:
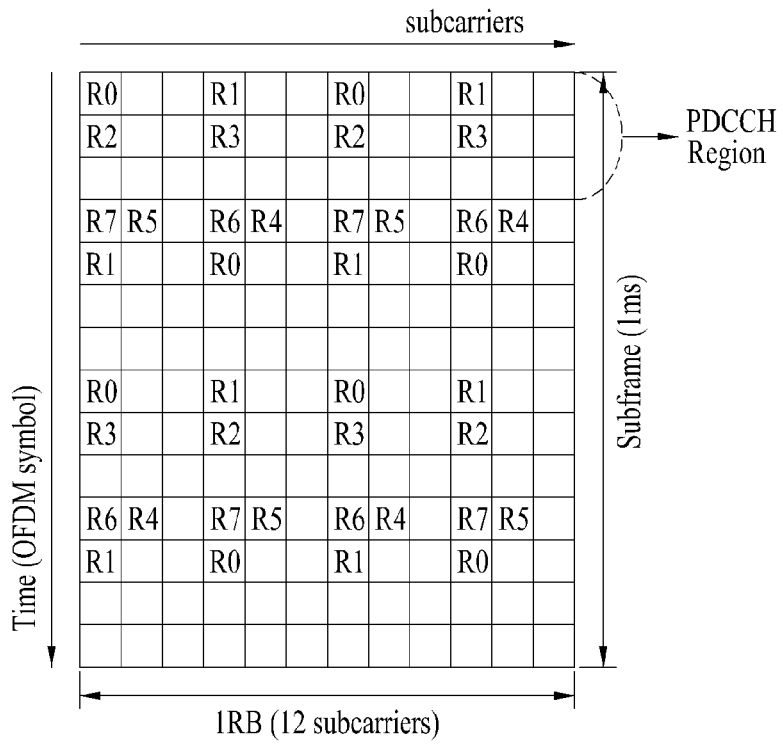
Figure 92:
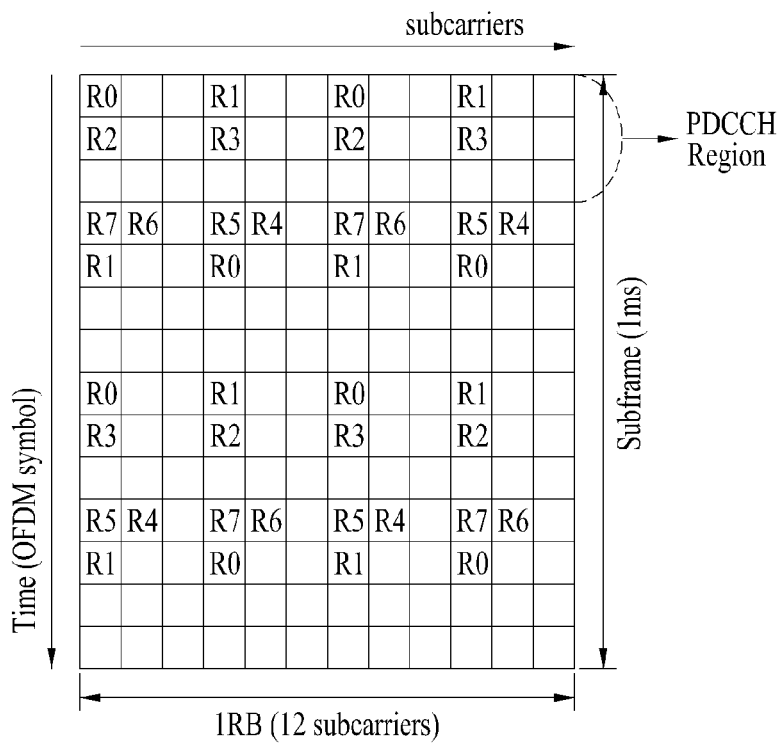
Figure 93:
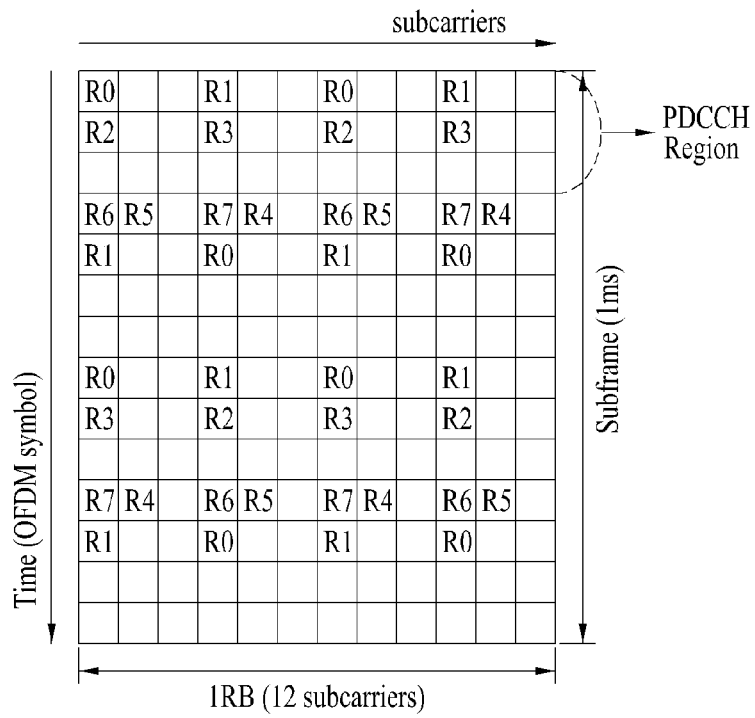

FIG. 77 illustrates a pilot symbol structure according to an exemplary embodiment of the present invention. FIGS. 78 to 93 illustrate pilot symbol structures in which pilot symbols R4 to R7 are cyclically shifted in a subcarrier direction or an OFDM symbol direction based on the pilot symbol structure of FIG. 77. Specifically, FIG. 78 illustrates a pilot symbol structure in which pilot symbols R4 to R7 are cyclically shifted by n=2 based on the pilot symbol structure of FIG. 77; FIG. 79 illustrates a pilot symbol structure in which pilot symbols R4 to R7 are cyclically shifted by n=3 based on the pilot symbol structure of FIG. 77; FIG. 80 illustrates a pilot symbol structure in which pilot symbols R4 to R7 are cyclically shifted by m=1 based on the pilot symbol structure of FIG. 77; and FIGS. 81 to 93 illustrate pilot symbol structures in which pilot symbols R4 to R7 are cyclically shifted in a subcarrier direction or an OFDM symbol direction based on the pilot symbol structure of FIG. 77 using a method described with reference to FIG. 20.

Figure 94:
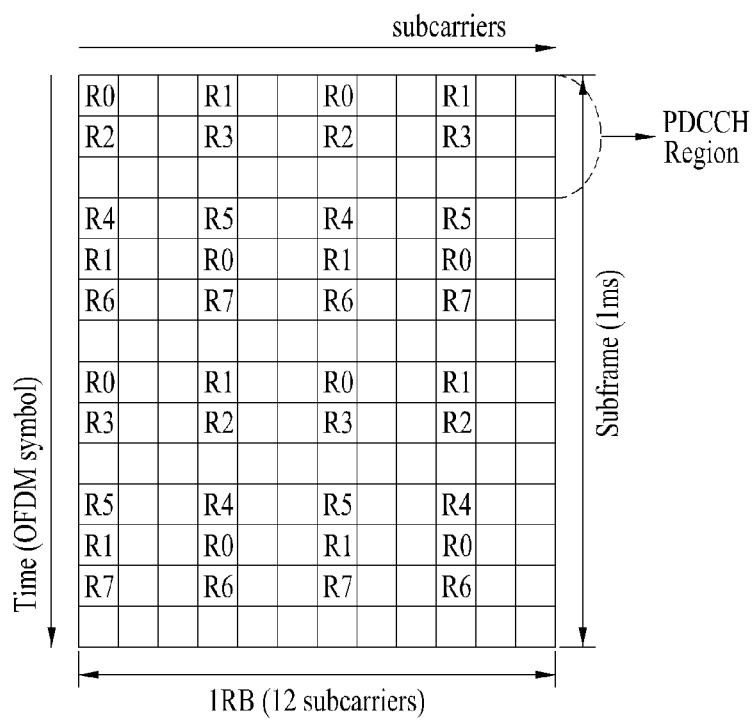
FIG. 94 illustrates a pilot symbol structure according to an exemplary embodiment of the present invention.
Figure 95:
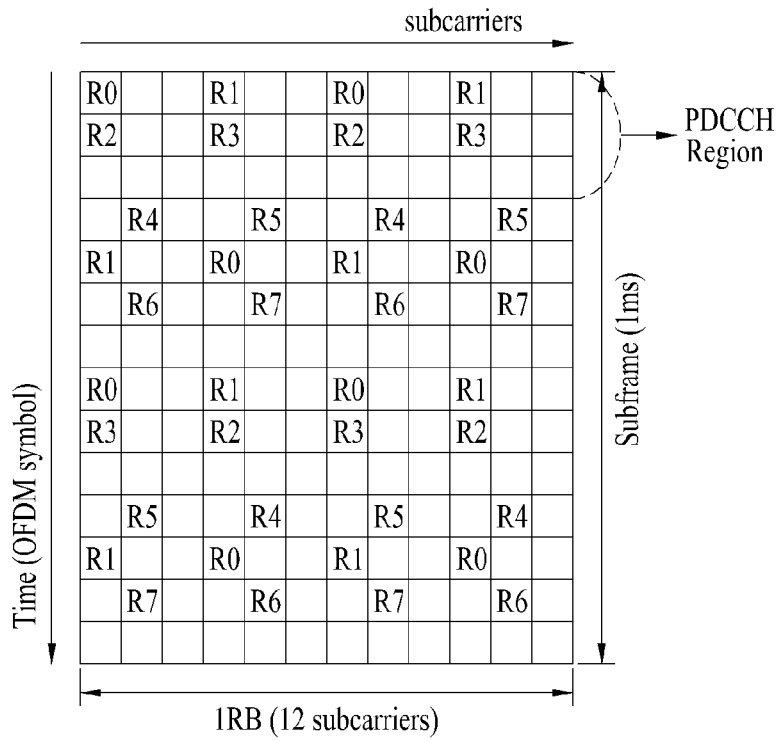
FIGS. 95 and 96 illustrate pilot symbol structures in which pilot symbols R4 to R7 are cyclically shifted in a subcarrier direction or an OFDM symbol direction based on the pilot symbol structure of FIG. 94.
Figure 96:
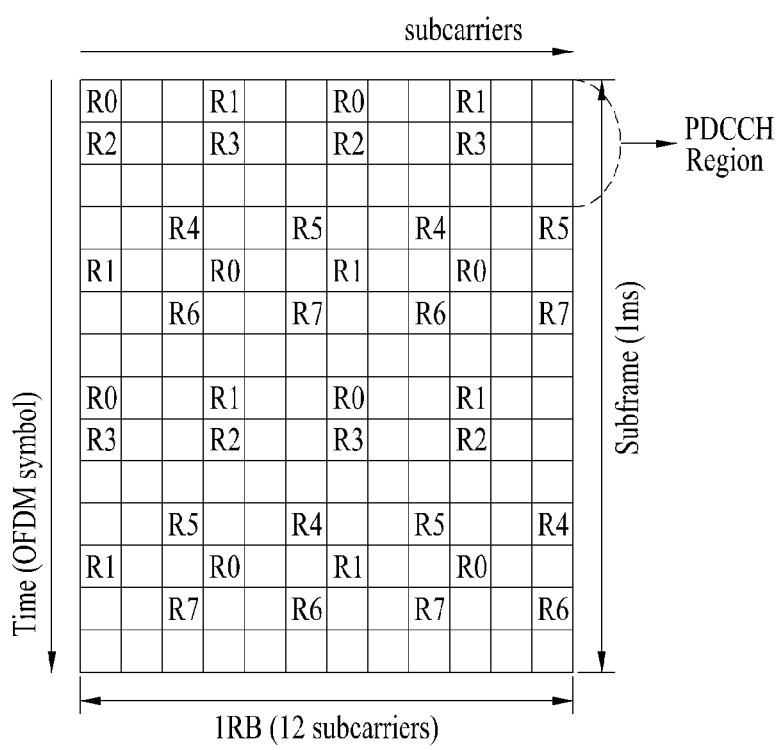

FIG. 94 illustrates a pilot symbol structure according to an exemplary embodiment of the present invention. FIGS. 95 and 96 illustrate pilot symbol structures in which pilot symbols R4 to R7 are cyclically shifted in a subcarrier direction or an OFDM symbol direction based on the pilot symbol structure of FIG. 94. Specifically, FIG. 95 illustrates a pilot symbol structure in which pilot symbols R4 to R7 are cyclically shifted by m=1 based on the pilot symbol structure of FIG. 94. FIG. 96 illustrates a pilot symbol structure in which pilot symbols R4 to R7 are cyclically shifted by m=2 based on the pilot symbol structure of FIG. 94.

Figure 97:
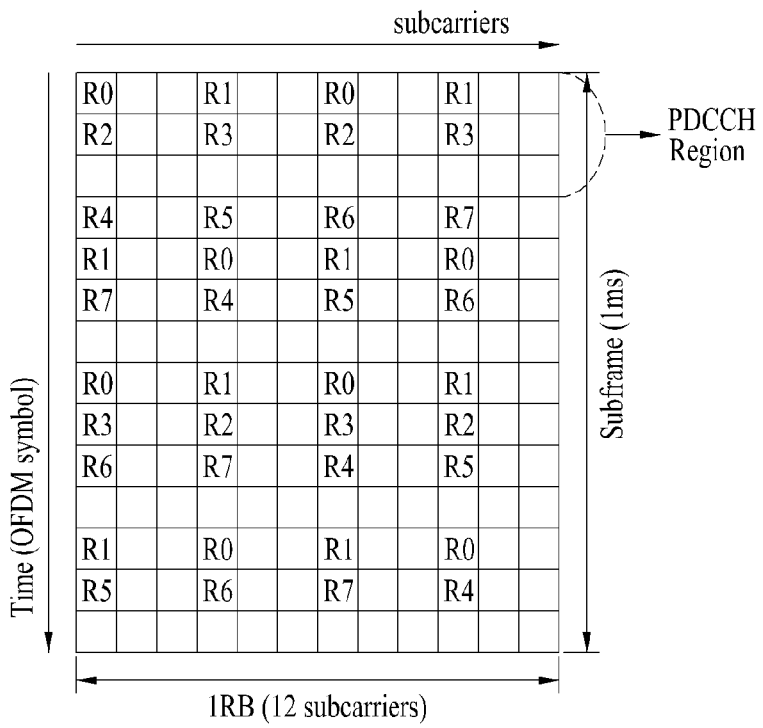
FIGS. 97 and 98 illustrate pilot symbol structures according to an exemplary embodiment of the present invention.
Figure 98:
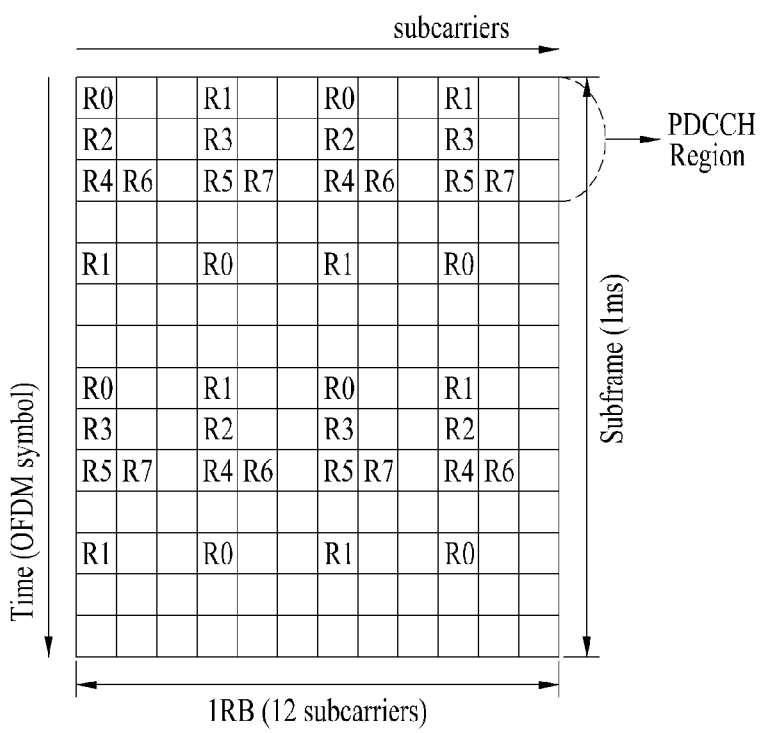

FIGS. 97 and 98 illustrate pilot symbol structures according to an exemplary embodiment of the present invention. It is possible to configure a pilot pattern like the pilot symbol structures shown in FIGS. 97 and 98.

The pilot symbol structures can be designed in various ways using the following methods.

Figure 99:
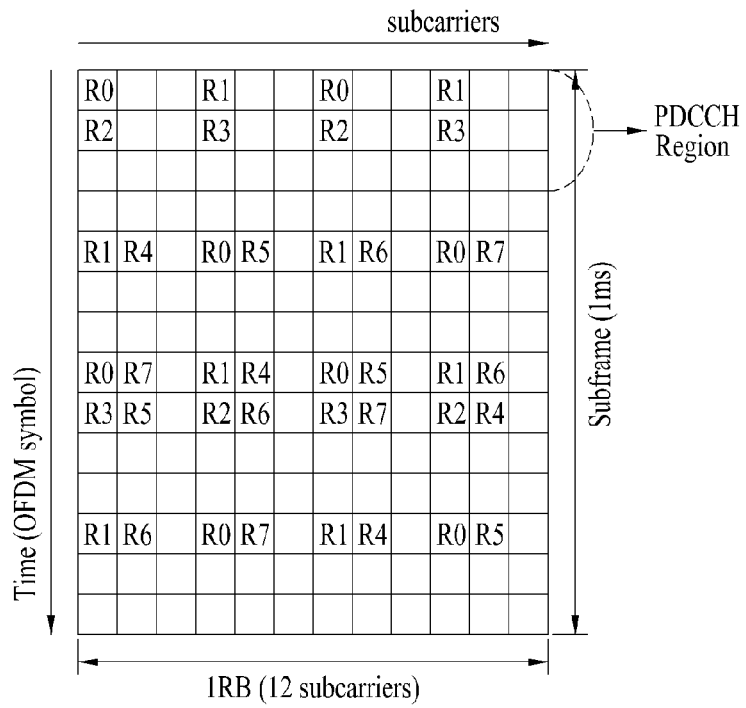
FIG. 99 illustrates a pilot symbol structure according to an exemplary embodiment of the present invention.
Figure 100:
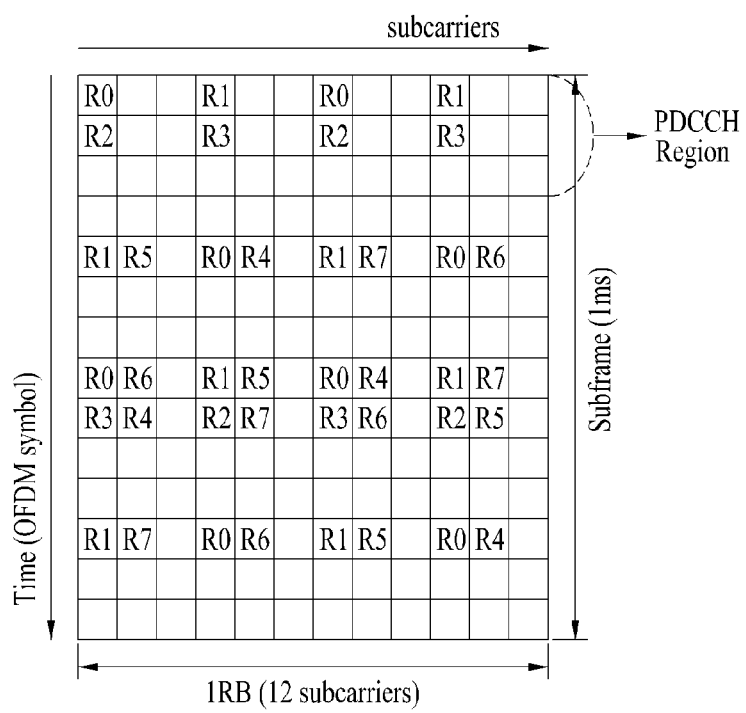
FIGS. 100 to 106 illustrate pilot symbol structures in which pilot symbols R4 to R7 are cyclically shifted according to a prescribed rule based on the pilot symbol structure of FIG. 99.
Figure 101:
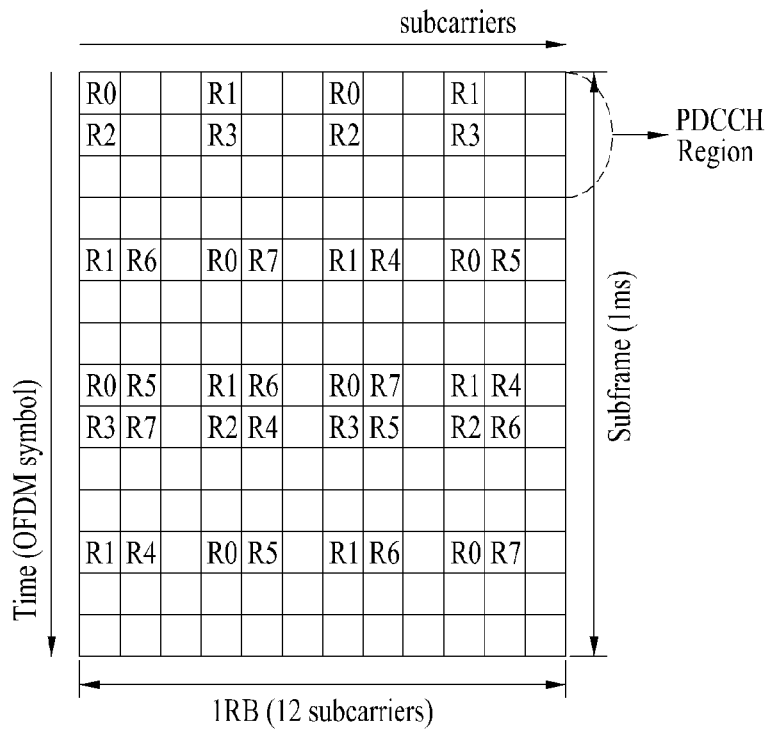
Figure 102:
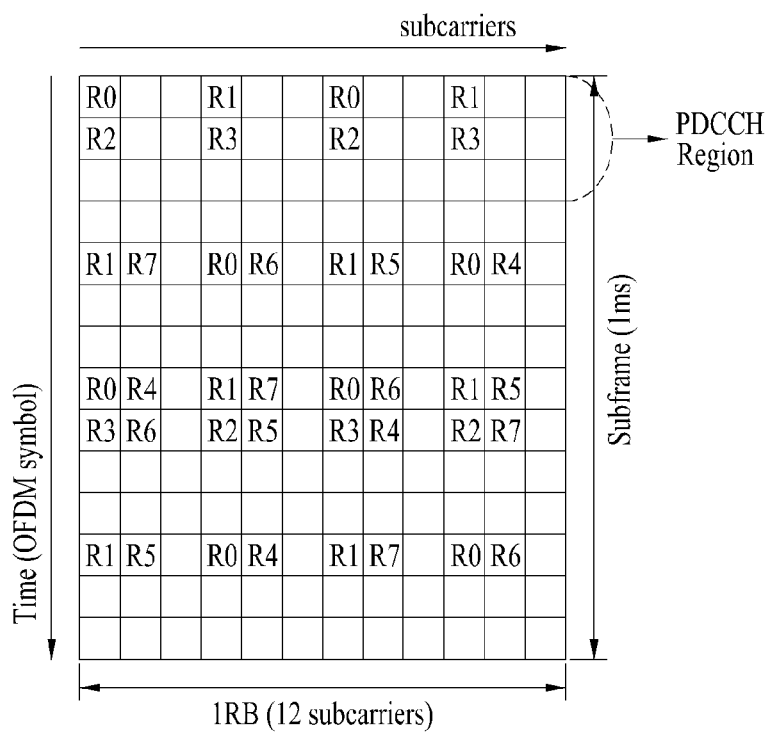

FIG. 99 illustrates a pilot symbol structure according to an exemplary embodiment of the present invention. FIGS. 100 to 106 illustrate pilot symbol structures in which pilot symbols R4 to R7 are cyclically shifted according to a prescribed rule based on the pilot symbol structure of FIG. 99. Specifically, FIG. 100 illustrates a pilot symbol structure in which the positions of pilot symbols R4 and R5 are interchanged and the positions of R6 and R7 are interchanged based on the pilot symbol structure of FIG. 99; FIG. 101 illustrates a pilot symbol structure in which the positions of pilot symbols R4 and R6 are interchanged and the positions of R5 and R7 are interchanged based on the pilot symbol structure of FIG. 99; and FIG. 102 illustrates a pilot symbol structure in which the positions of pilot symbols R4 and R7 are interchanged and the positions of R5 and R6 are interchanged based on the pilot symbol structure of FIG. 99.

Figure 103:
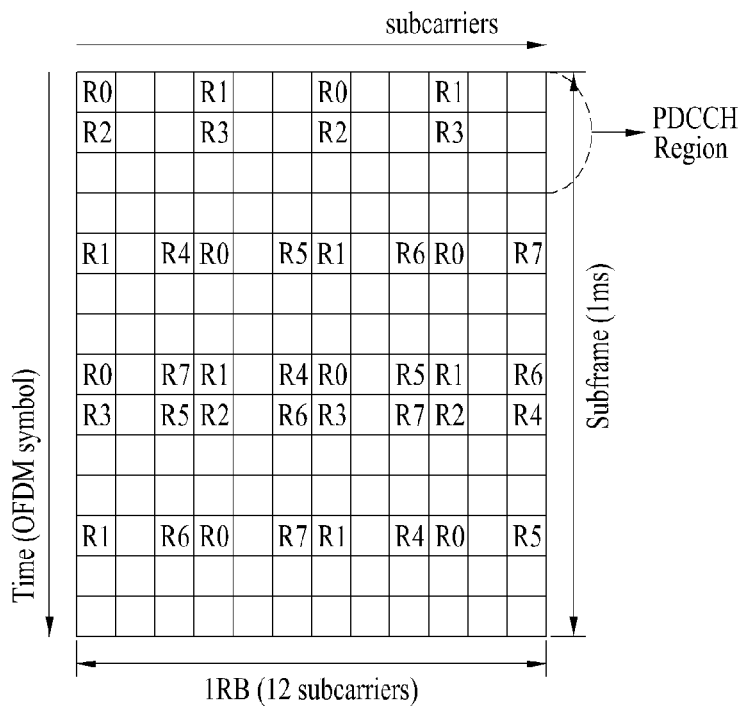
Figure 104:
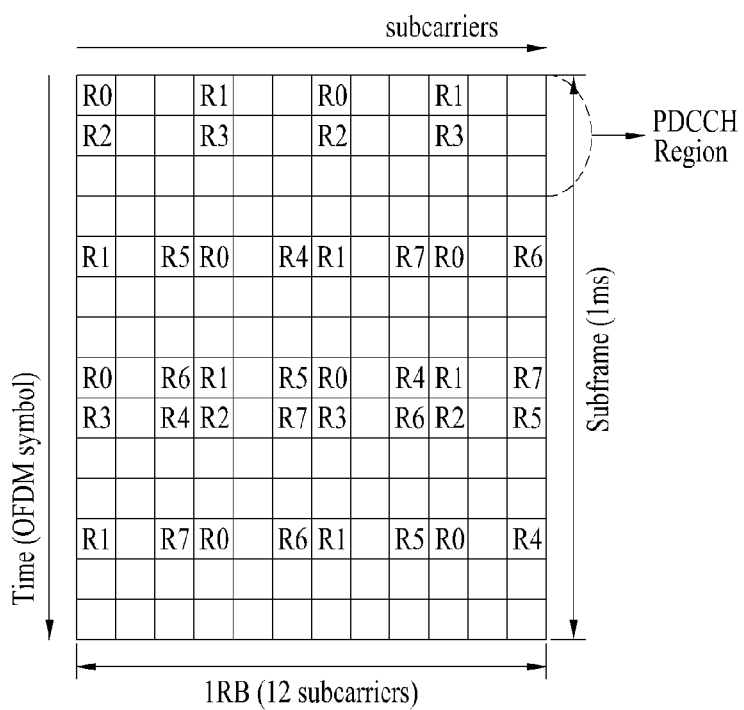
Figure 105:
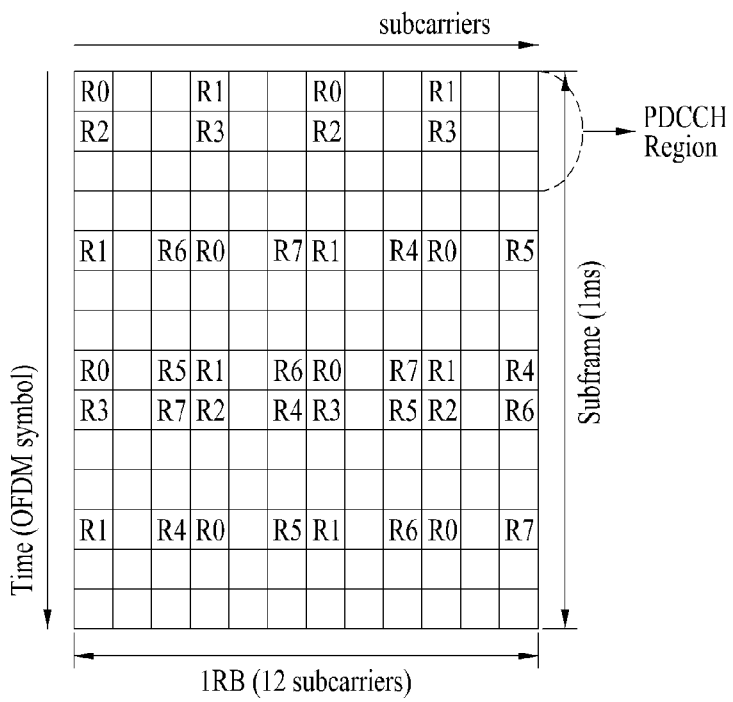
Figure 106:
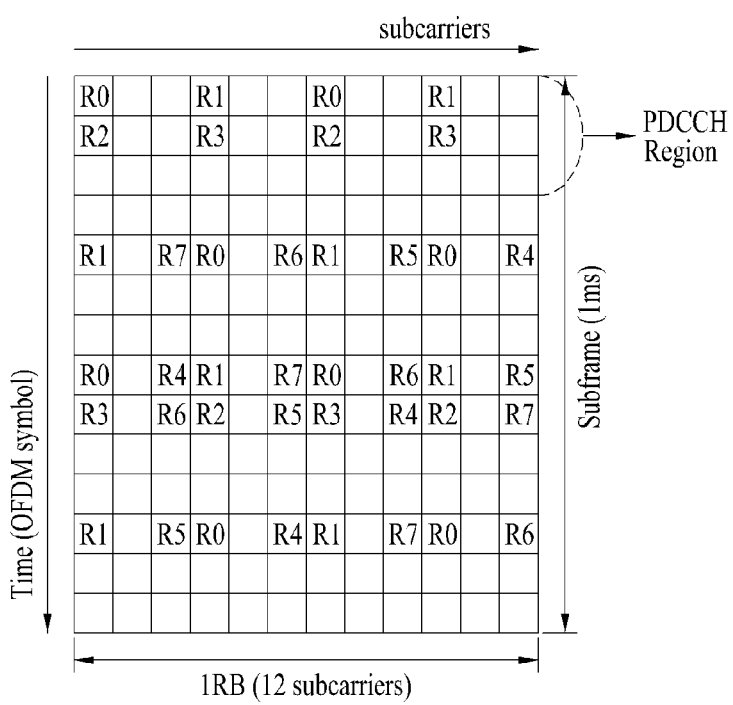

Meanwhile, FIG. 103 illustrates a pilot symbol structure in which pilot symbols R4 to R7 are cyclically shifted by m=1 based on the pilot symbol structure of FIG. 99; FIG. 104 illustrates a pilot symbol structure in which the positions of pilot symbols R4 and R5 are interchanged and the positions of R6 and R7 are interchanged based on the pilot symbol structure of FIG. 103; FIG. 105 illustrates a pilot symbol structure in which the positions of pilot symbols R4 and R6 are interchanged and the positions of R5 and R7 are interchanged based on the pilot symbol structure of FIG. 103; and FIG. 106 illustrates a pilot symbol structure in which the positions of pilot symbols R4 and R7 are interchanged and the positions of R5 and R6 are interchanged based on the pilot symbol structure of FIG. 103.

Upon receiving pilot symbols which are designed by the aforementioned method, a UE may acquire channel information between a BS and the UE using the received pilot symbols and feed back the channel information to the Bs.

Figure 107:
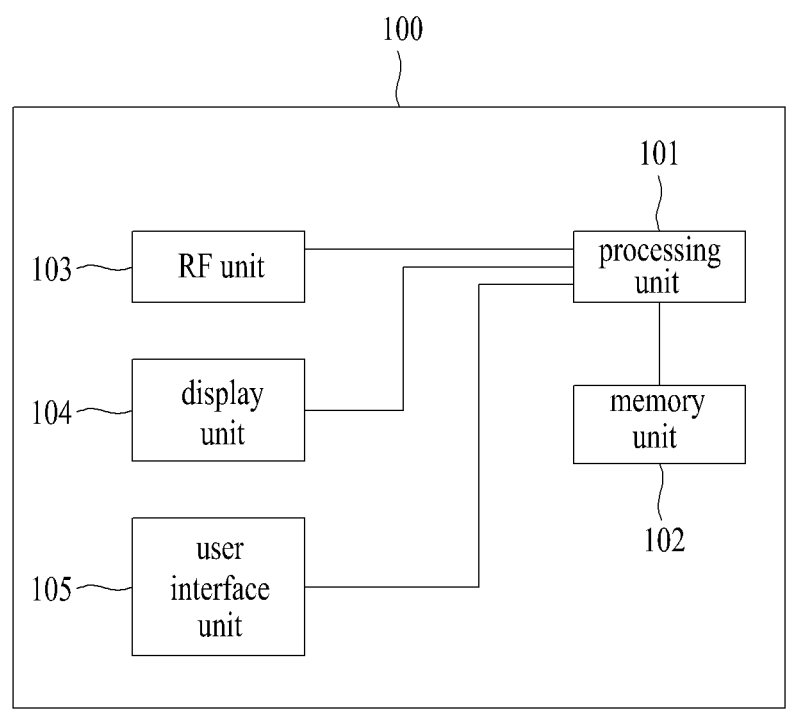
FIG. 107 is a block diagram illustrating a device configuration which can be applied to a BS and a UE that perform the above-described method.

FIG. 107 is a block diagram illustrating a device configuration which can be applied to a BS and a UE and can perform the above-described method. As shown in FIG. 107, a device 100 includes a processing unit 101, a memory unit 102, a Radio Frequency (RF) unit 103, a display unit 104, and a user interface unit 105. A layer of a physical interface protocol is performed in the processing unit 101. The processing unit 101 provides a control plane and a user plane. A function of each layer may be performed in the processing unit 101. The memory unit 102 is electrically connected to the processing unit 101 and stores operating systems, application programs, and general files. If the device 100 is a UE, the display unit 104 may display various information and may be comprised of a known Liquid Crystal Display (LCD), an Organic Light Emitting Diode (OLED), etc. The user interface unit 105 may be combined with a known user interface such as a keypad, a touchscreen, etc. The RF unit 103 is electrically connected to the processing unit 101 and transmits or receives radio signals.

According to exemplary embodiments of the present invention, pilot symbols can be efficiently transmitted to both a UE of an existing system and a UE newly added to the system.

Exemplary embodiments described hereinabove are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It will be obvious to those skilled in the art that claims that are not explicitly cited in the appended claims may be presented in combination as an exemplary embodiment of the present invention or included as a new claim by subsequent amendment after the application is filed.

Terms such as Mobile Station (MS), Subscriber Station (SS), Mobile Subscriber Station (MSS), or Mobile Terminal (MT) may be used instead of the term UE.

The above-described embodiments of the present invention can be implemented by a variety of means, for example, hardware, firmware, software, or a combination of them.

In the case of implementing the present invention by hardware, the present invention can be implemented through Application Specific Integrated Circuits (ASICs), Digital Signal Processors (DSPs), Digital Signal Processing Devices (DSPDs), Programmable Logic Devices (PLDs), Field Programmable Gate Arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. Software code may be stored in a memory unit so that it can be executed by a processor. The memory unit is located inside or outside of the processor, so that it can communicate with the aforementioned processor via a variety of well-known means.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the equivalency range of the appended claims are intended to be embraced therein. Also, claims that are not explicitly cited in the appended claims may be presented in combination as an exemplary embodiment of the present invention or included as a new claim by subsequent amendment after the application is filed.

The embodiments of the present invention are applicable to a UE, a BS, or other equipments of a radio mobile communication system.

What is claimed is:

1. A method for transmitting a pilot signal in a downlink Multiple-Input Multiple-Output (MIMO) system supporting a maximum M transmission antennas, the method comprising:
   mapping, by a Base Station (BS), cell-specific pilot symbols for transmission antenna ports R0' to R(N−1)' to a first region of a subframe;
   mapping, by the BS, User Equipment-specific (UE-specific) pilot symbols for transmission antenna ports R0 to R(M−1) to a second region of the subframe, wherein N<M; and
   transmitting the subframe to which the cell-specific pilot symbols and the UE-specific pilot symbols are mapped,
   wherein each of the first and the second regions of the subframe includes a prescribed number of consecutive Orthogonal Frequency Division Multiplexing (OFDM) symbols on a time domain.

2. The method of claim 1, wherein the UE-specific pilot symbols for transmission antenna ports R0 to R(M−1) are UE-specific pilot symbols for data demodulation at a user equipment receiving downlink signals transmitted through the maximum M transmission antennas.

3. The method of claim 1, wherein the UE-specific pilot symbols for transmission antenna ports R0 to R(M−1) are mapped only to a specific resource block region of the subframe.

4. The method of claim 1, wherein N is one of 1, 2, and 4, M is one of 2, 4, and 8.

5. A method for receiving pilot symbols in a downlink Multiple-Input Multiple-Output (MIMO) system supporting a maximum M transmission antennas, the method comprising:
   receiving a subframe, wherein cell-specific pilot symbols for transmission antenna ports R0' to R(N−1)' are mapped to a first region of the subframe, and User Equipment-specific (UE-specific) pilot symbols for transmission antenna ports R0 to R(M−1) are mapped to a second region of the subframe, wherein N<M; and
   estimating a downlink channel using the cell-specific pilot symbols and the UE-specific pilot symbols,
   wherein each of the first and the second regions of the subframe includes a prescribed number of consecutive Orthogonal Frequency Division Multiplexing (OFDM) symbols on a time domain.

6. The method of claim 5, wherein the UE-specific pilot symbols for transmission antenna ports R0 to R(M−1) are UE-specific pilot symbols for data demodulation at a user equipment receiving downlink signals transmitted through the maximum M transmission antennas.

7. The method of claim 5, wherein the UE-specific pilot symbols for transmission antenna ports R0 to R(M−1) are mapped only to a specific resource block region of the subframe.

8. The method of claim 5, wherein N is one of 1, 2, and 4, M is one of 2, 4, and 8.

* * * * *